United States Patent
Sasaki et al.

(10) Patent No.: US 6,581,372 B2
(45) Date of Patent: Jun. 24, 2003

(54) COMPRESSION IGNITION TYPE ENGINE

(75) Inventors: Shizuo Sasaki, Numazu (JP); Kohei Igarashi, Susono (JP); Hiroki Murata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 71 days.

(21) Appl. No.: 09/964,489

(22) Filed: Sep. 28, 2001

(65) Prior Publication Data
US 2002/0038654 A1 Apr. 4, 2002

(30) Foreign Application Priority Data
Oct. 4, 2000 (JP) ......................................... 2000-305267

(51) Int. Cl.⁷ ............................. F01N 3/00; F02M 25/07
(52) U.S. Cl. ..................... 60/278; 123/568.11; 180/65.2
(58) Field of Search ..................... 123/568.11, 568.16, 123/568.21, 568.19; 180/65.2, 65.3; 60/698, 702, 706, 711, 274, 276, 278, 279

(56) References Cited

U.S. PATENT DOCUMENTS

| | | | |
|---|---|---|---|
| 5,884,476 A | | 3/1999 | Hirota et al. |
| 5,937,639 A | * | 8/1999 | Sasaki et al. ................. 60/278 |
| 6,009,965 A | * | 1/2000 | Takanohashi et al. ....... 180/65.2 |
| 6,109,025 A | * | 8/2000 | Murata et al. ................. 60/297 |
| 6,129,075 A | | 10/2000 | Murata et al. |
| 6,131,388 A | | 10/2000 | Sasaki et al. |
| 6,240,723 B1 | * | 6/2001 | Ito et al. ........................ 60/278 |
| 6,470,850 B1 | * | 10/2002 | Sasaki et al. ................ 123/305 |

FOREIGN PATENT DOCUMENTS

| | | |
|---|---|---|
| JP | 0 803 645 A1 | 10/1997 |
| JP | 0 903 481 A1 | 3/1999 |
| JP | A 11-257054 | 9/1999 |
| JP | A 2000-80954 | 3/2000 |
| JP | A 2000-145506 | 5/2000 |
| JP | A 2000-291462 | 10/2000 |
| WO | WO 98/44245 | 10/1998 |

* cited by examiner

*Primary Examiner*—Andrew M. Dolinar
*Assistant Examiner*—Arnold Castro
(74) *Attorney, Agent, or Firm*—Oliff & Berridge, PLC

(57) ABSTRACT

A compression ignition type engine selectively switching between a first combustion where an amount of recirculated exhaust gas supplied in a combustion chamber (5) is greater than an amount of recirculated exhaust gas where the amount of production of soot peaks and a second combustion where the amount of recirculated exhaust gas supplied in the combustion chamber (5) is smaller than the amount of recirculated exhaust gas where the amount of production of soot peaks. A particulate filter (24) carrying a $NO_x$ absorbent (71) is arranged in the engine exhaust passage. When SOx should be released from the NOx absorbent (71) and there is leeway in the electrical energy stored in the battery (41), the first combustion is performed even when the second combustion should be performed and the drop in output power of the energy is made up by the output torque of an electric motor (37).

11 Claims, 33 Drawing Sheets

COMPRESSION IGNITION TYPE ENGINE

BACKGROUND OF THE INVENTION

1. Field of the Invention

The present invention relates to a compression ignition engine.

2. Description of the Related Art

Known in the art is a compression ignition type engine having an $NO_x$ absorbent arranged in an engine exhaust passage and absorbing $NO_x$ when an air-fuel ratio of an inflowing exhaust gas is lean and releasing the absorbed $NO_x$ when the air-fuel ratio of the inflowing exhaust gas becomes the stoichiometric air-fuel ratio or rich, burning the fuel normally at a lean air-fuel ratio, having the $NO_x$ produced at that time absorbed in the $NO_x$ absorbent, and making the air-fuel ratio temporarily rich when the amount of $NO_x$ absorbed in the $NO_x$ absorbent exceeds a predetermined allowable amount and thereby having the $NO_x$ released from the $NO_x$ absorbent and reduced.

If the air-fuel ratio is made rich in a compression ignition type engine, however, a large amount of soot is produced. Therefore, it is considerably difficult to make the $NO_x$ be released from the $NO_x$ absorbent by making the air-fuel ratio rich.

On the other hand, if the recirculation rate of exhaust gas recirculation gas (hereinafter referred to as "EGR gas") (amount of EGR gas/(amount of intake air+amount of EGR gas)), that is, the EGR rate, of a compression ignition type engine is made over 55 percent, the combustion temperature will fall and so-called low temperature combustion will occur. At that time, it is known that even if the air-fuel ratio is made rich, almost no soot will be produced. Therefore, if the air-fuel ratio is made rich at the time of low temperature combustion in this way, it is possible to release the $NO_x$ from the $NO_x$ absorbent without generating soot.

This low temperature combustion, however, is only possible when the engine load is light. When the engine load rises, low temperature combustion is not possible. Therefore, when the engine load is high, it is not possible to make the air-fuel ratio rich without generating soot.

Accordingly, known in the art is a compression ignition type engine provided with an electric motor for generating a drive power separate from the drive power of the engine, reducing the engine load for low temperature combustion when the air-fuel ratio should be made rich when the engine load is high, and operating the electric motor to compensate for the drop in the engine output due to the drop in engine load (see Japanese Unexamined Patent Publication (Kokai) No. 11-257054).

An electric motor, however, no longer operates well if the amount of electrical energy stored in the battery for driving the electric motor falls. Therefore, when the amount of electrical energy stored in the battery falls, it is necessary to stop the operation of the electric motor. In the above compression ignition type engine, however, no consideration at all is given to the amount of electrical energy stored in the battery, so sometimes the electric motor will not operate well when operating the electric motor. In such a case, the problem will arise of the drive power for the vehicle sharply falling.

SUMMARY OF THE INVENTION

An object of the present invention is to provide a compression ignition type engine capable of properly releasing $NO_x$ and $SO_x$ from the $NO_x$ absorbent by using the drive power of an electric motor.

According to the present invention, there is provided a compression ignition type engine in which an amount of production of soot gradually increases and then peaks when an amount of inert gas in a combustion chamber increases and in which a further increase of the amount of inert gas in the combustion chamber results in a temperature of fuel and surrounding gas in the combustion chamber becoming lower than a temperature of production of soot and therefore almost no production of soot any longer, the engine comprising: an exhaust passage; an $NO_x$ absorbent arranged in the exhaust passage, the $NO_x$ absorbent absorbing $NO_x$ when an air-fuel ratio of inflowing exhaust gas is lean, and releasing the absorbed $NO_x$ when the air-fuel ratio of the inflowing exhaust gas is rich or the stoichiometric air-fuel ratio; switching means for selectively switching between a first combustion where the amount of the inert gas in the combustion chamber is larger than the amount of inert gas where the amount of production of soot peaks and a second combustion where the amount of inert gas in the combustion chamber is smaller than the amount of inert gas where the amount of production of soot peaks; an electric motor for generating a vehicle drive power separate from a drive power of the engine; a battery for driving the electric motor; decision means for deciding if an amount of electrical energy stored in the battery is more than a predetermined amount; and control means for performing the first combustion, making the air-fuel ratio in the combustion chamber rich or the stoichiometric air-fuel ratio, and generating drive power at the electric motor even when the second combustion should be performed when $NO_x$ or $SO_x$ should be released from the $NO_x$ absorbent and the amount of electrical energy stored in the battery is more than the predetermined amount.

BRIEF DESCRIPTION OF THE DRAWINGS

The present invention may be more fully understood from the description of the preferred embodiments of the invention set forth below together with the accompanying drawings, in which:

FIGS. 14A and 14B are views of a map of a target opening degree of a throttle valve etc.;

DESCRIPTION OF THE PREFERRED EMBODIMENTS

Figure 1:
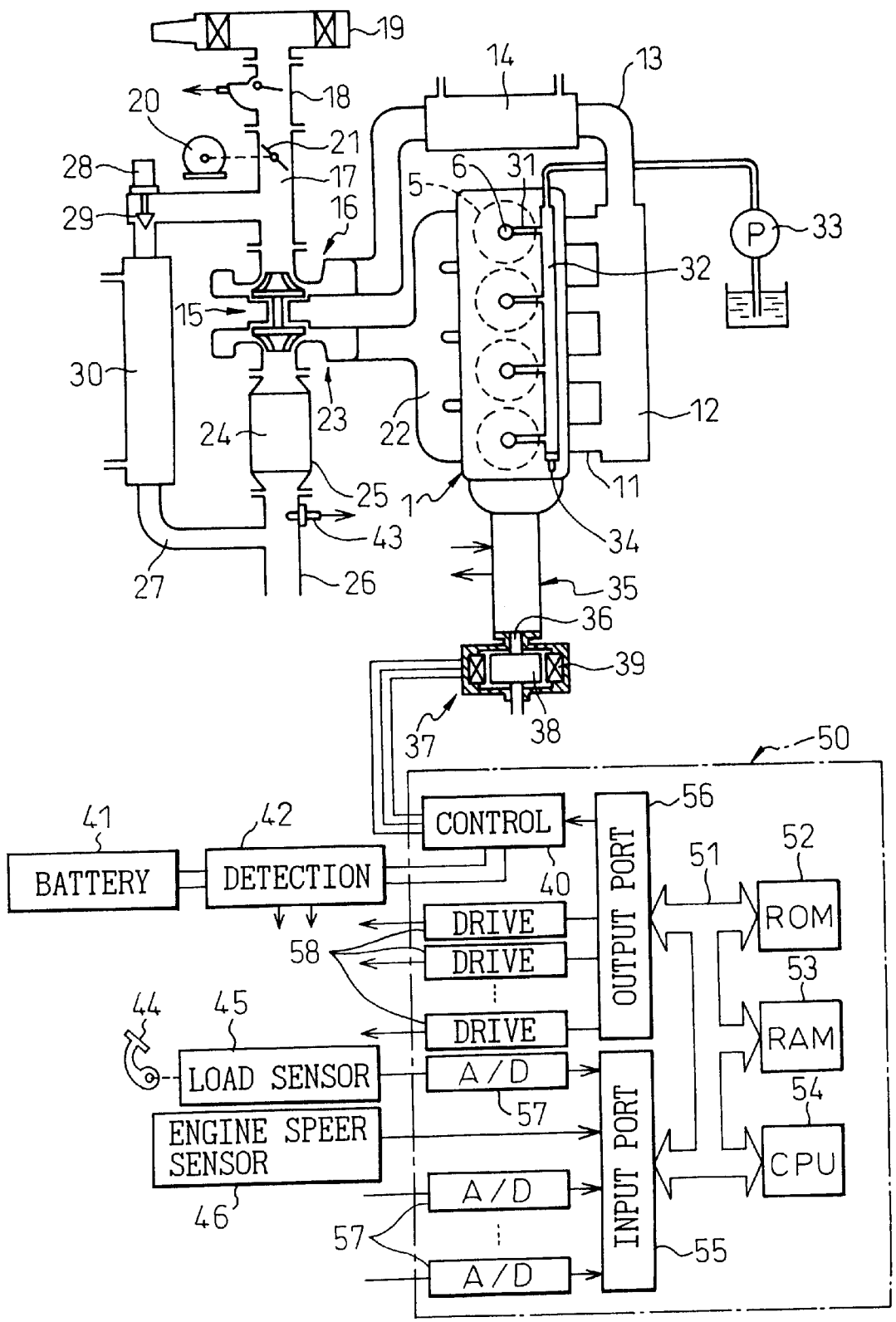
FIG. 1 is an overall view of a compression ignition type engine.
Figure 2:
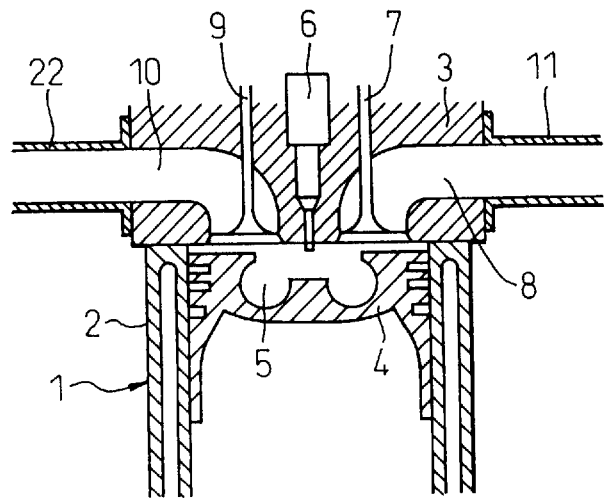
FIG. 2 is a side sectional view of the engine body.

FIG. 1 and FIG. 2 show the case of application of the present invention to a four-stroke compression ignition type engine.

Referring to FIG. 1 and FIG. 2, 1 shows an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake tube 11 to the surge tank 12. The surge tank 12 is connected through an intake duct 13 and an intercooler 14 to an outlet of a compressor 16 of a supercharger, for example, an exhaust turbocharger 15. The inlet of the compressor 16 is connected through an intake duct 17 and air flowmeter 18 to an air cleaner 19. A throttle valve 21 driven by a step motor 20 is arranged in the intake duct 17.

On the other hand, the exhaust port 10 is connected through an exhaust manifold 22 to an inlet of an exhaust turbine 23 of the exhaust turbocharger 15. The outlet of the exhaust turbine 23 is connected to a casing 25 housing a particulate filter 24. An exhaust pipe 26 connected to the outlet of the casing 25 and the intake duct 17 downstream of the throttle valve 21 are connected to each other through an EGR passage 27. Inside the EGR passage 27 is arranged an EGR control valve 29 driven by a step motor 28. Further, inside the EGR passage 27 is arranged an EGR cooler 30 for cooling the EGR gas flowing inside the EGR passage 27. In the embodiment shown in FIG. 1, the engine cooling water is led inside the EGR cooler 30 where the EGR gas is cooled by the engine cooling water.

On the other hand, each fuel injector 6 is connected through a fuel supply tube 31 to the fuel reservoir, that is, a common rail 32. Fuel is supplied to the common rail 32 from an electrically controlled variable discharge fuel pump 33. Fuel supplied in the common rail 32 is supplied through each fuel supply tube 31 to the fuel injectors 6. A fuel pressure sensor 34 for detecting the fuel pressure in the common rail 32 is attached to the common rail 32. The amount of discharge of the fuel pump 33 is controlled based on the output signal of the fuel pressure sensor 34 so that the fuel pressure in the common rail 32 becomes the target fuel pressure.

On the other hand, in the embodiment shown in FIG. 1, the output shaft of the engine is connected to a transmission 35. An electric motor 37 is connected to the output shaft of the transmission 35. In this case, as the transmission 35, it is possible to use an ordinary automatic transmission provided with a torque converter, various types of variable speed transmissions, an automatic transmission of a type enabling automatic clutch operation and gear changing operation in a manual transmission provided with a clutch, or a manual transmission, etc.

Further, the electric motor 37 connected to the output shaft 36 of the transmission 35 comprises a drive power generating apparatus for generating a drive power separate from the drive power of the engine. In the embodiment shown in FIG. 1, the electric motor 37 is comprised of an AC synchronous electric motor provided with a rotor 38 attached on the output shaft 36 of the transmission 35 and comprised of a plurality of permanent magnets attached to its outer circumference and a stator 38 comprised of an exciting coil forming a rotating field. The exciting coil of the stator 39 is connected to a motor drive control circuit 40. The motor drive control circuit 40 is connected to a battery 41 generating a DC high voltage. Between the motor drive control circuit 40 and the battery 41 is arranged a detector 42 for detecting a battery voltage and battery charging and discharging current.

The electronic control unit 50 is comprised of a digital computer and is provided with a read only memory (ROM) 52, a random access memory (RAM) 53, a microprocessor (CPU) 54, an input port 55, and an output port 56. The output signals of the air flowmeter 18, fuel pressure sensor 34, and detector 42 are input through the corresponding AD converters 57 to the input port 55. Inside the exhaust pipe 26 is arranged a temperature sensor 43 for detecting the exhaust gas temperature. The output signal of the temperature sensor 43 is input through the corresponding AD converter 57 to the input port 55. Further, the input port 55 receives as input various signals expressing a gear ratio or gear of the transmission 35, a rotational speed of the output shaft 36, etc.

On the other hand, the accelerator pedal 44 has connected to it a load sensor 45 for generating an output voltage proportional to the amount of depression L of the accelerator pedal 44. The output voltage of the load sensor 45 is input through a corresponding AD converter 57 to the input port 55. Further, the input port 55 has connected to it a crank angle sensor 46 for generating an output pulse each time the crankshaft rotates by for example 15°. On the other hand, the output port 56 has connected to it through a corresponding drive circuit 58 the fuel injector 6, step motor 20, EGR control valve 28, fuel pump 33, transmission 35, and motor drive control circuit 40.

The supply of power to the exciting coil of the stator 39 of the electric motor 37 is normally stopped. At that time, the rotor 38 rotates together with the output shaft 36 of the transmission 37. On the other hand, when driving the electric motor 37, the DC high voltage of the battery 41 is converted by the motor drive control circuit 40 to a three-phase AC current having a frequency fin and a current value Im. This three-phase alternating current is supplied to the exciting coil of the stator 39. The frequency fin is the frequency required for making the rotating field generated by the exciting coil rotate in synchronization with the rotation of the rotor 38. The frequency fin is calculated by the CPU 54 based on the rotational speed of the output shaft 36. In the motor drive control circuit 40, this frequency fin is made the frequency of a three-phase alternating current.

On the other hand, the output torque of the electric motor 37 is substantially proportional to the current value Im of the three-phase alternating current. The current value Im is calculated by the CPU 54 based on the requested output torque of the electric motor 37. In the motor drive control circuit 40, this current value Im is made the current value of the three-phase alternating current.

Further, when the electric motor is in a state driven by outside force, the electric motor 37 operates as a generator. The electric power generated at that time is stored in the battery 41. Whether or not the electric motor 37 should be driven by outside force is judged by the CPU 54. When it is judged that the electric motor 37 is to be driven by outside force, the motor drive control circuit 40 operates so that the electric power generated by the electric motor 37 is stored in the battery 41.

Figure 3:
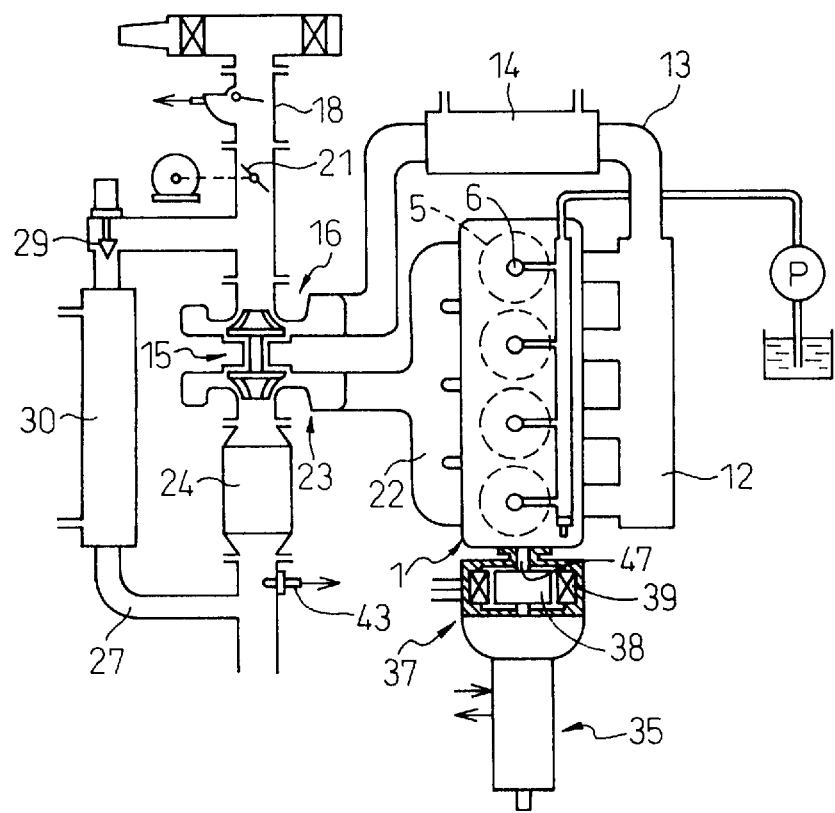
FIG. 3 is an overall view of another embodiment of the compression ignition type engine.

FIG. 3 shows another embodiment of a compression ignition type engine. In this embodiment, the transmission 35 is connected to the output shaft of the electric motor 37. In this embodiment, the rotor 38 of the electric motor 37 is attached to the output shaft 47 of the engine. Therefore, the rotor 38 rotates together with the output shaft 47 of the engine at all times. Further, in this embodiment as well, as the transmission 35, it is possible to use an ordinary automatic transmission provided with a torque converter, various types of variable speed transmissions, an automatic transmission of a type enabling automatic clutch operation and gear changing operation in a manual transmission provided with a clutch, or a manual transmission.

Figure 4:
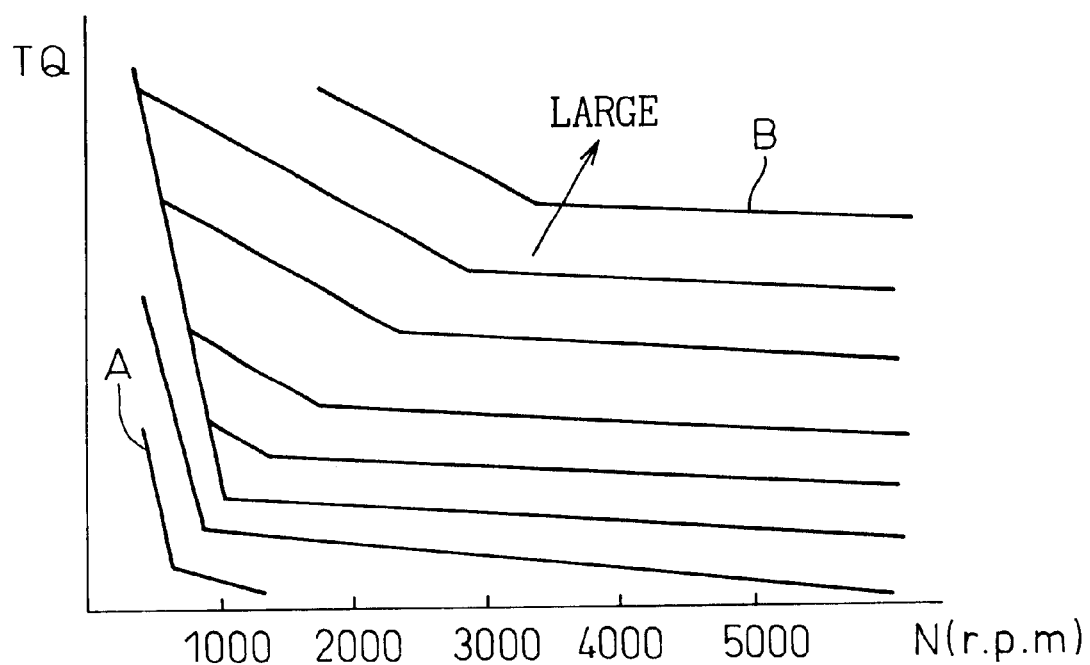
FIG. 4 is a view of a required torque.

The ordinate TQ in FIG. 4 shows the required torque with respect to the engine. The abscissa N shows the engine rotational speed. The solid lines show the relationship between the required torque at the same amount of depression of the accelerator pedal 44 and the engine rotational speed N. Further, the solid line A in FIG. 4 shows when the amount of depression of the accelerator pedal 44 is zero, while the solid line B shows when the amount of depression of the accelerator pedal 44 is maximum. The amount of depression of the accelerator pedal 44 increases from the solid line A to the solid line B. In this embodiment of the present invention, the required torque TQ in accordance with the amount of depression L of the accelerator pedal 44 and the engine rotational speed N is first calculated from the relationship shown in FIG. 4. The amount of fuel injection etc. are calculated based on the required torque TQ.

Now, in this embodiment of the present invention, when the engine load is relatively light, the engine is operated by low temperature combustion where almost no soot is generated. Therefore, first, an explanation will be made of this low temperature combustion where almost no soot is generated.

Figure 5:
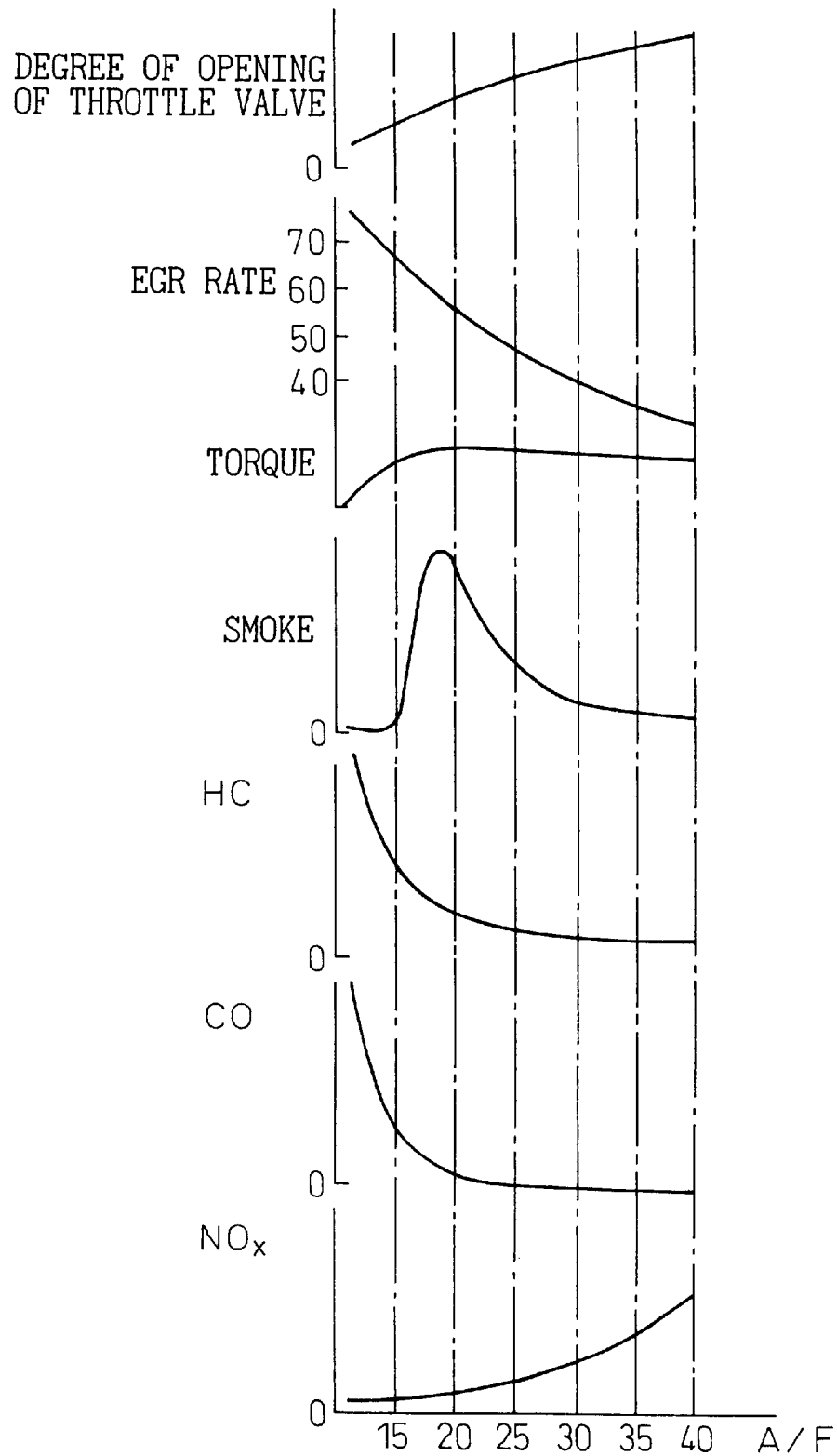
FIG. 5 is a view of the amount of generation of smoke and $NO_x$.

FIG. 5 shows an example of an experiment showing the change in output torque and the change in the amount of exhaust of smoke, hydrocarbons, carbon monoxide, and $NO_x$ when changing the air-fuel ratio A/F (abscissa in FIG. 5) by changing the opening degree of the throttle valve 21 and the EGR rate at the time of low load operation of the engine. As will be understood from FIG. 5, in this experiment, the smaller the air-fuel ratio A/F became, the larger the EGR rate. At the stoichiometric air-fuel ratio ($\approx$14.6) or less, the EGR rate became at least 65 percent.

As shown in FIG. 5, if the air-fuel ratio A/F is made smaller by increasing the EGR rate, the EGR rate becomes close to 40 percent. When the air-fuel ratio A/F becomes about 30, the amount of smoke generated starts to increase. Next, if the EGR rate is further raised and the air-fuel ratio A/F made smaller, the amount of smoke generated rapidly increases then peaks. Next, if the EGR rate is further raised and the air-fuel ratio A/F made smaller, the smoke then rapidly decreases. When the EGR rate is made at least 65 percent and the air-fuel ratio A/F becomes close to 15.0, the smoke produced becomes substantially zero. That is, almost no soot is produced any longer. At this time, the output torque of the engine falls somewhat and the amount of $NO_x$ generated drops considerably. On the other hand, the amounts of hydrocarbons and carbon monoxide generated start to increase.

Figure 6A:
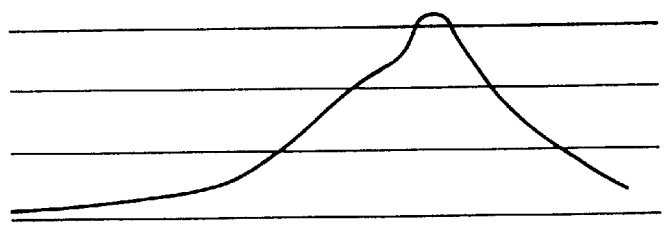
FIGS. 6A and 6B are views of combustion pressure.
Figure 6B:
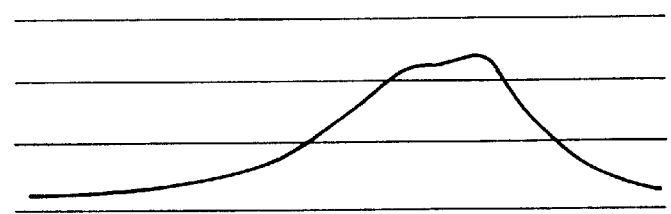

FIG. 6A shows the changes in compression pressure in the combustion chamber 5 when the amount of smoke produced is the greatest near an air-fuel ratio A/F of 21. FIG. 6B shows the changes in compression pressure in the combustion chamber 5 when the amount of smoke produced is substantially zero near an air-fuel ratio A/F of 18. As will be understood from a comparison of FIG. 6A and FIG. 6B, the combustion pressure is lower in the case shown in FIG. 6B where the amount of smoke produced is substantially zero than the case shown in FIG. 6A where the amount of smoke produced is large.

The following may be said from the results of the experiment shown in FIG. 5 and FIGS. 6A and 6B. That is, first, when the air-fuel ratio A/F is less than 15.0 and the amount of smoke produced is substantially zero, the amount of $NO_x$ produced falls considerably as shown in FIG. 5. The fact that the amount of $NO_x$ produced falls means that the combustion temperature in the combustion chamber 5 falls. Therefore, it can be said that when almost no soot is produced, the combustion temperature in the combustion chamber 5 becomes lower. The same thing may be said from FIG. 6B. That is, in the state shown in FIG. 6B where almost no soot is produced, the combustion pressure becomes lower, therefore the combustion temperature in the combustion chamber 5 becomes lower at this time.

Second, when the amount of smoke produced, that is, the amount of soot produced, becomes substantially zero, as shown in FIG. 5, the amounts of hydrocarbons and carbon monoxide exhausted increase. This means that the hydrocarbons are exhausted without growing into soot. That is, when the straight chain hydrocarbons and aromatic hydrocarbons contained in the fuel are raised in temperature in an oxygen poor state, they decompose due to the heat resulting in the formation of a precursor of soot. Next, soot mainly comprised of solid masses of carbon atoms is produced. In this case, the actual process of production of soot is complicated. How the precursor of soot is formed is not clear, but whatever the case, the hydrocarbons contained in the fuel grow to soot through the soot precursor. Therefore, as explained above, when the amount of production of soot becomes substantially zero, the amount of exhaust of hydrocarbons and carbon monoxide increases as shown in FIG. 5, but the hydrocarbons at this time are a soot precursor or a state of hydrocarbons before that.

Summarizing these considerations based on the results of the experiments shown in FIG. 5 and FIGS. 6A and 6B, when the combustion temperature in the combustion chamber 5 is low, the amount of soot produced becomes substantially zero. At this time, a soot precursor or a state of hydrocarbons before that is exhausted from the combustion chamber 5. More detailed experiments and studies were conducted on this. As a result, it was learned that when the temperature of the fuel and the gas around the fuel in the combustion chamber 5 is below a certain temperature, the process of growth of soot stops midway, that is, no soot at all is produced, and that when the temperature of the fuel and its surroundings in the combustion chamber 5 becomes higher than a certain temperature, soot is produced.

The temperature of the fuel and its surroundings when the process of production of hydrocarbons stops in the state of the soot precursor, that is, the above certain temperature, changes depending on various factors such as the type of the fuel, the air-fuel ratio, and the compression ratio, so it cannot be said what degree it is, but this certain temperature is deeply related with the amount of production of $NO_x$. Therefore, this certain temperature can be defined to a certain degree from the amount of production of $NO_x$. That is, the greater the EGR rate, the lower the temperature of the fuel and the gas surrounding it at the time of combustion and the lower the amount of $NO_x$ produced. At this time, when the amount of $NO_x$ produced becomes around 10 ppm or less, almost no soot is produced any more. Therefore, the above certain temperature substantially matches the temperature when the amount of $NO_x$ produced becomes 10 ppm or less.

Once soot is produced, it is impossible to remove it by after-treatment using a catalyst having an oxidation action etc. As opposed to this, a soot precursor or a state of hydrocarbons before this can be easily removed by after-treatment using a catalyst having an oxidation action etc. Considering after-treatment by a catalyst having an oxidation action etc., there is an extremely great difference between whether the hydrocarbons are exhausted from the combustion chamber 5 in the form of a soot precursor or a state before that or exhausted from the combustion chamber 5 in the form of soot.

Now, to stop the growth of hydrocarbons in the state before the production of soot, it is necessary to suppress the temperature of the fuel and the gas around it at the time of combustion in the combustion chamber 5 to a temperature lower than the temperature where soot is produced. In this case, it was learned that the heat absorbing action of the gas around the fuel at the time of combustion of the fuel has an extremely great effect in suppression of the temperature of the fuel and the gas around it.

That is, if there is only air around the fuel, the vaporized fuel will immediately react with the oxygen in the air and burn. In this case, the temperature of the air away from the fuel does not rise that much. Only the temperature around the fuel becomes locally extremely high. That is, at this time, the air away from the fuel does not absorb the heat of combustion of the fuel much at all. In this case, since the combustion temperature becomes extremely high locally, the unburned hydrocarbons receiving the heat of combustion produce soot.

On the other hand, when there is fuel in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises that much. That is, it becomes possible to keep the combustion temperature low. That is, the presence of inert gas plays an important role in the suppression of the combustion temperature. It is possible to keep the combustion temperature low by the heat absorbing action of the inert gas.

In this case, to suppress the temperature of the fuel and the gas around it to a temperature lower than the temperature at which soot is produced, an amount of inert gas enough to absorb an amount of heat sufficient for lowering the temperature is required. Therefore, if the amount of fuel increases, the amount of inert gas required increases along with the same. Note that in this case the larger the specific heat of the inert gas, the stronger the heat absorbing action. Therefore, the inert gas is preferably a gas with a large specific heat. In this regard, since $CO_2$ and EGR gas have relatively large specific heats, it may be said to be preferable to use $CO_2$ or EGR gas as the inert gas.

Figure 7:
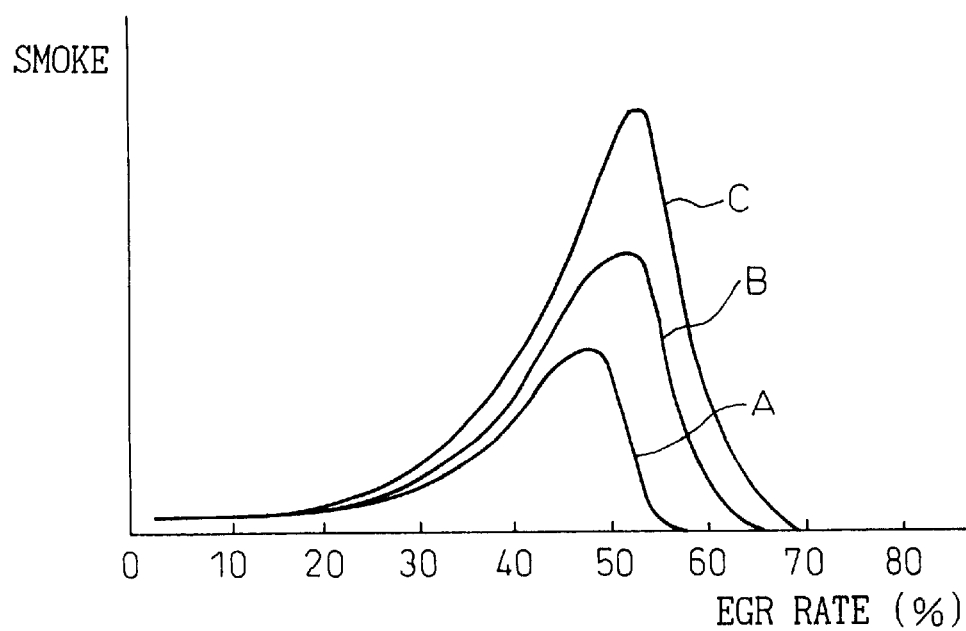
FIG. 7 is a view of the relationship between the amount of smoke produced and the EGR rate.

FIG. 7 shows the relationship between the EGR rate and smoke when changing the degree of cooling of the EGR gas using the EGR gas as an inert gas. That is, in FIG. 7, the curve A shows the case when force cooling the EGR gas to maintain the temperature of the EGR gas at about 90° C., the curve B shows the case when cooling the EGR gas by a small sized cooling device, and the curve C shows the case when not force cooling the EGR gas.

As shown by the curve A in FIG. 7, when force cooling the EGR gas, the amount of soot produced peaks when the EGR rate becomes slightly lower than 50 percent. In this case, almost no soot is produced any longer when the EGR rate is made at least about 55 percent.

On the other hand, as shown by the curve B in FIG. 7, when slightly cooling the EGR gas, the amount of soot produced peaks when the EGR rate becomes slightly higher than 50 percent. In this case, almost no soot is produced any longer when the EGR rate is made at least about 65 percent.

Further, as shown by the curve C in FIG. 7, when not force cooling the EGR gas, the amount of soot produced peaks when the EGR rate is near 55 percent. In this case, almost no soot is produced any longer when the EGR rate is made at least about 70 percent.

Note that FIG. 7 shows the amount of smoke produced when the engine load is relatively high. When the engine load becomes smaller, the EGR rate where the amount of soot produced peaks falls somewhat and the lower limit of the EGR rate where almost no soot is produced any longer falls somewhat as well. In this way, the lower limit of the EGR rate where almost no soot is produced any longer changes in accordance with the degree of cooling of the EGR gas and the engine load.

Figure 8:
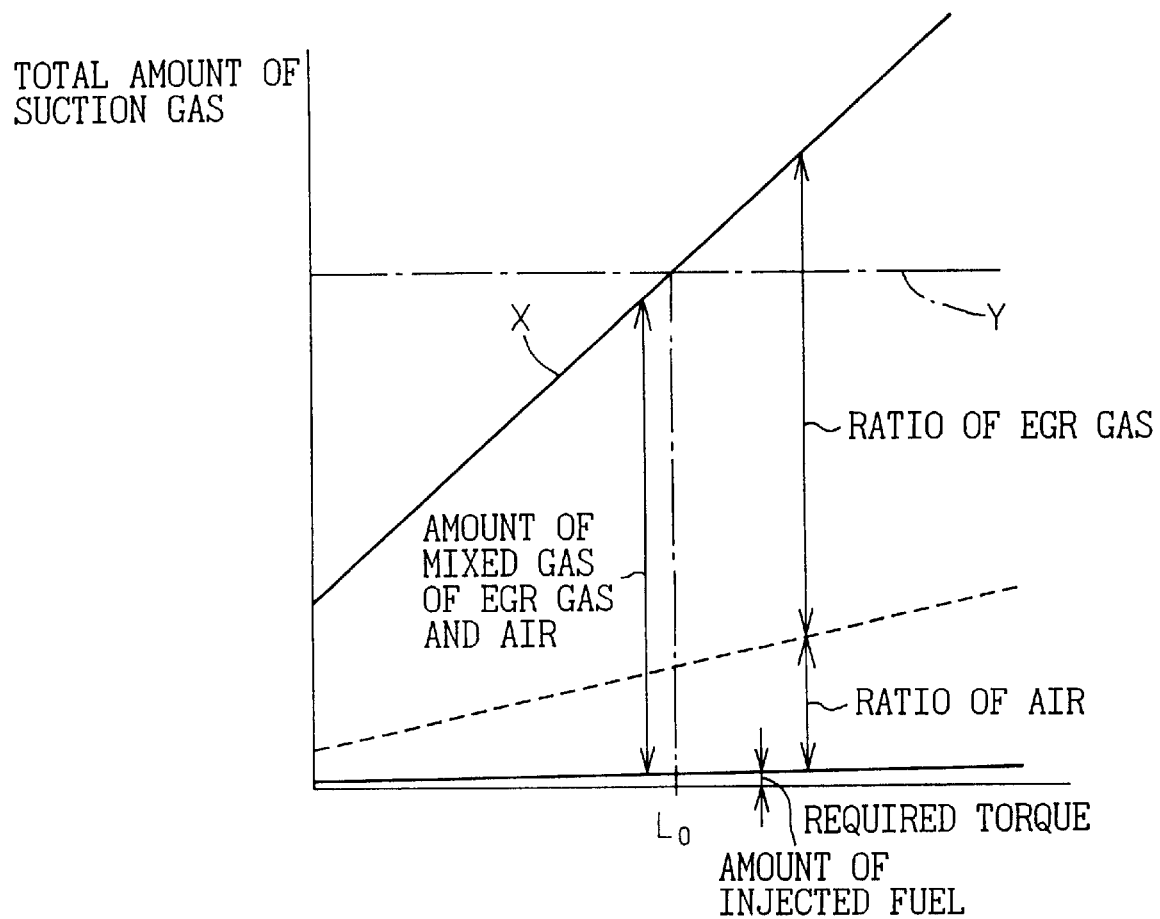
FIG. 8 is a view of the relationship between the amount of injected fuel and the amount of mixed gas.

FIG. 8 shows the amount of mixed gas of EGR gas and air, the ratio of air in the mixed gas, and the ratio of EGR gas in the mixed gas required for making the temperature of the fuel and the gas around it at the time of combustion a temperature lower than the temperature at which soot is produced in the case of use of EGR gas as an inert gas. Note that in FIG. 8, the ordinate shows the total amount of suction gas taken into the combustion chamber 5. The broken line Y shows the total amount of suction gas able to be taken into the combustion chamber 5 when supercharging is not being performed. Further, the abscissa shows the required torque.

Referring to FIG. 8, the ratio of air, that is, the amount of air in the mixed gas, shows the amount of air necessary for causing the injected fuel to completely burn. That is, in the case shown in FIG. 8, the ratio of the amount of air and the amount of injected fuel becomes the stoichiometric air-fuel ratio. On the other hand, in FIG. 8, the ratio of EGR gas, that is, the amount of EGR gas in the mixed gas, shows the minimum amount of EGR gas required for making the temperature of the fuel and the gas around it a temperature lower than the temperature at which soot is produced. This amount of EGR gas is, expressed in terms of the EGR rate, about at least 55 percent and, in the embodiment shown in FIG. 8, is at least 70 percent. That is, if the total amount of suction gas taken into the combustion chamber 5 is made the solid line X in FIG. 8 and the ratio between the amount of air and amount of EGR gas in the total amount of suction gas X is made the ratio shown in FIG. 8, the temperature of the fuel and the gas around it becomes a temperature lower than the temperature at which soot is produced and therefore no soot at all is produced any longer. Further, the amount of $NO_x$ produced at this time is around 10 ppm or less and therefore the amount of $NO_x$ produced becomes extremely small.

If the amount of fuel injected increases, the amount of heat generated at the time of combustion increases, so to maintain the temperature of the fuel and the gas around it at a temperature lower than the temperature at which soot is produced, the amount of heat absorbed by the EGR gas must be increased. Therefore, as shown in FIG. 8, the amount of EGR gas has to be increased the greater the amount of injected fuel. That is, the amount of EGR gas has to be increased as the required load becomes higher.

Note that when not supercharging, the upper limit of the total amount of suction gas taken into the combustion chamber 5 is Y. Therefore, in the region in FIG. 8 where the required torque is larger than $L_0$, the air-fuel ratio cannot be maintained at the stoichiometric air-fuel ratio unless the ratio of EGR gas is reduced as the required torque becomes larger. In other words, when not supercharging, if desiring to maintain the air-fuel ratio at the stoichiometric air-fuel ratio in the region where the required torque is larger than $L_0$, the EGR rate falls as the required torque becomes higher and therefore in the region where the required torque is larger than $L_0$, the temperature of the fuel and the gas around it can no longer be maintained at a temperature lower than the temperature at which soot is produced.

Note that if, as shown in FIG. 1 and FIG. 3, the EGR gas is made to recirculate through the EGR passage 27 to the inlet side of the supercharger, that is, in the intake duct 17 upstream of the compressor 16 of the exhaust turbocharger 15, it is possible to maintain the EGR rate at 55 percent or more, for example, at 70 percent, in the region where the required load is larger than $L_0$ and therefore it is possible to maintain the temperature of the fuel and the gas around it at a temperature lower than the temperature at which soot is produced. That is, if the EGR gas is recirculated so that the EGR rate in the intake duct 17 becomes for example 70 percent, the EGR rate of the suction gas raised in pressure by the compressor 16 of the exhaust turbocharger 15 also becomes 70 percent and therefore it is possible to maintain the temperature of the fuel and the gas around it at a temperature lower than the temperature at which soot is produced to the extent by which pressure can be raised by the compressor 16. Therefore, it becomes possible to enlarge the operating region of the engine at which low temperature combustion can be caused.

Note that in this case, when making the EGR rate at least 55 percent in the region where the required torque is larger than $L_0$, the EGR control valve 29 is made to fully open and the throttle valve 21 is made to close somewhat.

As explained above, FIG. 8 shows the case of combustion of fuel at the stoichiometric air-fuel ratio. Even if the amount of air is made smaller than the amount of air shown in FIG. 8, that is, even if the air-fuel ratio is made rich, it is possible to obstruct the production of soot and make the amount of $NO_x$ produced around 10 ppm or less. Further, even if the amount of air is made greater than the amount of air shown in FIG. 8, that is, the average value of the air-fuel ratio is made a lean of 17 to 18, it is possible to obstruct the production of soot and make the amount of $NO_x$ produced around 10 ppm or less.

That is, when the air-fuel ratio is made rich, the fuel becomes in excess, but since the fuel temperature is suppressed to a low temperature, the excess fuel does not grow into soot and therefore soot is almost never produced. Further, at this time, only an extremely small amount of $NO_x$ is produced. On the other hand, when the average air-fuel ratio is lean or when the air-fuel ratio is the stoichiometric air-fuel ratio, a small amount of soot is produced if the combustion temperature becomes higher, but with the combustion method of the present invention, the combustion temperature is suppressed to a low temperature, so almost no soot is produced. Further, only an extremely small amount of $NO_x$ is produced.

In this way, at the time of low temperature combustion, regardless of the air-fuel ratio, that is, whether the air-fuel ratio is rich or the stoichiometric air-fuel ratio or the average air-fuel ratio is lean, almost no soot is produced and the amount of $NO_x$ produced becomes extremely small. Therefore, considering the improvement of the fuel efficiency, it may be said to be preferable to make the average air-fuel ratio lean.

On the other hand, at the time of low temperature combustion, the temperature of the fuel and the gas around it becomes lower, but the temperature of the exhaust gas rises. This will be explained with reference to FIGS. 9A and 9B.

Figure 9A:
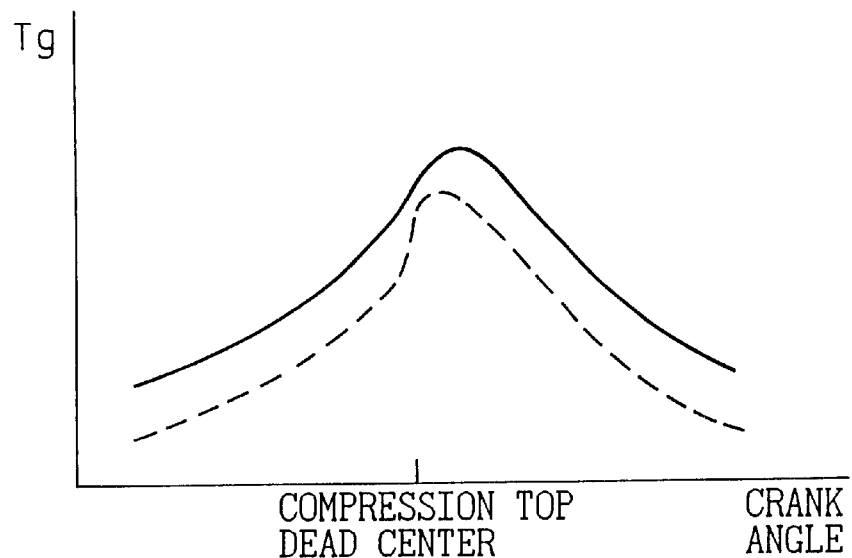
FIGS. 9A and 9B are views of the gas temperature etc. in a combustion chamber.
Figure 9B:
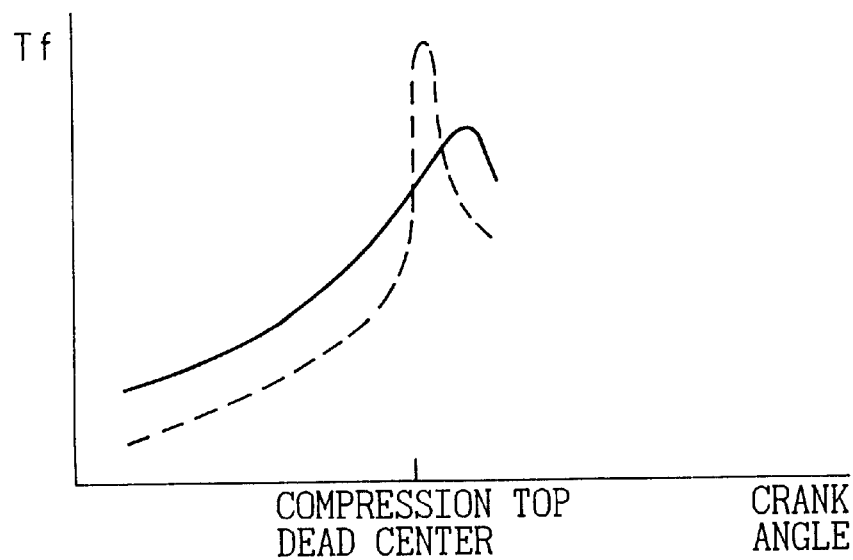

The solid line in FIG. 9A shows the relationship between the average gas temperature Tg in the combustion chamber 5 and the crank angle when low temperature combustion is performed. The broken line in FIG. 9A shows the relationship between the average gas temperature Tg in the combustion chamber 5 and the crank angle when ordinary combustion is performed. Further, the solid line in FIG. 9B shows the relationship between the temperature Tf of the fuel and the gas surrounding it and the crank angle when low temperature combustion is being performed. The broken line in FIG. 9B shows the relationship between the temperature Tf of the fuel and the gas surrounding it and the crank angle when ordinary combustion is being performed.

When low temperature combustion is being performed, the amount of EGR gas is larger compared with when ordinary combustion is being performed, therefore as shown in FIG. 9A, before top dead center of the compression stroke, that is, during the compression stroke, the average temperature Tg of the gas at the time of the low temperature combustion shown by the solid line becomes higher than the average temperature Tg of the gas at the time of the ordinary combustion shown by the broken line. Note that at this time, as shown by FIG. 9B, the temperature Tf of the fuel and the gas around it becomes substantially the same temperature as the average temperature Tg of the gas.

Next, combustion is started near top dead center of the compression stroke, but in this case, when low temperature combustion is being performed, as shown by the solid line in FIG. 9B, the temperature Tf of the fuel and the gas around it does not become that high due to the heat absorbing action of the EGR gas. As opposed to this, when ordinary combustion is being performed, as shown by the broken line in FIG. 9B, the temperature Tf of the fuel and the gas around it becomes extremely high due to the presence of a large amount of oxygen around the fuel. When ordinary combustion is being performed in this way, the temperature Tf of the fuel and the gas around it becomes considerably higher than when low temperature combustion is being performed, but the temperature of the other gas, constituting the major part, becomes lower when ordinary combustion is being performed compared with when low temperature combustion is being performed. Therefore, as shown by FIG. 9A, the average temperature Tg of the gas in the combustion chamber 5 near top dead center of the compression stroke becomes higher when low temperature combustion is being performed compared with when ordinary combustion is being performed. As a result, as shown by FIG. 9A, the temperature of the burned gas in the combustion chamber 5 after the end of combustion becomes higher when low temperature combustion is being performed compared with when ordinary combustion is being performed. Therefore if low temperature combustion is performed, the temperature of the exhaust gas rises.

Figure 10:
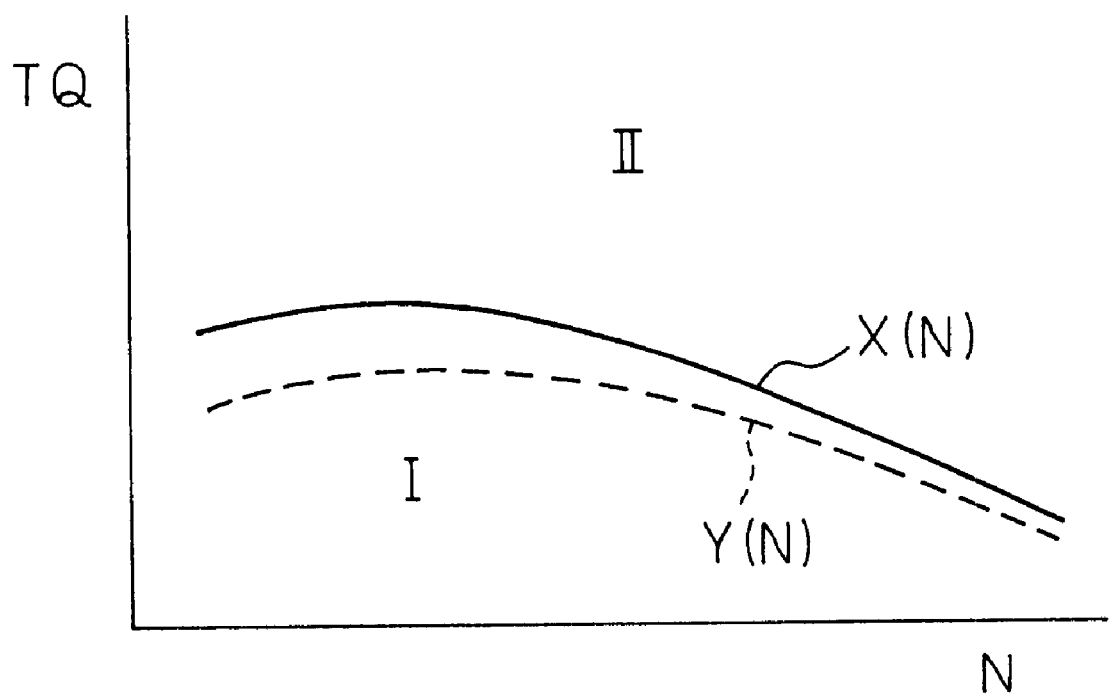
FIG. 10 is a view of a first operating region I and a second operating region II.

It is however only possible to suppress the temperature of the fuel and the gas surrounding it at the time of combustion in the combustion chamber to less than the temperature where the growth of the hydrocarbons is stopped midway at the time of a relatively low engine load operation where the amount of heat generated by the combustion is relatively small. Accordingly, in this embodiment of the present invention, when the engine is operating at medium or low load, the temperature of the fuel and the gas surrounding it is suppressed to less than the temperature where the growth of the hydrocarbons stops midway and first combustion, that is, low temperature combustion, is performed. When the engine is operating at a high load, second combustion, that is, the conventionally normally performed combustion, is performed. Note that the first combustion, that is, the low temperature combustion, as clear from the explanation up to here, means combustion where the amount of inert gas in the combustion chamber is larger than the amount of inert gas where the amount of production of the soot peaks and where almost no soot is produced, while the second combustion, that is, the conventionally normally performed combustion, means combustion where the amount of inert gas in the combustion chamber is smaller than the amount of inert gas where the amount of production of soot peaks. FIG. 10 shows a first operating region I where the first combustion, that is, the low temperature combustion, is performed and a second operating region II where the second combustion, that is, the combustion by the conventional combustion method, is performed. Note that in FIG. 10, the abscissa TQ shows the required torque, and the ordinate N shows the engine rotational speed. Further, in FIG. 10, X(N) shows a first boundary between the first operating region I and the second operating region II, while Y(N) shows a second boundary between the first operating region I and the second operating region II. The change of the operating region from the first operating region I to the second operating region II is judged based on the first boundary X(N), while the change of the operating region from the second operating region II to the first operating region I is judged based on the second boundary Y(N).

That is, when the engine is operating in the state of the first operating region I and low temperature combustion is being performed, if the required torque TQ exceeds the first boundary X(N), which is a function of the engine rotational speed N, it is judged that the operating region has shifted to the second operating region II and combustion is performed by the conventional combustion method. Next, when the required torque TQ falls below the second boundary Y(N), which is a function of the engine rotational speed N, it is judged that the operating region has shifted to the first operating region I and low temperature combustion is again performed.

The two boundaries, that is, the first boundary X(N) and the second boundary Y(N) at the lower load side from the first boundary X(N), are provided for the following two reasons. The first reason is that at the high load side of the second operating region II, the combustion temperature is relatively high and even if the required torque TQ becomes lower than the first boundary X(N) at that time, low temperature combustion cannot be performed immediately. That is, unless the required torque TQ becomes considerably low, that is, becomes lower than the second boundary Y(N), low temperature combustion cannot be started immediately. The second reason is to provide hysteresis with respect to the change of the operating regions between the first operating region I and the second operating region II.

Next, a brief explanation will be given of control of the operation in the first operating region I and the second operating region II with reference to FIG. 11.

Figure 11:
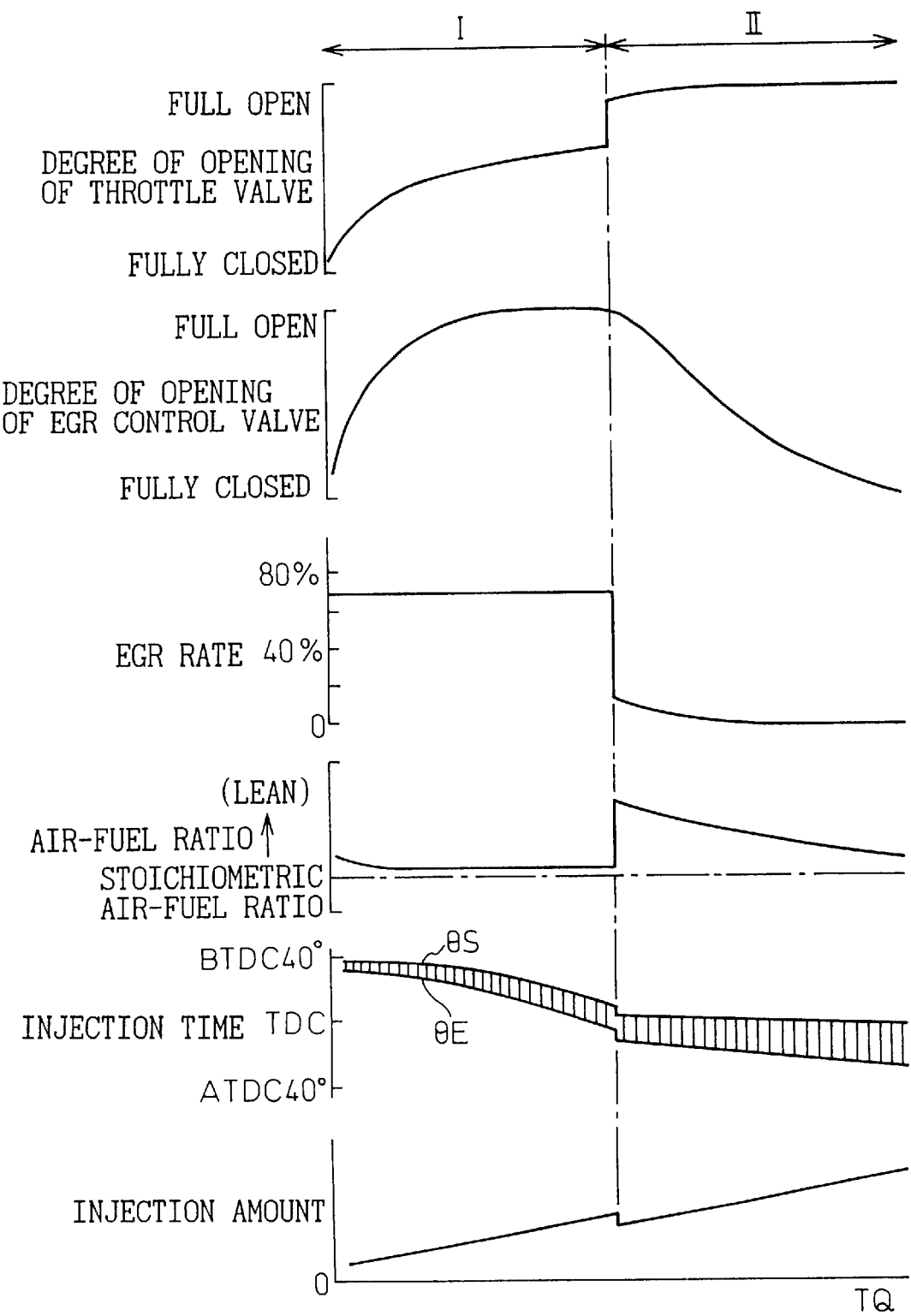
FIG. 11 is a view of the opening degree of a throttle valve etc.

FIG. 11 shows the opening degree of the throttle valve 21, the opening degree of the EGR control valve 29, the EGR rate, the air-fuel ratio, the injection timing, and the amount of injection with respect to the required torque TQ. As shown in FIG. 11, in the first operating region I with the low required torque TQ, the opening degree of the throttle valve 21 is gradually increased from close to the fully closed state to the ⅔ opened state as the required torque TQ becomes higher, while the opening degree of the EGR control valve 29 is gradually increased from close to the fully closed state to the fully opened state as the required torque TQ becomes higher. Further, in the example shown in FIG. 11, in the first operating region I, the EGR rate is made about 70 percent and the air-fuel ratio is made a slightly lean air-fuel ratio.

In other words, in the first operating region I, the opening degree of the throttle valve 21 and the opening degree of the EGR control valve 29 are controlled so that the EGR rate becomes about 70 percent and the air-fuel ratio becomes a slightly lean air-fuel ratio. Further, in the first operating region I, the fuel is injected before top dead center of the compression stroke TDC. In this case, the injection start timing θS becomes later the higher the required torque TQ. The injection end timing θE also becomes later the later the injection start timing θS.

Note that, during idling operation, the throttle valve 21 is made to close to close to the fully closed state. At this time, the EGR control valve 29 is also made to close to close to the fully closed state. If the throttle valve 21 closes to close to the fully closed state, the pressure in the combustion chamber 5 at the start of compression will become low, so the compression pressure will become small. If the compression pressure becomes small, the amount of compression work by the piston 4 becomes small, so the vibration of the engine body 1 becomes smaller. That is, during idling operation, the throttle valve 21 can be closed to close to the fully closed state to suppress vibration in the engine body 1.

On the other hand, when the engine operating state changes from the first operating region I to the second operating region II, the opening degree of the throttle valve 21 is made to increase in steps from the ⅔ opened state to the fully opened state. At this time, in the example shown in FIG. 11, the EGR rate is made to be reduced in steps from about 70 percent to not more than 40 percent and the air-fuel ratio is enlarged in steps. That is, since the EGR rate jumps over the range of EGR rate where a large amount of smoke is produced (FIG. 7), a large amount of smoke is no longer produced when the engine operating region changes from the first operating region I to the second operating region II.

In the second operating region II, the second combustion, that is, the conventionally performed combustion, is performed. In this combustion method, some soot and $NO_x$ are produced, but the heat efficiency is higher than with low temperature combustion and therefore when the engine operating region changes from the first operating region I to the second operating region II, as shown in FIG. 11, the amount of injection is made to be reduced in steps. At the second operating region II, the throttle valve 21 is except in some cases held in the fully opened state and the opening degree of the EGR control valve 29 is made smaller the higher the required torque TQ. Further, at the second operating region, the EGR rate becomes lower the higher the required torque TQ and the air-fuel ratio becomes smaller the higher the required torque TQ. Even if the required torque TQ becomes high, however, the air-fuel ratio is made a lean air-fuel ratio. Further, in the second operating region II, the injection start timing θS is made close to the top dead center of the compression stroke TDC.

Figure 12:
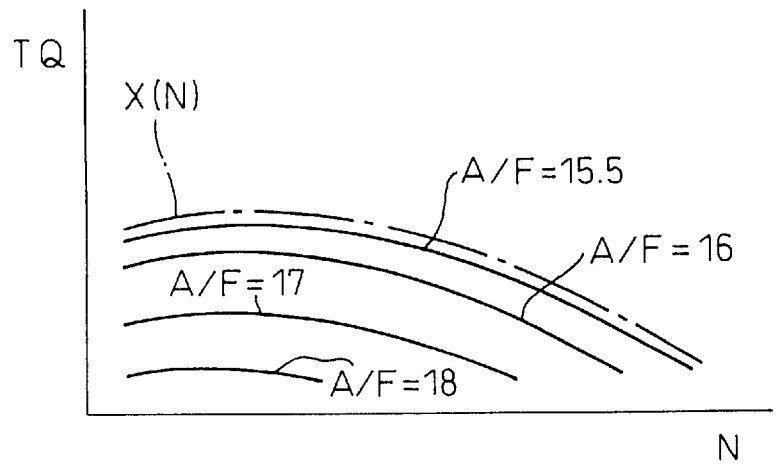
FIG. 12 is a view of the air-fuel ratio in the first operating region I.

FIG. 12 shows the air-fuel ratio A/F in the first operating region I. In FIG. 12, the curves shown by A/F=15.5, A/F=16, A/F=17, and A/F=18 show when the air-fuel ratio is 15.5, 16, 17, and 18. The air-fuel ratios of the curves are determined by proportional distribution. As shown in FIG. 12, in the first operating region, the air-fuel ratio becomes lean. Further, in the first operating region I, the air-fuel ratio A/F is made leaner the lower the required torque TQ.

That is, the lower the required torque TQ, the smaller the amount of heat generated by the combustion. Accordingly, the lower the required torque TQ, the more low temperature combustion can be performed even if the EGR rate is lowered. If the EGR rate is lowered, the air-fuel ratio becomes larger. Therefore, as shown in FIG. 12, the air-fuel ratio A/F is made larger as the required torque TQ becomes lower. The larger the air-fuel ratio A/F becomes, the more improved the fuel efficiency. Therefore to make the air-fuel ratio as lean as possible, in the embodiment according to the present invention, the air-fuel ratio A/F is made larger the lower the required torque TQ becomes.

Figure 13A:
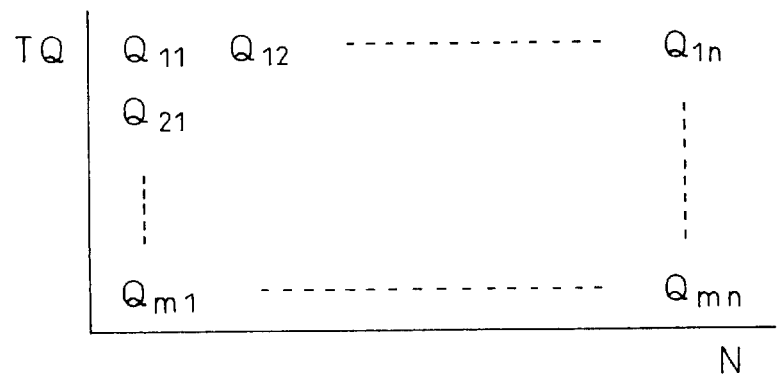
FIGS. 13A and 13B are views of a map of an amount of injection etc.
Figure 13B:
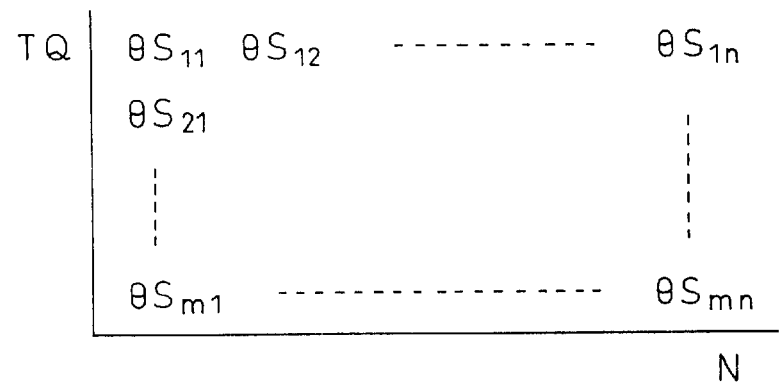

The amount of injection Q in the first operating region I is stored in advance in the ROM 52 in the form of a map as a function of the required torque TQ and the engine rotational speed N as shown in FIG. 13A. The injection start timing θS in the first operating region I, as shown in FIG. 13B, is stored in advance in the ROM 52 in the form of a map as a function of the required torque TQ and engine rotational speed N.

Further, the target opening degree ST of the throttle valve 21 necessary for making the air-fuel ratio the target air-fuel ratio A/F shown in FIG. 12 according to the engine operating state and making the EGR rate the target EGR rate according to the engine operating state is stored in advance in the ROM 52 in the form of a map as a function of the required torque TQ and the engine rotational speed N as shown in FIG. 14A. The target opening degree SE of the EGR valve 29 necessary for making the air-fuel ratio the target air-fuel ratio A/F shown in FIG. 12 according to the engine operating state and making the EGR rate the target EGR rate according to the engine operating state is stored in advance in the ROM 52 in the form of a map as a function of the required torque TQ and the engine rotational speed N as shown in FIG. 14B.

Figure 15:
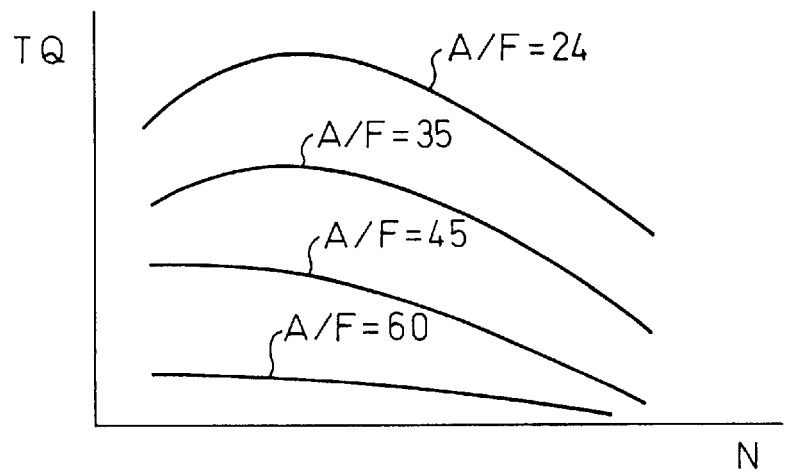
FIG. 15 is a view of an air-fuel ratio in a second combustion etc.

FIG. 15 shows the target air-fuel ratio at the time of the second combustion, that is, normal combustion by the conventional combustion method. Note that in FIG. 15, the curves indicated by A/F=24, A/F=35, A/F=45, and A/F=60 respectively show the target air-fuel ratios 24, 35, 45, and 60.

Figure 16A:
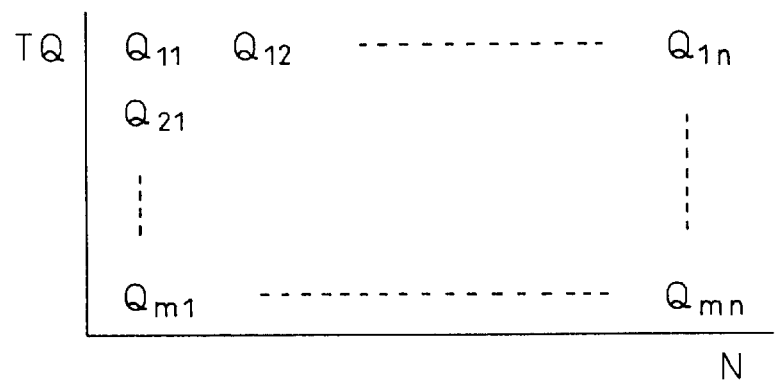
FIGS. 16A and 16B are a map of an amount of injection etc.
Figure 16B:
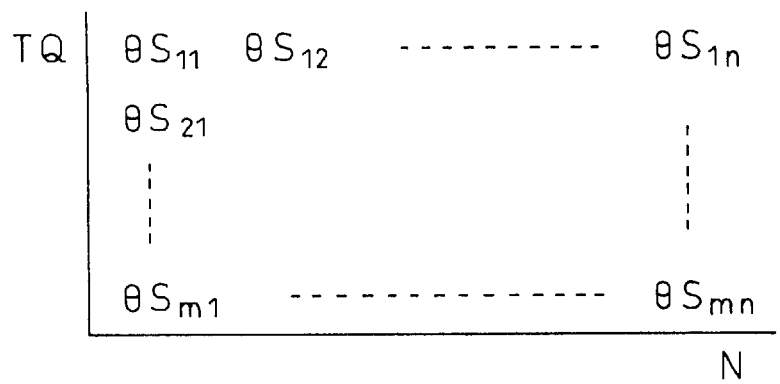

The amount of injection Q at the time of the second combustion is stored in advance in the ROM 52 in the form of a map as a function of the required torque TQ and the engine rotational speed N as shown in FIG. 16A. The injection start timing θS at the time of the second combustion is stored in advance in the ROM 52 in the form of a map as a function of the required torque TQ and the engine rotational speed N as shown in FIG. 16B.

Figure 17A:
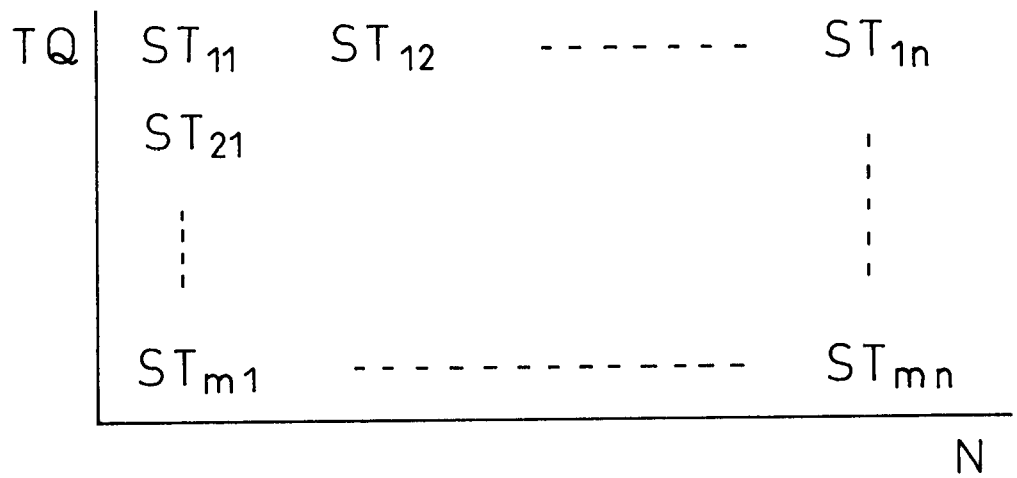
FIGS. 17A and 17B are views of a target opening degree of a throttle valve etc.
Figure 17B:
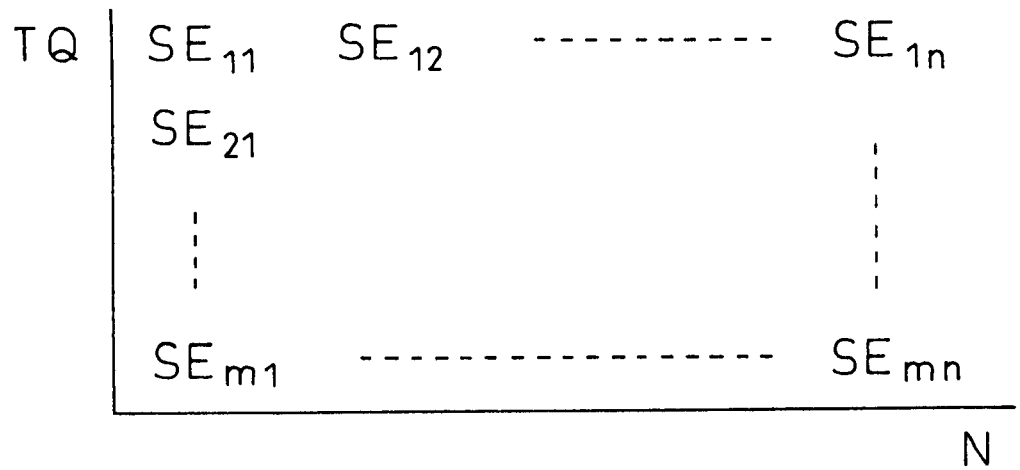

Further, the target opening degree ST of the throttle valve 21 necessary for making the air-fuel ratio the target air-fuel ratio A/F shown in FIG. 15 according to the engine operating state and making the EGR rate the target EGR rate according to the engine operating state is stored in advance in the ROM 52 in the form of a map as a function of the required torque TQ and the engine rotational speed N as shown in FIG. 17A. The target opening degree SE of the EGR valve 29 necessary for making the air-fuel ratio the target air-fuel ratio A/F shown in FIG. 15 according to the engine operating state and making the EGR rate the target EGR rate according to the engine operating state is stored in advance in the ROM 52 in the form of a map as a function of the required torque TQ and the engine rotational speed N as shown in FIG. 17B.

Figure 18A:
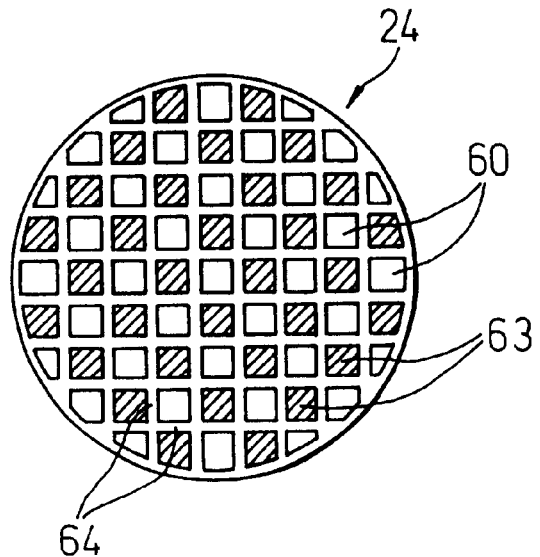
FIGS. 18A and 18B are views of a particulate filter.
Figure 18B:
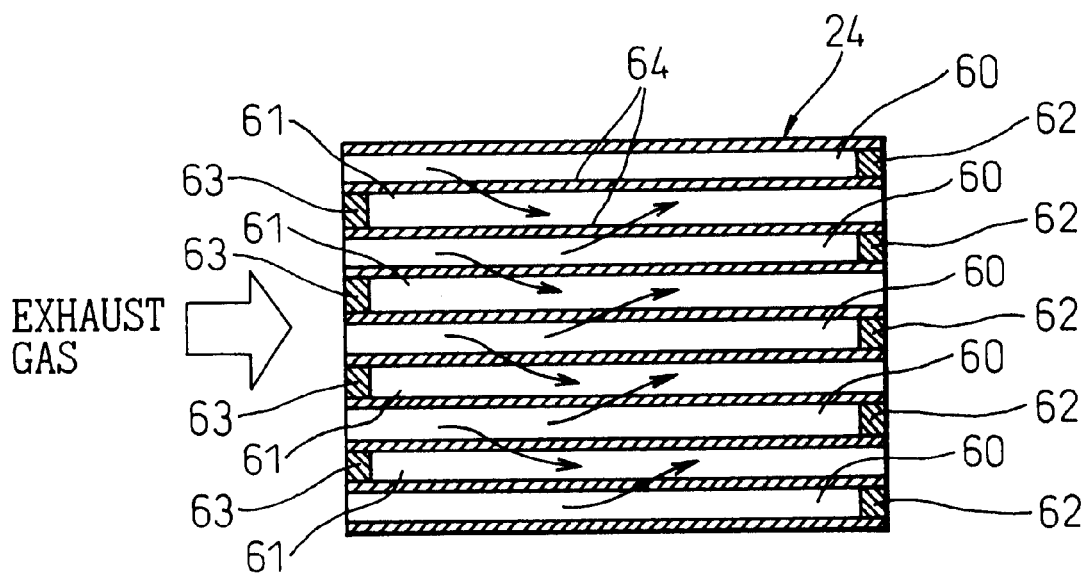

Next, an explanation will be given of the structure of the particulate filter 24 accommodated in the casing 25 in FIG. 1 and FIG. 3 with reference to FIGS. 18A and 18B. Note that FIG. 18A is a front view of the particulate filter 24, while FIG. 18B is a side sectional view of the particulate filter. As shown in FIGS. 18A and 18B, the particulate filter 24 forms a honeycomb structure and is provided with a plurality of exhaust circulation passages 60 and 61 extending in parallel with each other. These exhaust circulation passages are comprised by exhaust gas inflow passages 60 with one ends sealed by plugs 62 and exhaust gas outflow passages 61 with other ends sealed by plugs 63. Note that the hatched portions in FIG. 18A show plugs 63. Therefore, the exhaust gas inflow passages 60 and the exhaust gas outflow passages 61 are arranged alternately through thin wall partitions 64. In other words, the exhaust gas inflow passages 60 and the exhaust gas outflow passages 61 are arranged so that each exhaust gas inflow passage 60 is surrounded by four exhaust gas outflow passages 61, and each exhaust gas outflow passage 61 is surrounded by four exhaust gas inflow passages 60.

The particulate filter 24 is formed from a porous material such as for example cordierite. Therefore, when exhaust gas is sent into the particulate filter from the X-direction in FIG.

18B, the exhaust gas flowing into the exhaust gas inflow passages 60 flows out into the adjoining exhaust gas outflow passages 61 through the surrounding partitions 64 as shown by the arrows.

In this embodiment of the present invention, a layer of a carrier comprised of for example alumina is formed on the peripheral surfaces of the exhaust gas passages 60 and 61, that is, the two side surfaces of the partitions 64 and the inside walls of the fine holes in the partitions 64. On the carrier are carried a precious metal catalyst and an active oxygen release agent which absorbs the oxygen and holds the oxygen if excess oxygen is present in the surroundings and releases the held oxygen in the form of active oxygen if the concentration of the oxygen in the surroundings falls.

In this case, in this embodiment according to the present invention, platinum Pt is used as the precious metal catalyst. As the active oxygen release agent, use is made of at least one of an alkali metal such as potassium K, sodium Na, lithium Li, cesium Cs, and rubidium Rb, an alkali earth metal such as barium Ba, calcium Ca, and strontium Sr, a rare earth such as lanthanum La, yttrium Y, and cerium Ce, and a transition metal.

Note that in this case, as the active oxygen release agent, use is preferably made of an alkali metal or an alkali earth metal with a higher tendency of ionization than calcium Ca, that is, potassium K, lithium Li, cesium Cs, rubidium Rb, barium Ba, and strontium Sr.

Next, the action of removal of the particulate in the exhaust gas by the particulate filter 24 will be explained taking as an example the case of carrying platinum Pt and potassium K on a carrier, but the same type of action for removal of particulate is performed even when using another precious metal, alkali metal, alkali earth metal, rare earth, and transition metal.

In a compression ignition type engine such as shown in FIG. 1 and FIG. 3, combustion occurs even under an excess of air. Therefore, the exhaust gas contains a large amount of excess air. That is, if the ratio of the air and fuel fed into the intake passage, combustion chamber 5, and exhaust passage is called the air-fuel ratio of the exhaust gas, then in a compression ignition type engine such as shown in FIG. 1 and FIG. 3, the air-fuel ratio of the exhaust gas becomes lean. Further, in the combustion chamber 5, NO is generated, so the exhaust gas contains NO. Further, the fuel contains sulfur S. This sulfur S reacts with the oxygen in the combustion chamber 5 to become $SO_2$. Therefore, the fuel contains $SO_2$. Accordingly, when exhaust gas is fed into the exhaust gas inflow passages 60 of the particulate filter 24, exhaust gas containing excess oxygen, NO, and $SO_2$ flows into the exhaust gas inflow passages 60 of the particulate filter 24.

Figure 19A:
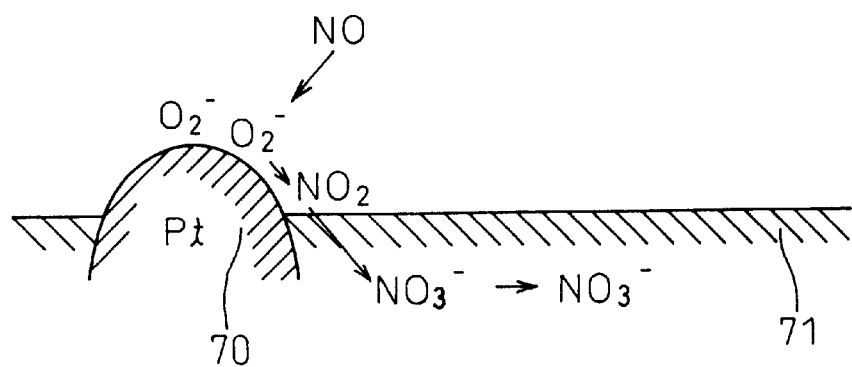
FIGS. 19A and 19B are views for explaining an oxidation action of particulate.
Figure 19B:
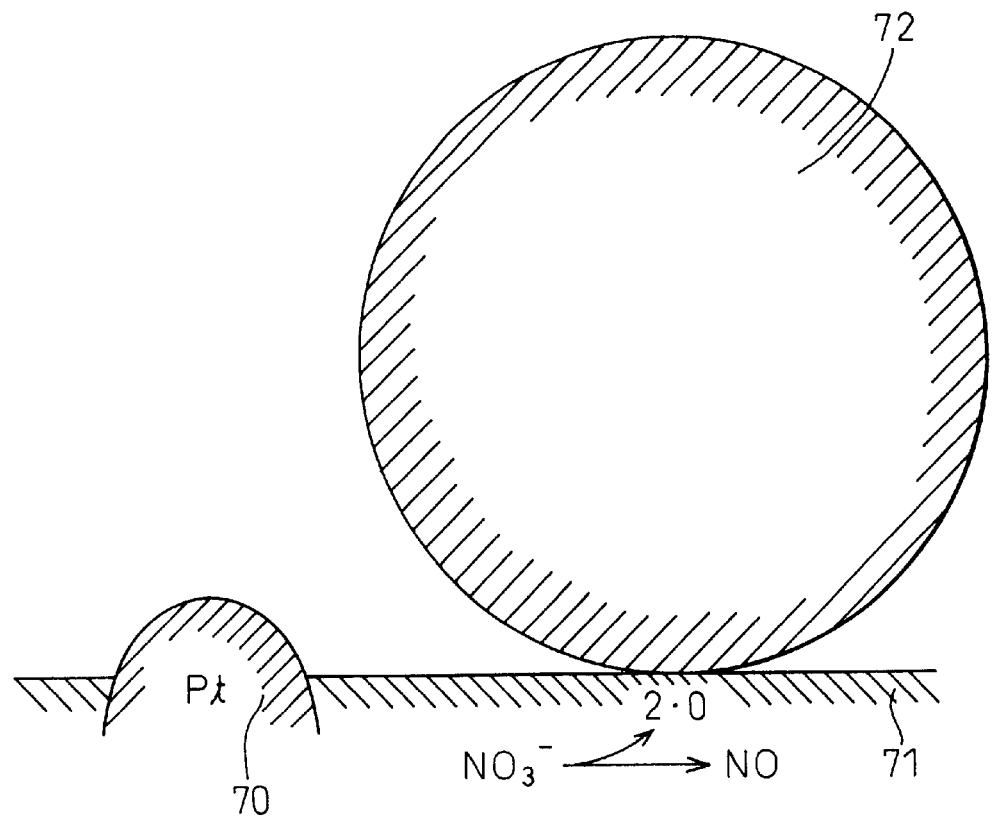

FIGS. 19A and 19B are enlarged views of the surface of the carrier layer formed on the inner peripheral surfaces of the exhaust gas inflow passages 60 and the inside walls of the fine holes in the partitions 64. Note that in FIGS. 19A and 19B, 70 indicates particles of platinum Pt, while 71 indicates the active oxygen release agent containing potassium K.

In this way, since a large amount of excess oxygen is contained in the exhaust gas, if the exhaust gas flows into the exhaust gas inflow passages 60 of the particulate filter 24, as shown in FIG. 19A, the oxygen $O_2$ adheres to the surface of the platinum Pt in the form of $O_2^-$ or $O^{2-}$. On the other hand, the NO in the exhaust gas reacts with the $O_2^-$ or $O^{2-}$ on the surface of the platinum Pt to become $NO_2$ ($2NO + O_2 \rightarrow 2NO_2$). Next, part of the $NO_2$ which is produced is absorbed in the active oxygen release agent 71 while being oxidized on the platinum Pt and diffuses in the active oxygen release agent 71 in the form of nitrate ions $NO_3^-$ as shown in FIG. 19A. Part of the nitrate ions $NO_3^-$ produces potassium nitrate $KNO_3$.

On the other hand, as explained above, the exhaust gas also contains $SO_2$. This $SO_2$ is absorbed in the active oxygen release agent 71 by a mechanism similar to that of NO. That is, in the above way, the oxygen $O_2$ adheres to the surface of the platinum Pt in the form of $O_2^-$ or $O^{2-}$. The $SO_2$ in the exhaust gas reacts with the $O_2^-$ or $O^{2-}$ on the surface of the platinum Pt to become $SO_x$. Next, part of the $SO_3$ which is produced is absorbed in the active oxygen release agent 71 while being oxidized on the platinum Pt and diffuses in the active oxygen release agent 71 in the form of sulfate ions $SO_4^{2-}$ while bonding with the potassium K to produce potassium sulfate $K_2SO_4$. In this way, potassium nitrate $KNO_3$ and potassium sulfate $K_2SO_4$ are produced in the active oxygen release agent 71.

On the other hand, particulate comprised of mainly carbon, that is, soot, is produced in the combustion chamber 5. Therefore, the exhaust gas contains this particulate. As mentioned before, however, at the time of low temperature combustion, the amount of particulate in the exhaust gas becomes extremely small. Whatever the case, the particulate contained in the exhaust gas contacts and adheres to the surface of the carrier layer, for example, the surface of the active oxygen release agent 71, as shown in FIG. 19B when the exhaust gas is flowing through the exhaust gas inflow passages 60 of the particulate filter 24 or when flowing from the exhaust gas inflow passages 60 to the exhaust gas outflow passages 61.

If the particulate 72 adheres to the surface of the active oxygen release agent 71 in this way, the concentration of oxygen at the contact surface of the particulate 72 and the active oxygen release agent 71 falls. If the concentration of oxygen falls, a difference in concentration occurs with the inside of the high oxygen concentration active oxygen release agent 71 and therefore the oxygen in the active oxygen release agent 71 moves toward the contact surface between the particulate 72 and the active oxygen release agent 71. As a result, the potassium nitrate $KNO_3$ formed in the active oxygen release agent 71 is broken down into potassium K, oxygen O, and NO. The oxygen O heads toward the contact surface between the particulate 72 and the active oxygen release agent 71, while the NO is released from the active oxygen release agent 71 to the outside. The NO released to the outside is oxidized on the downstream side platinum Pt and is again absorbed in the active oxygen release agent 71.

On the other hand, at this time, if the temperature of the active oxygen release agent 71 is high, the potassium sulfate $K_2SO_4$ formed in the active oxygen release agent 71 is also broken down into potassium K, oxygen O, and $SO_2$. The oxygen O heads toward the contact surface between the particulate 72 and the active oxygen release agent 71, while the $SO_2$ is released from the active oxygen release agent 71 to the outside. The $SO_2$ released to the outside is oxidized on the downstream side platinum Pt and again absorbed in the active oxygen release agent 71.

On the other hand, the oxygen O heading toward the contact surface between the particulate 72 and the active oxygen release agent 71 is the oxygen broken down from compounds such as potassium nitrate $KNO_3$ or potassium sulfate $K_2SO_4$. The oxygen O broken down from these compounds has a high energy and has an extremely high activity. Therefore, the oxygen heading toward the contact surface between the particulate 72 and the active oxygen release agent 71 becomes active oxygen O. If this active oxygen O contacts the particulate 72, the particulate 72 is oxidized without emitting a luminous flame in a short period and the particulate 72 is completely eliminated. Note that the particulate 72 deposited on the particulate filter 24 in this way is oxidized by the active oxygen O, but the particulate 72 is also oxidized by the oxygen in the exhaust gas.

When the particulate deposited in layers on the particulate filter 24 is burned, the particulate filter 24 becomes red hot and burns along with a flame. This burning along with a flame does not continue unless the temperature is high. Therefore, to continue burning along with such flame, the temperature of the particulate filter 24 must be maintained at a high temperature.

As opposed to this, in the present invention, the particulate 72 is oxidized without emitting a luminous flame as explained above. At this time, the surface of the particulate filter 24 does not become red hot. That is, in other words, in this embodiment of the present invention, the particulate 72 is removed by oxidation by a considerably low temperature. Accordingly, the action of removal of the particulate 72 by oxidation without emitting a luminous flame according to this embodiment of the present invention is completely different from the action of removal of particulate by burning accompanied with a flame.

The platinum Pt and the active oxygen release agent 71 become more active the higher the temperature of the particulate filter 24, so the amount of the active oxygen O able to be released by the active oxygen release agent 71 per unit time increases the higher the temperature of the particulate filter 24. Therefore, the amount of the particulate removable by oxidation per unit time without emitting a luminous flame on the particulate filter 24 increases the higher the temperature of the particulate filter 24.

Figure 21:
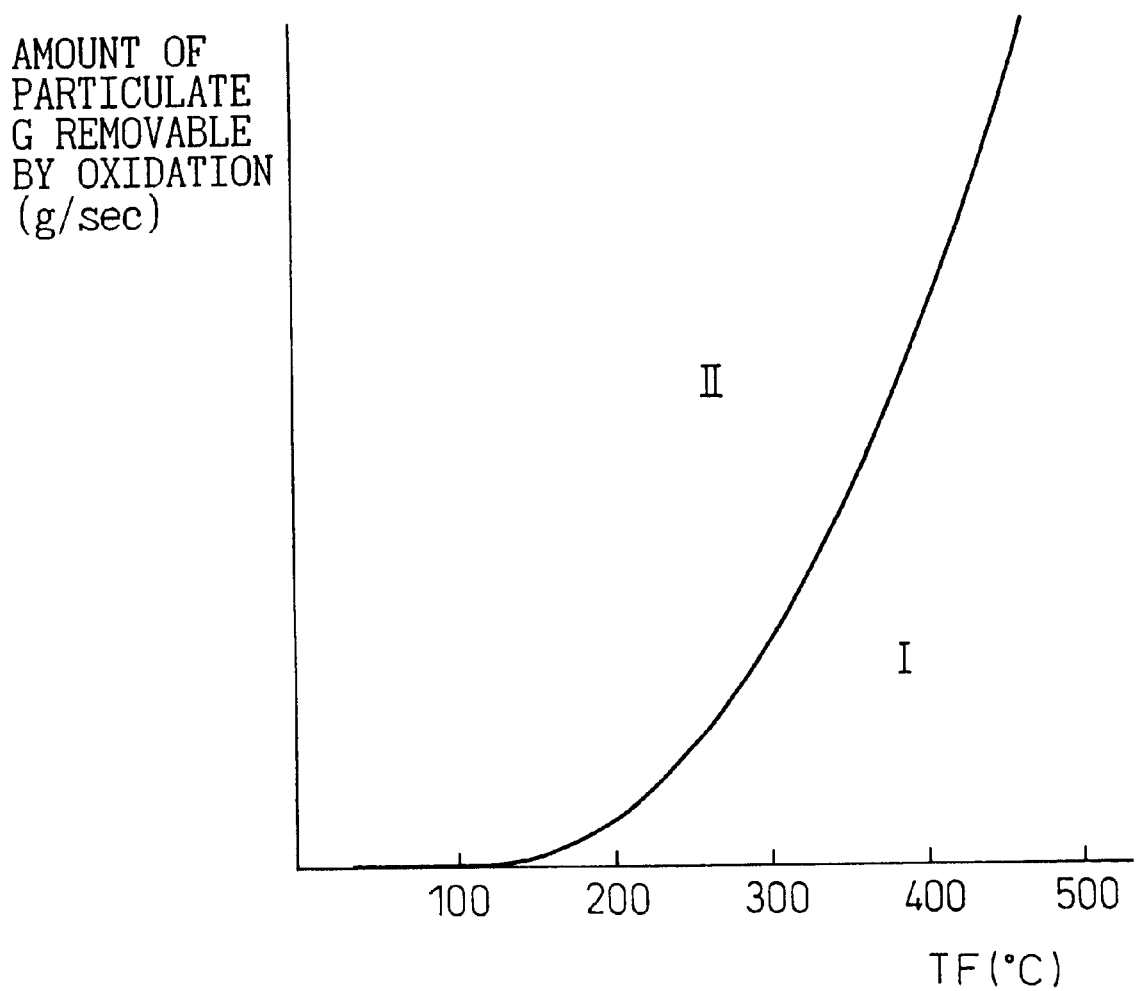
FIG. 21 is a view of the relationship between the amount of particulate removable by oxidation and the temperature of the particulate filter.

The solid line in FIG. 21 shows the amount G of the particulate removable by oxidation per unit time without emitting a luminous flame. The abscissa of FIG. 21 shows the temperature TF of the particulate filter 24. If the amount of particulate exhausted from the combustion chamber 5 per unit time is called the amount of discharged particulate M, when the amount of discharged particulate M is smaller than the amount G of particulate removable by oxidation, that is, in the region I of FIG. 21, when contacting the particulate filter 24, all of the particulate discharged from the combustion chamber 5 is removed by oxidation successively in a short time without emitting a luminous flame on the particulate filter 24.

Figure 20A:
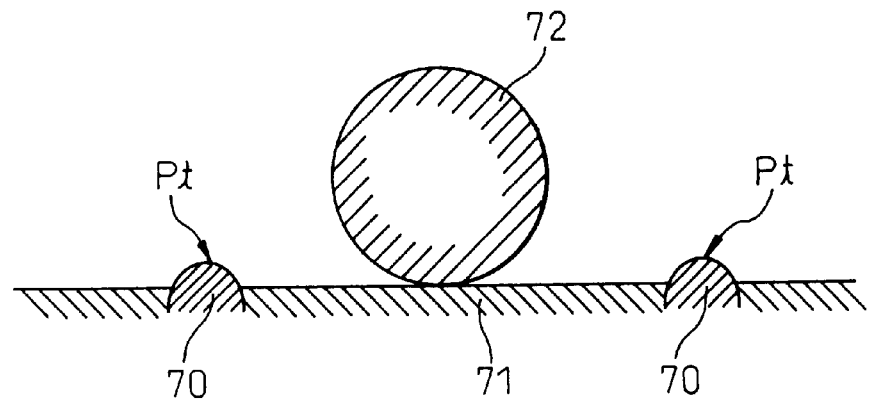
FIGS. 20A, 20B, and 20C are views for explaining a deposition action of particulate.
Figure 20B:
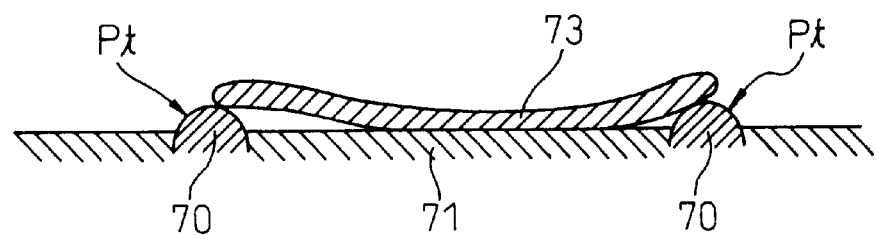
Figure 20C:
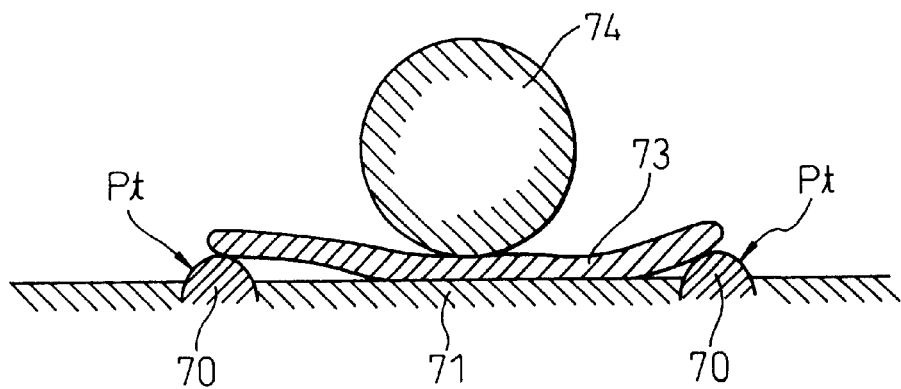

As opposed to this, when the amount M of discharged particulate is larger than the amount G of particulate removable by oxidation, that is, in the region II of FIG. 21, the amount of active oxygen is not sufficient for successive oxidation of all of the particulate. FIGS. 20A to 20C show the state of oxidation of particulate in this case.

That is, when the amount of active oxygen is not sufficient for successive oxidation of all of the particulate, if particulate 72 adheres on the active oxygen release agent 71 as shown in FIG. 20A, only part of the particulate 72 is oxidized. The portion of the particulate not sufficiently oxidized remains on the carrier layer. Next, if the state of an insufficient amount of active oxygen continues, the portions of the particulate not oxidized successively are left on the carrier layer. As a result, as shown in FIG. 20B, the surface of the carrier layer is covered by the residual particulate portion 73.

This residual particulate portion 73 covering the surface of the carrier layer gradually changes to hard-to-oxidize carbon and therefore the residual particulate portion 73 easily remains as it is. Further, if the surface of the carrier layer is covered by the residual particulate portion 73, the action of oxidation of the NO and $SO_2$ by the platinum Pt and the action of release of the active oxygen from the active oxygen release agent 71 are suppressed. As a result, as shown in FIG. 20C, other particulate 74 successively deposits on the residual particulate portion 73. That is, the particulate deposits in layers. If the particulate deposits in layers in this way, the particulate is separated in distance from the platinum Pt or the active oxygen release agent 71, so even if easily oxidizable particulate, it will not be oxidized by active oxygen O. Therefore, other particulate successively deposits on the particulate 74. That is, if the state of the amount M of discharged particulate being larger than the amount G of particulate removable by oxidation continues, particulate deposits in layers on the particulate filter 24 and therefore unless the temperature of the exhaust gas is made higher or the temperature of the particulate filter 24 is made higher, it is no longer possible to cause the deposited particulate to ignite and burn.

In this way, in the region I of FIG. 21, the particulate is burned in a short time without emitting a luminous flame on the particulate filter 24. In the region II of FIG. 21, the particulate deposits in layers on the particulate filter 24. Therefore, to prevent the particulate from depositing in layers on the particulate filter 24, the amount M of discharged particulate has to be kept smaller than the amount G of the particulate removable by oxidation at all times.

As will be understood from FIG. 21, with the particulate filter 24 used in this embodiment of the present invention, the particulate can be oxidized even if the temperature TF of the particulate filter 24 is considerably low. Therefore, in a compression ignition type engine shown in FIG. 1 and FIG. 3, it is possible to maintain the amount M of the discharged particulate and the temperature TF of the particulate filter 24 so that the amount M of discharged particulate normally becomes smaller than the amount G of the particulate removable by oxidation. Therefore, in this embodiment of the present invention, the amount M of discharged particulate and the temperature TF of the particulate filter 24 are maintained so that the amount M of discharged particulate usually becomes smaller than the amount G of the particulate removable by oxidation.

If the amount M of discharged particulate is maintained to be usually smaller than the amount G of particulate removable by oxidation in this way, the particulate no longer deposits in layers on the particulate filter 24. As a result, the pressure loss of the flow of exhaust gas in the particulate filter 24 is maintained at a substantially constant minimum pressure loss to the extent of being able to be said to not change much at all. Therefore, it is possible to maintain the drop in output of the engine at a minimum.

Further, the action of removal of particulate by oxidation of the particulate takes place even at a considerably low temperature. Therefore, the temperature of the particulate filter 24 does not rise that much at all and consequently there is almost no risk of deterioration of the particulate filter 24. Further, since the particulate does not deposit in layers on the particulate filter 24, there is no danger of coagulation of ash and therefore there is less danger of the particulate filter 24 clogging.

This clogging however occurs mainly due to the calcium sulfate $CaSO_4$. That is, fuel or lubrication oil contains calcium Ca. Therefore, the exhaust gas contains calcium Ca. This calcium Ca produces calcium sulfate $CaSO_4$ in the presence of $SO_3$. This calcium sulfate $CaSO_4$ is a solid and will not break down by heat even at a high temperature. Therefore, if calcium sulfate $CaSO_4$ is produced and the fine holes of the particulate filter 24 are clogged by this calcium sulfate $CaSO_4$, clogging occurs.

In this case, however, if an alkali metal or an alkali earth metal having a higher tendency toward ionization than calcium Ca, for example potassium K, is used as the active oxygen release agent 71, the $SO_3$ diffused in the active oxygen release agent 71 bonds with the potassium K to form potassium sulfate $K_2SO_4$. The calcium Ca passes through the partitions 74 of the particulate filter 24 and flows out into the exhaust gas passages 60 or 61 without bonding with the $SO_3$. Therefore, there is no longer any clogging of fine holes of the particulate filter 24. Accordingly, as described above, it is preferable to use an alkali metal or an alkali earth metal having a higher tendency toward ionization than calcium Ca, that is, potassium K, lithium Li, cesium Cs, rubidium Rb, barium Ba, and strontium Sr, as the active oxygen release agent 71.

Now, in this embodiment of the present invention, the intention is basically to maintain the amount M of the discharged particulate smaller than the amount G of the particulate removable by oxidation in all operating states. In practice, however, it is almost impossible to keep the amount M of discharged particulate lower than the amount G of the particulate removable by oxidation in all operating states. For example, at the time of engine startup, normally the particulate filter 24 is low in temperature, therefore at this time the amount M of discharged particulate becomes greater than the amount G of particulate removable by oxidation. Therefore, in this embodiment of the present invention, except for special cases such as right after engine startup, the amount M of discharged particulate is made to become smaller than the amount G of particulate removable by oxidation.

Note that if the amount M of discharged particulate becomes greater than the amount G of particulate removable by oxidation such as right after engine startup, a portion of the particulate not oxidized starts to remain on the particulate filter 24. When the part of the particulate which failed to be oxidized starts remaining in this way, that is, when the particulate only deposits up to a certain limit, if the amount M of discharged particulate becomes less than the amount G of particulate removable by oxidation, the portion of the residual particulate will be removed by oxidation without emitting a luminous flame due to the active oxygen O. Therefore, in this embodiment of the present invention, at the time of special operating states such as right after engine startup, if the amount M of discharged particulate becomes less than the amount G of particulate removable by oxidation, the amount M of discharged particulate and the temperature TF of the particulate filter 24 are maintained so that only an amount of particulate less than the certain limit which can be removed by oxidation deposits on the particulate filter 24.

Further, sometimes even if it attempted to maintain the amount M of discharged particulate and the temperature TF of the particulate filter 24 in this way, particulate deposits on layers on the particulate filter 24 due to some reason or another. In such a case as well, if the air-fuel ratio of all or part of the exhaust gas is temporarily made rich, the particulate deposited on the particulate filter 24 will be oxidized without emitting a luminous flame. That is, if the air-fuel ratio of the exhaust gas is made rich, that is, if the concentration of oxygen in the exhaust gas is reduced, the active oxygen O is released all at once from the active oxygen release agent 71 to the outside. The particulate deposited can be removed by oxygen in a short time without emitting a luminous flame by the active oxygen O released all at once in this way.

Now, as explained above, in this embodiment of the present invention, a layer of a carrier comprised of for example alumina is formed on the two side surfaces of the partition walls 64 and the inner wall surfaces of the fine holes in the partition walls 64 of the particulate filter 24. A precious metal catalyst and active oxygen release agent are carried on the carrier. In this case, it is also possible to have the carrier carry an $NO_x$ absorbent which absorbs the $NO_x$ contained in the exhaust gas when the air-fuel ratio of the exhaust gas flowing into the particulate filter 24 on this carrier is lean and releases the $NO_x$ absorbed when the air-fuel ratio of the exhaust gas flowing into the particulate filter 24 becomes the stoichiometric air-fuel ratio or rich.

In this embodiment of the present invention, as explained above, platinum Pt is used as the precious metal. As the $NO_x$ absorbent, use is made of at least one of an alkali metal such as potassium K, sodium Na, lithium Li, cesium Cs, and rubidium Rb, an alkali earth metal such as barium Ba, calcium Ca, and strontium Sr, and a rare earth such as lanthanum La and yttrium Y. Note that as will be understood from a comparison with the metal comprising the above active oxygen release agent, the metals comprising the $NO_x$ absorbent and the metals comprising the active oxygen release agent match in large part.

In this case, it is possible to use different metals for the $NO_x$ absorbent and active oxygen release agent or possible to use the same metal. When using the same metal for the $NO_x$ absorbent and the active oxygen release agent, the functions of both the function of the $NO_x$ absorbent and the function of the active oxygen release agent described above are simultaneously achieved.

Next, an explanation will be made of the action of absorption and release of $NO_x$ taking as an example the case of use of potassium K as the $NO_x$ absorbent using platinum Pt as the precious metal catalyst.

First, when the $NO_x$ absorption action is studied, $NO_x$ is absorbed in the $NO_x$ absorbent by the same mechanism as the mechanism shown in FIG. 19A. In this case, however, in FIG. 19A, reference numeral 71 indicates an $NO_x$ absorbent.

That is, when the air-fuel ratio of the exhaust gas flowing into the particulate filter 24 is lean, since a large amount of excess oxygen is contained in the exhaust gas, if the exhaust gas flows into the exhaust gas inflow passage 60 of the particulate filter 24, as shown in FIG. 19A, the oxygen $O_2$ adheres on the surface of the platinum Pt in the form of $O_2^-$ or $O^{2-}$. On the other hand, the NO in the exhaust gas reacts with the $O_2^-$ or $O^{2-}$ on the surface of the platinum Pt and becomes $NO_2$ ($2NO+O_2 \rightarrow 2NO_2$). Next, part of the $NO_2$ produced is absorbed in the $NO_x$ absorbent 71 while being oxidized on the platinum Pt and diffuses in the $NO_x$ absorbent 71 in the form of nitrate ions $NO_3^-$ as shown in FIG. 19A while bonding with the potassium K. Part of the nitrate ions $NO_3^-$ produces potassium nitrate $KNO_3$. In this way, NO is absorbed in the $NO_x$ absorbent 71.

On the other hand, if the exhaust gas flowing into the particulate filter 24 becomes rich, the nitrate ions $NO_3^-$ break down into oxygen O and NO. The NO is successively released from the $NO_x$ absorbent 71. Therefore, if the air-fuel ratio of the exhaust gas flowing into the particulate filter 24 becomes rich, NO is released from the $NO_x$ absorbent 71 in a short time. Further, since the NO released is reduced, NO is never exhausted into the atmosphere.

Note that in this case, even if the air-fuel ratio of the exhaust gas flowing into the particulate filter 24 is made the stoichiometric air-fuel ratio, NO is released from the $NO_x$ absorbent 71. In this case, however, since the NO is released only gradually from the $NO_x$ absorbent 71, it takes a somewhat long time for all of the $NO_x$ absorbed in the $NO_x$ absorbent 71 to be released.

As explained above, however, it is possible to use different metals for the $NO_x$ absorbent and active oxygen release agent. In this embodiment of the present invention, however, the same metal is used for the $NO_x$ absorbent and the active oxygen release agent. In this case, as mentioned above, the functions of both the function of the $NO_x$ absorbent and the function of the active oxygen release agent described above are simultaneously achieved. An agent which simultaneously achieves both these functions is referred to below as an active oxygen release agent/$NO_x$ absorbent. In this case, reference numeral 71 in FIG. 19A shows the active oxygen release agent/$NO_x$ absorbent.

When using such an active oxygen release agent/$NO_x$ absorbent 71, when the air-fuel ratio of the exhaust gas flowing into the particulate filter 24 is lean, the NO contained in the exhaust gas is absorbed in the active oxygen release agent/$NO_x$ absorbent 71. When the particulate contained in the exhaust gas adheres to the active oxygen release agent/$NO_x$ absorbent 71, the particulate can be removed by oxidation in a short time by the active oxygen etc. released from the active oxygen release agent/$NO_x$ absorbent 71. Therefore, it is possible to prevent both the particulate and $NO_x$ in the exhaust gas from being exhausted into the atmosphere at this time.

On the other hand, if the air-fuel ratio of the exhaust gas flowing into the particulate filter 24 becomes rich, NO is released from the active oxygen release agent/$NO_x$ absorbent 71. This NO is reduced by the unburned hydrocarbons and carbon monoxide. Therefore, at this time, NO is never exhausted into the atmosphere. Further, if particulate has deposited on the particulate filter 24 at this time, the particulate can be removed by oxidation without emitting a luminous flame by the active oxygen of the active oxygen release agent/$NO_x$ absorbent 71.

The action of release of active oxygen from the active oxygen release agent 71 as already explained with reference to FIG. 21 is started when the temperature of the particulate filter 24 is considerably low. The same is true when using this active oxygen release agent/$NO_x$ absorbent 71. As opposed to this, the action of absorption of $NO_x$ to the $NO_x$ absorbent or the active oxygen release agent/$NO_x$ absorbent 71 is not started until the temperature TF of the particulate filter 24 becomes higher than the temperature of the start of release of the active oxygen. This is believed to be due to the fact that release of active oxygen occurs by stripping oxygen from for example the potassium nitrate $KNO_3$, while the action of absorption of $NO_x$ does not start unless the platinum Pt is activated.

Figure 22:
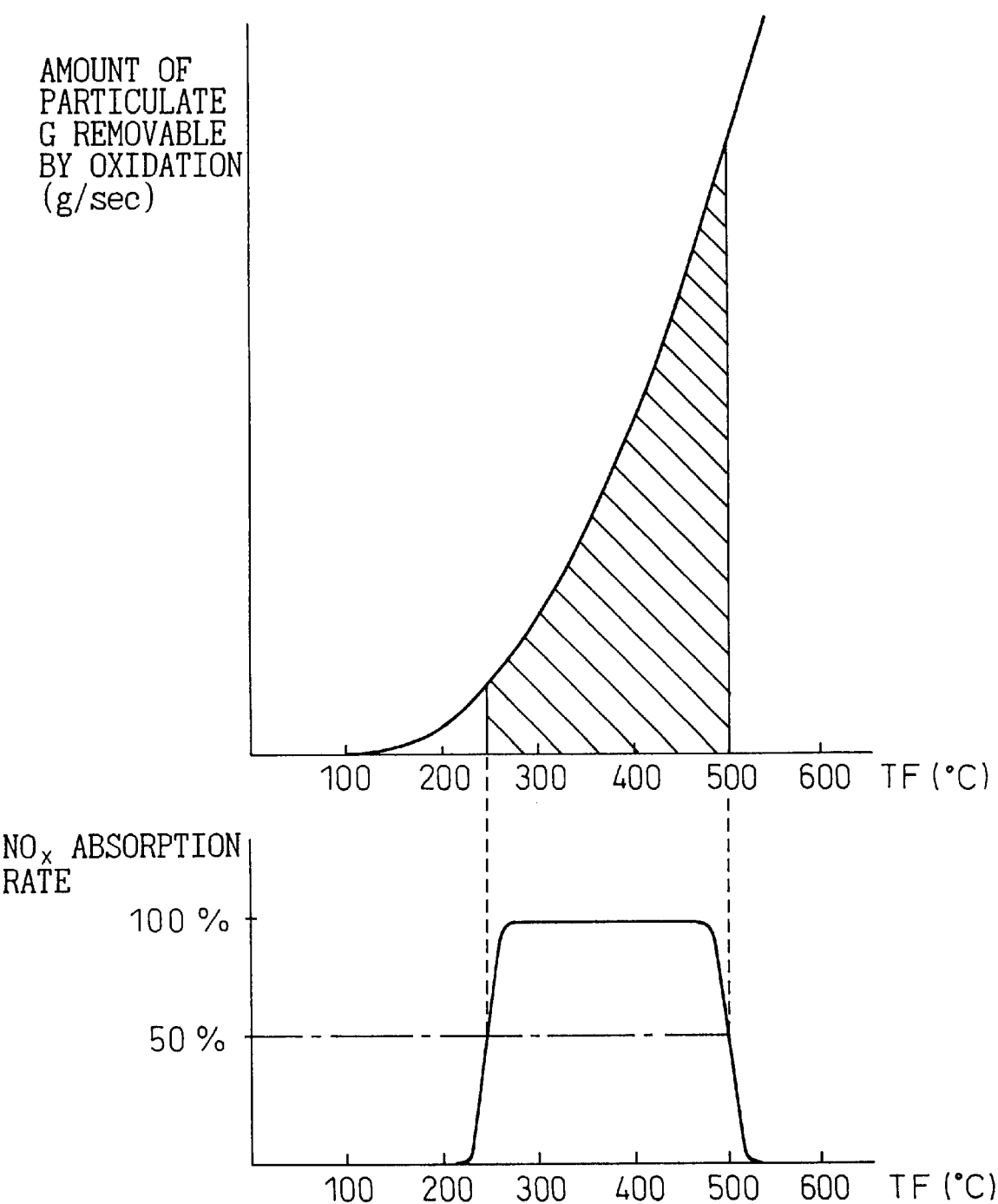
FIG. 22 is a view of a particulate $NO_x$ simultaneous processing region.

FIG. 22 shows the amount G of particulate removable by oxidation and the $NO_x$ absorption rate when using potassium K as the $NO_x$ absorbent or the active oxygen release agent/$NO_x$ absorbent 71. From FIG. 22, the action of release of active oxygen starts when the temperature TF of the particulate filter 24 is less than 200° C., while the active of absorption of $NO_x$ does not start until the temperature TF of the particulate filter 24 is over 200° C.

On the other hand, the action of release of active oxygen becomes greater the higher the temperature TF of the particulate filter 24. As opposed to this, the action of absorption of $NO_x$ disappears when the temperature TF of the particulate filter 24 rises. That is, when the temperature TF of the particulate filter 24 exceeds a certain temperature, in the example shown in FIG. 22, over about 500° C., the nitrate ions $NO_3^-$ or potassium nitrate $KNO_3$ is decomposed due to the heat and NO is released from the active oxygen release agent/$NO_x$ absorbent 71. When this state occurs, the amount of release of NO becomes greater than the amount of absorption of $NO_x$ and therefore the $NO_x$ absorption rate falls as shown in FIG. 22.

FIG. 22 shows the $NO_x$ absorption rate when using potassium K as the active oxygen release agent/$NO_x$ absorbent 71. In this case, the temperature range of the particulate filter 24 where the $NO_x$ absorption rate becomes higher differs depending on the metal used. For example, when using barium Ba as the $NO_x$ absorbent or active oxygen release agent/$NO_x$ absorbent 71, the temperature range of the particulate filter 24 where the $NO_x$ absorption rate becomes higher becomes narrower than when using potassium K shown in FIG. 22.

As explained above, however, it is necessary to make the amount M of discharged particulate smaller than the amount G of particulate removable by oxidation in order to get the particulate in the exhaust gas removed by oxidation without depositing in layers on the particulate filter 24. However, with just reducing the amount M of discharged particulate from the amount G of particulate removable by oxidation, there is no action of absorbing $NO_x$ by the $NO_x$ absorbent or active oxygen release agent/$NO_x$ absorbent 71. To ensure the action of absorbing $NO_x$ of the $NO_x$ absorbent or active oxygen release agent/$NO_x$ absorbent 71, it is necessary to maintain the temperature TF of the particulate filter 24 within the temperature range where the action of absorbing $NO_x$ is performed. In this case, the temperature range of the particulate filter 24 where the action of absorbing $NO_x$ is performed has to be made the temperature range where the $NO_x$ absorption rate is more than a certain value, for example, more than 50 percent. Therefore, when using potassium K as the $NO_x$ absorbent or active oxygen release agent/$NO_x$ absorbent 71, as will be understood from FIG. 22, it is necessary to maintain the temperature TF of the particulate filter 24 between about 250° C. to 500° C.

Therefore, in this embodiment of the present invention, to enable the particulate in the exhaust gas to be removed by oxidation without depositing on the particulate filter 24 and to absorb the $NO_x$ in the exhaust gas, normally the amount M of discharged particulate is maintained to be smaller than the amount G of particulate removable by oxidation and the temperature TF of the particulate filter 24 is maintained within the temperature range where the $NO_x$ absorption rate of the particulate filter 24 becomes more than a certain value. That is, the amount M of discharged particulate and the temperature TF of the particulate filter 24 are maintained within the particulate/$NO_x$ simultaneous processing region shown by the hatching in FIG. 22.

Note that even if trying to maintain the amount M of discharged particulate and the temperature TF of the particulate filter 24 within the particulate/$NO_x$ simultaneous processing region, sometimes the amount M of discharged particulate and the temperature TF of the particulate filter 24 fall outside of the particulate/$NO_x$ simultaneous processing region. In such a case, in this embodiment of the present invention, at least one of the amount M of discharged particulate and the temperature TF of the particulate filter 24 is controlled so that the amount M of discharged particulate and the temperature TF of the particulate filter 24 fall within the particulate/$NO_x$ simultaneous processing region.

As mentioned above, however, when the engine is operating in the first operating region I shown in FIG. 10 and low temperature combustion is being performed, almost no soot is generated. Instead, unburned hydrocarbons are exhausted from the combustion chamber 5 in the form of a soot precursor or state before that. As explained above, however, a precious metal such as platinum Pt having an oxidation action is carried on the particulate filter 24. Therefore, the unburned hydrocarbons exhausted from the combustion chamber 5 at this time are oxidized well on the particulate filter 24. Further, the extremely small amount of soot produced at this time can be removed by oxidation on the particulate filter 24.

Figure 23A:
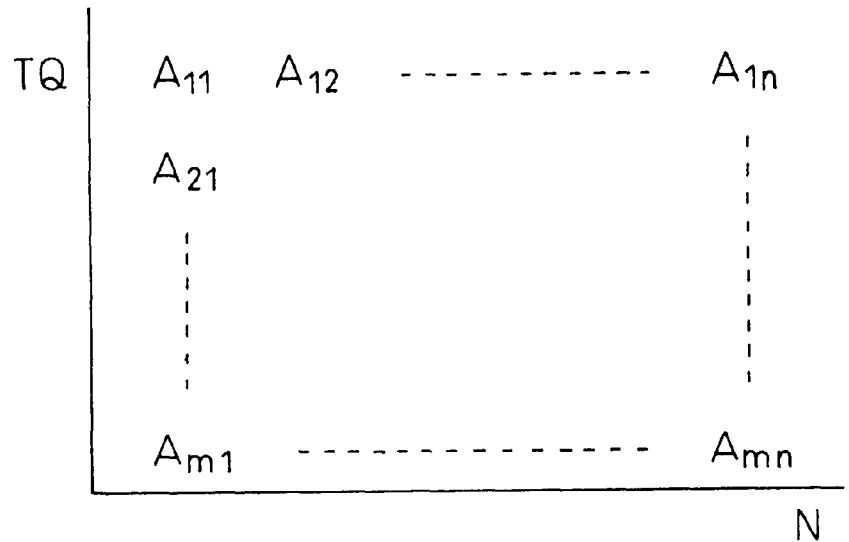
FIGS. 23A and 23B are views of a map of the amount of $NO_x$ absorption per unit time.
Figure 23B:
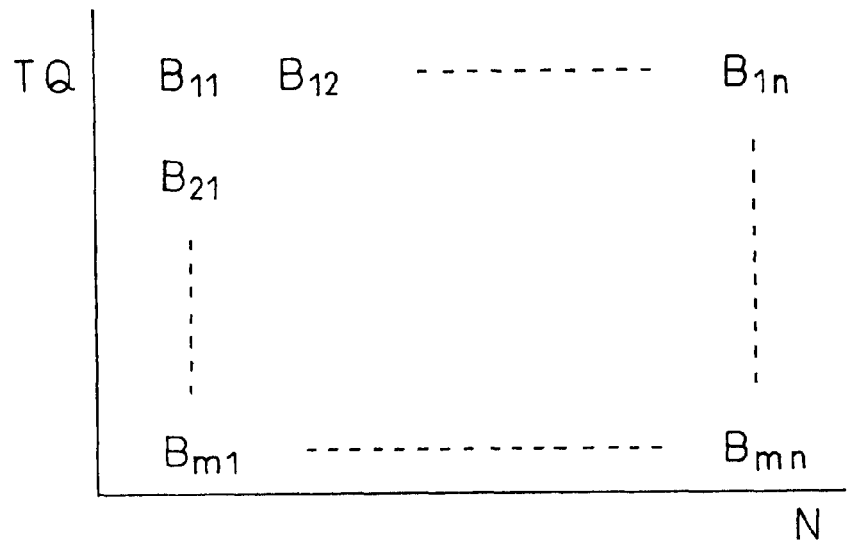

On the other hand, there is a limit to the $NO_x$ absorbing ability of the $NO_x$ absorbent 71 or active oxygen release agent/$NO_x$ absorbent 71 (hereinafter these will be referred to overall as simply the "$NO_x$ absorbent 71"). It is necessary to release the $NO_x$ from the $NO_x$ absorbent 71 before the $NO_x$ absorption ability of the $NO_x$ absorbent 71 becomes saturated. Therefore, it is necessary to estimate the amount of $NO_x$ absorbed in the $NO_x$ absorbent 71. Therefore, in the present invention, the amount A of absorption of $NO_x$ per unit time at the time of the first combustion is found in advance in the form of a map as shown in FIG. 23A as a function of the required torque TQ and the engine rotational speed N, the amount B of absorption of $NO_x$ per unit time at the time of the second combustion is set in advance in the form of a map as shown in FIG. 23B as a function of the required torque TQ and engine rotational speed N, and these amounts A and B of absorption of $NO_x$ per unit time are cumulatively added to estimate the $NO_x$ amount $\Sigma NOX$ absorbed in the $NO_x$ absorbent 71.

In this embodiment of the present invention, when the $NO_x$ absorption $\Sigma NOX$ exceeds a predetermined allowable maximum value MAX, the $NO_x$ is made to be released from the $NO_x$ absorbent 71.

That is, in this embodiment of the present invention, at the time of the first combustion, when the $NO_x$ absorption $\Sigma NOX$ exceeds the allowable maximum value MAX, the amount of fuel injection is increased to make the air-fuel ratio A/F in the combustion chamber 5 temporarily rich. If the air-fuel ratio A/F in the combustion chamber 5 is made rich, the $NO_x$ is released from the $NO_x$ absorbent 71. As explained above, at the time of the first combustion, that is, low temperature combustion, even if the air-fuel ratio A/F in the combustion chamber 5 is made rich, no soot is generated and therefore it is possible to release $NO_x$ from the $NO_x$ absorbent 71 without the generation of soot.

As opposed to this, at the time of the second combustion, when the $NO_x$ absorption $\Sigma NOX$ exceeds the allowable maximum value MAX and the amount of fuel injection is increased to make the air-fuel ratio A/F in the combustion chamber 5 rich, a large amount of soot is generated. Therefore, in this embodiment of the present invention, at the time of the second combustion, when the $NO_x$ absorption $\Sigma NOX$ exceeds the allowable maximum value MAX, the second combustion is switched to the first combustion and the air-fuel ratio A/F in the combustion chamber 5 is made rich under the first combustion. As explained above, by making the air-fuel ratio A/F in the combustion chamber 5 rich, no soot is generated and therefore it is possible to release $NO_x$ from the $NO_x$ absorbent 71 without the generation of soot even at the time of the second combustion.

Since the second combustion is switched to the first combustion, however, the amount of fuel injection has to be greatly reduced. If the amount of fuel injection is greatly reduced, the output torque of the engine is greatly reduced. Therefore, in this embodiment of the present invention, when switching from the second combustion to the first combustion, the electric motor 37 is driven to make the electric motor 37 generate an output torque substantially equal to the drop in engine output torque due to the reduction in the amount of injection.

The electric motor 37, however, operates well only when more than a certain amount of electrical energy is stored in the battery 41. When the amount of electrical energy stored in the battery 41 falls below that amount, it is difficult to get the electric motor 37 to operate well. Therefore, the drop in the engine output torque can be made up for by the output torque of the electric motor 37 only when there is sufficient leeway before the amount of electrical energy stored in the battery 41 falls below the above value even when operating the electric motor 37, that is, when the amount of electrical energy is larger than a predetermined setting with sufficient leeway before it falls below the above value.

Therefore, in this embodiment of the present invention, at the time of the second combustion, when the $NO_x$ absorption $\Sigma NOX$ exceeds the allowable maximum value MAX, if the amount of electrical energy stored in the battery 41 is larger than the predetermined setting, the second combustion is switched to the first combustion and the drop in the engine output torque is made up for by the output torque of the electric motor 37.

On the other hand, in this embodiment of the present invention, at the time of the second combustion, when the $NO_x$ absorption $\Sigma NOX$ exceeds the allowable maximum value MAX and the amount of electrical energy stored in the battery 41 is smaller than the predetermined setting, the second combustion is not switched to the first combustion, but the second combustion is maintained as it is and the electric motor 37 is not operated. At this time, additional fuel is injected from the fuel injector 6 in the second half of the expansion stroke or in the exhaust stroke or additional fuel is fed into the exhaust passage upstream of the $NO_x$ absorbent 71 so that the air-fuel ratio of the exhaust gas becomes temporarily rich.

Next, an explanation will be given of the amount of electrical energy stored in the battery 41.

Figure 24A:
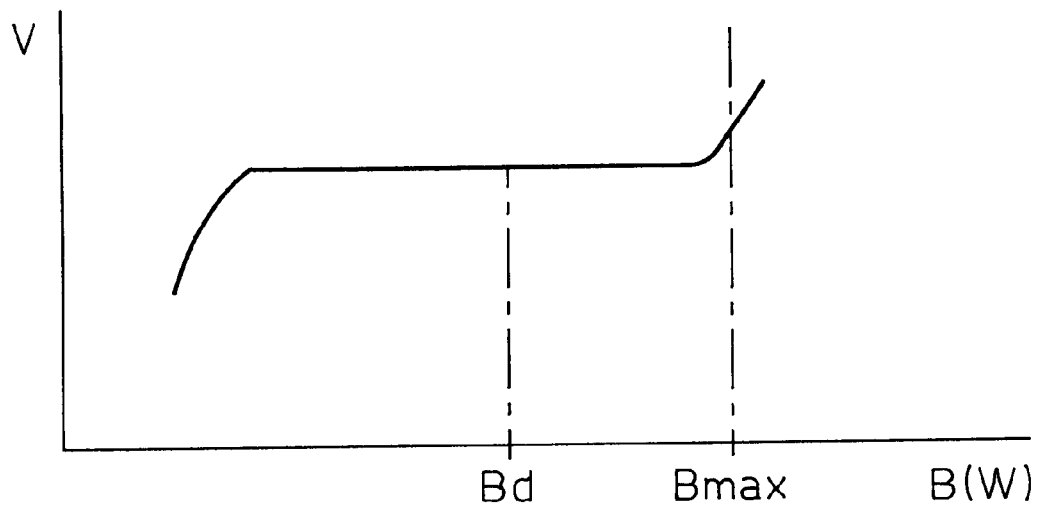
FIGS. 24A and 24B are views for explaining electrical energy stored in a battery.

FIG. 24A shows the relationship between the electric power stored in the battery when using a nickel-metal hydride battery as the battery 41, that is, the amount B (W) of electrical energy, and battery voltage V. Note that in FIG. 24A, Bmax shows the maximum electrical energy stored, while Bd shows the setting forming the criteria for judgement as to whether to operate the electric motor 37.

Figure 24B:
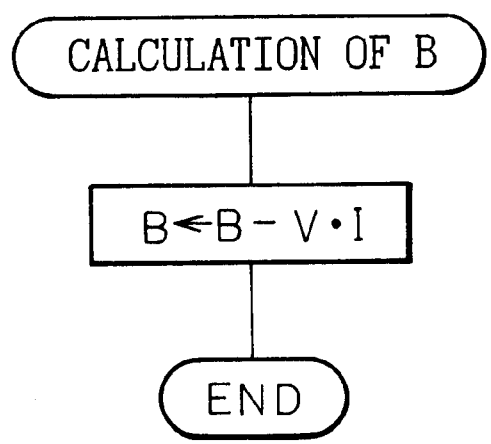

The amount B of electrical energy stored in the battery 41 is calculated by the calculation routine shown in FIG. 24B. That is, if the discharge current I is made positive, the charge current I is made negative, and the voltage of the battery 41 is V, the amount of stored electrical energy changing due to the charging or discharging action is expressed as V·I, so the amount B of stored electrical energy can be calculated based on the following as shown in FIG. 24B:

$$B \leftarrow B - V \cdot I$$

Here, V and I are detected by the detector 42.

Figure 25A:
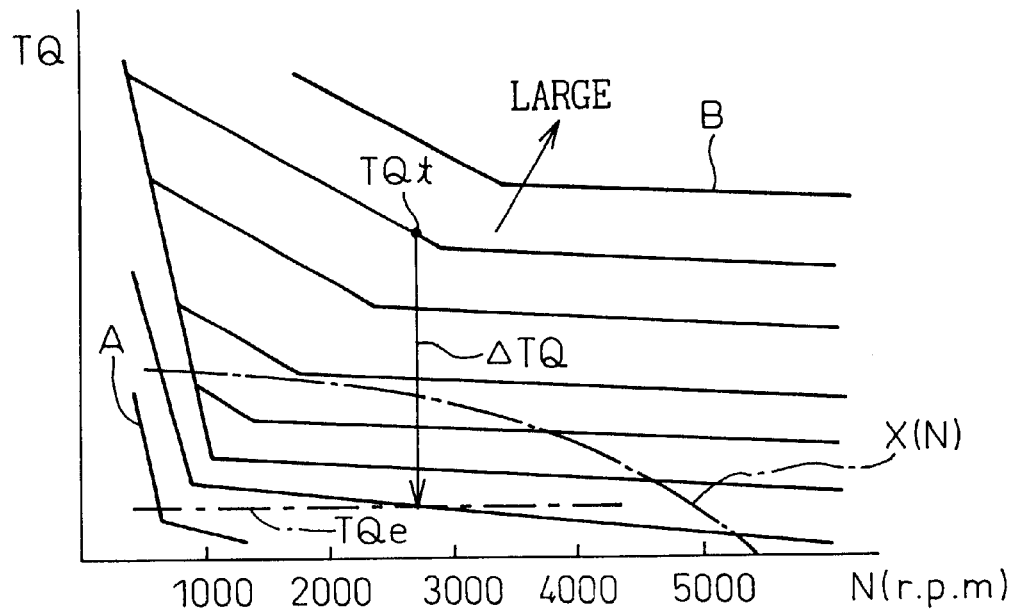
FIGS. 25A and 25B are views of a required torque.

FIG. 25A shows an example of the control of the engine output torque and electric motor 37 at the time of the second combustion when the $NO_x$ absorption $\Sigma NOX$ exceeds the allowable maximum value MAX and the amount B of electrical energy stored in the battery 41 is larger than a predetermined setting Bd. Note that the solid line in FIG.

25A shows the same amount of depression of the accelerator pedal 44 in the same way as in FIG. 4, while the broken line of FIG. 25A shows the boundary X(N) shown in FIG. 10.

That is, in the example shown in FIG. 25A, the required torque of the engine is reduced from TQt to TQe possible under low temperature combustion and the drop ΔTQ in the engine output torque is made up for by the output torque of the electric motor 37.

Note that the exhaust gas includes $SO_x$. The $NO_x$ absorbent 71 absorbs not only $NO_x$, but also $SO_x$. The mechanism of absorption of $SO_x$ in the $NO_x$ absorbent is considered to be the same as the mechanism of absorption of $NO_x$.

That is, in the same way as when explaining the mechanism of absorption of $NO_x$, explaining the case of carrying platinum Pt and potassium K on the carrier, when the air-fuel ratio of the exhaust gas is lean, the oxygen $O_2$ adheres to the surface of the platinum Pt in the form of $O_2^-$ or $O^{2-}$. The $SO_2$ in the exhaust gas reacts with the $O_2^-$ or $O^{2-}$ on the surface of the platinum Pt to become $SO_3$. Next, part of the $SO_3$ which is produced is absorbed in the $NO_x$ absorbent while being oxidized on the platinum Pt and diffuses in the $NO_x$ absorbent in the form of sulfate ions $SO_4^2$ while bonding with the potassium K to produce potassium sulfate $K_2SO_4$.

This potassium sulfate $K_2SO_4$, however, is stable and resistant to decomposition. As explained above, even if the air-fuel ratio of the exhaust gas is made rich to release the $NO_x$ from the $NO_x$ absorbent 71, the potassium sulfate $K_2SO_4$ remains as it is without decomposing. Therefore, the potassium sulfate $K_2SO_4$ increases in the $NO_x$ absorbent 71 along with the elapse of time and consequently the amount of $NO_x$ which can be absorbed by the $NO_x$ absorbent 71 falls along with the elapse of time.

This potassium sulfate $K_2SO_4$, however, decomposes when the temperature of the $NO_x$ absorbent 71 exceeds a certain temperature set by the $NO_x$ absorbent 71, for example, about 600° C. If the air-fuel ratio of the exhaust gas flowing into the $NO_x$ absorbent 71 at that time is made rich, $SO_x$ is released from the $NO_x$ absorbent 71. Releasing the $SO_x$ from the $NO_x$ absorbent 71, however, requires a considerably long time compared with releasing $NO_x$ from the $NO_x$ absorbent 71. Giving one example, while it is possible to release all of the $NO_x$ from the $NO_x$ absorbent 71 if the air-fuel ratio of the exhaust gas is made rich for example for a short time of less than one second, it takes several minutes to release all of the $SO_x$ from the $NO_x$ absorbent 71. It is necessary to maintain the temperature of the $NO_x$ absorbent 71 at least at above 600° C. and maintain the air-fuel ratio of the exhaust gas rich. That is, it is necessary to maintain the $NO_x$ absorbent 25 at a high temperature over a long time in order to release all of the $SO_x$ from the $NO_x$ absorbent 71.

As mentioned above, however, at the time of the first combustion, that is, the low temperature combustion, the temperature of the exhaust gas becomes high and therefore the temperature of the $NO_x$ absorbent 71 also becomes high. Further, the large amount of unburned hydrocarbons exhausted from the combustion chamber 5 at this time is oxidized in the $NO_x$ absorbent 71. Due to the heat of the oxidation reaction, the temperature of the $NO_x$ absorbent 71 becomes further higher. As a result, at the time of low temperature combustion, the temperature of the $NO_x$ absorbent 71 becomes more than 600° C. In this case, if the air-fuel ratio is made rich, the temperature of the $NO_x$ absorbent 71 becomes further higher. Therefore, at the time of the first combustion, when $SO_x$ is to be released from the $NO_x$ absorbent 71, the amount of fuel injection is increased to make the air-fuel ratio in the combustion chamber 5 rich.

On the other hand, as mentioned above, at the time of the second combustion, it is not preferable to increase the amount of fuel injection in order to make the air-fuel ratio in the combustion chamber 5 rich. Therefore, in this embodiment of the present invention, at the time of the second combustion, when the $SO_x$ is to be released from the $NO_x$ absorbent 71, if the amount B of the electrical energy stored in the battery 41 is larger than the predetermined setting Bd, the second combustion is switched to the first combustion, the air-fuel ratio in the combustion chamber 5 is made rich, and simultaneously the drop in engine output torque is made up for by the output torque of the electric motor 37.

Figure 25B:
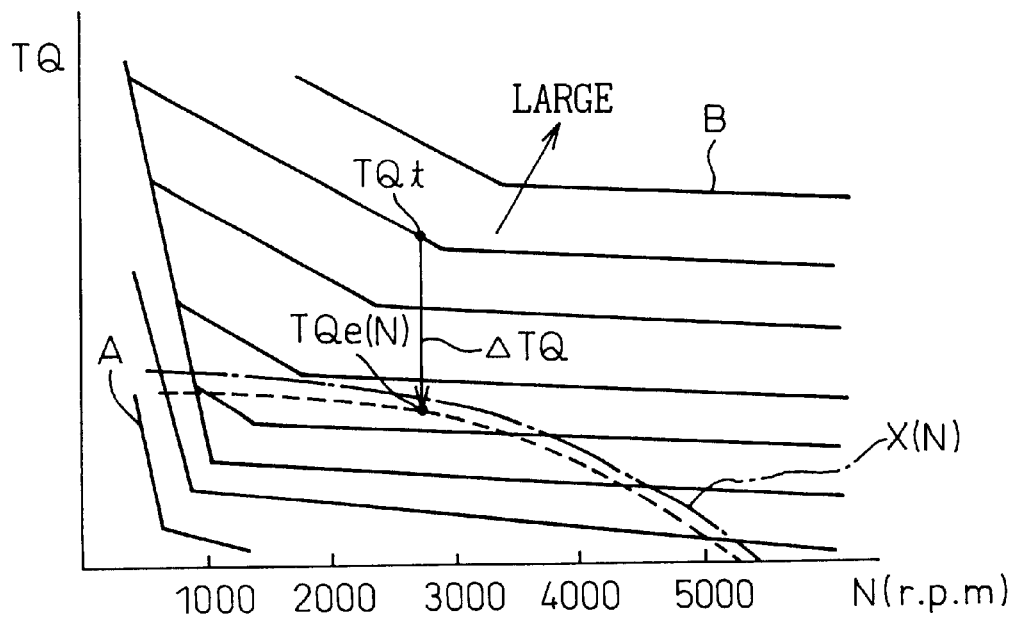

FIG. 25B shows a first embodiment of control of the output torque of the engine and the output torque of the electric motor 37 in this case. In the first embodiment, as shown by the broken line in FIG. 25B, the engine output torque TQe (N), which becomes substantially maximum in the range where the first combustion is possible, is preset as a function of the engine rotational speed N. When $SO_x$ is to be released, the required torque of the engine is lowered from TQt to TQe (N) and the drop ΔTQ of the engine output torque is made up for by the output torque of the electric motor 37.

Therefore, in the first embodiment, when the amount B of the electrical energy stored in the battery 41 is larger than the setting Bd, even if the required torque exceeds the boundary X(N), that is, when the second combustion should be performed, the first combustion is performed.

As opposed to this, when the amount B of the electrical energy stored in the battery 41 is smaller than the setting Bd, even when the $SO_x$ should be released from the $NO_x$ absorbent 71, if the required torque TQ exceeds the boundary X(N), the first combustion is switched to the second combustion. Alternatively, at the time of the second combustion, the second combustion is continued even when $SO_x$ is to be released from the $NO_x$ absorbent 71. In this second combustion, the air-fuel ratio is made lean, so there is no action of release of $SO_x$ from the $NO_x$ absorbent 71.

As mentioned above, however, the temperature of the exhaust gas becomes lower at the time of the second combustion. Therefore, if switching from the first combustion to the second combustion, the temperature of the $NO_x$ absorbent 71 falls to a considerably lower temperature than 600° C. As opposed to this, when switching from the second combustion to the first combustion, the temperature of the $NO_x$ absorbent 71 gradually increases and becomes more than 600° C., but time is required for the temperature of the $NO_x$ absorbent 71 to become more than 600° C. Therefore, if the first combustion and the second combustion are frequently switched between, the temperature of the $NO_x$ absorbent 71 almost never becomes more than 600° C.

In the actual operating state, the first combustion and second combustion are frequently switched between in many cases. Therefore, it is necessary to enable the $NO_x$ absorbent 71 to be maintained at a high temperature to enable release of $SO_x$ at the time of the first combustion even at the time of an operating state where the first combustion and second combustion are frequently switched between. Accordingly, at the time of the second combustion, the temperature of the $NO_x$ absorbent 71 has to be maintained at over 600° C.

Further, when the amount of $NO_x$ which can be absorbed by the $NO_x$ absorbent 71 falls at the time of the second combustion, it is necessary to make the $SO_x$ be released immediately when switching from the second combustion to the first combustion. When the $SO_x$ should be released from the $NO_x$ absorbent 71 in this way, it is necessary to maintain the temperature of the $NO_x$ absorbent 71 at over 600° C. at the time of the second combustion. When the amount of $NO_x$ which can be absorbed by the $NO_x$ absorbent 71 falls at the time of the second combustion, it is preferable to make the temperature of the $NO_x$ absorbent 71 rise to over 600° C.

Therefore, in this embodiment of the present invention, if the amount B of electrical energy stored in the battery 41 is smaller than the setting Bd when $SO_x$ is to be released from the $NO_x$ absorbent 71, the second combustion is performed when the second combustion should be performed. At this time, the temperature TF of the $NO_x$ absorbent 71 is controlled to be more than 600° C.

Next, an explanation will be given of the method of maintaining the temperature of the $NO_x$ absorbent 71 at more than 600° C. and the method of raising the temperature of the $NO_x$ absorbent 71 to over 600° C. at the time of the second combustion.

In this embodiment of the present invention, to maintain the temperature of the $NO_x$ absorbent 71 over 600° C. and make the temperature of the $NO_x$ absorbent 71 rise above 600° C. at the time of the second combustion, use is made of one of three injection patterns comprised of a first injection pattern delaying the injection timing of the main fuel without injecting auxiliary fuel, a second injection pattern injecting auxiliary fuel before injection of the main fuel and delaying the injection timing of the main fuel, and a third injection pattern injecting auxiliary fuel after injection of the main fuel and delaying the injection timing of the main fuel.

Figure 26:
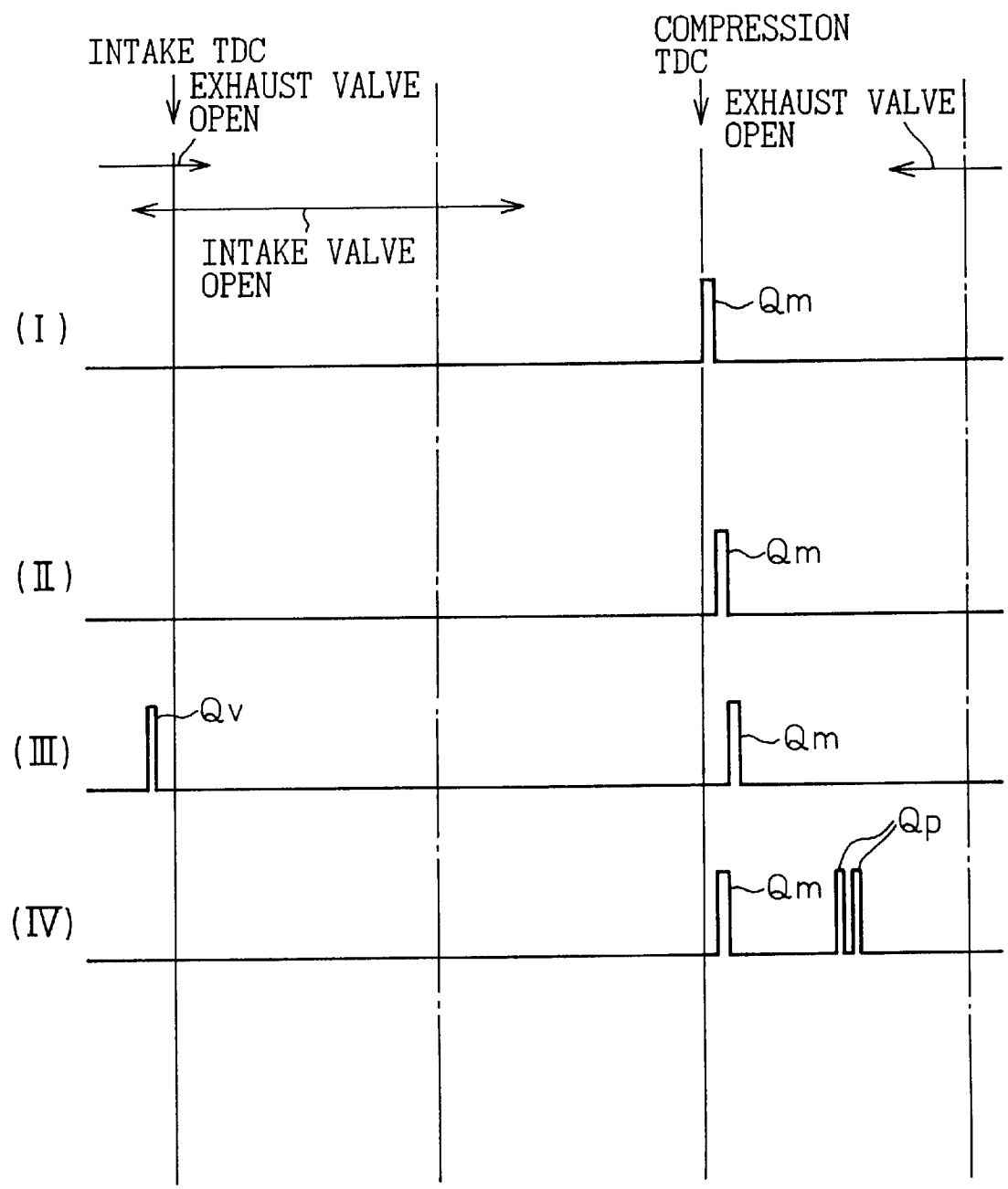
FIG. 26 is a view for explaining injection control.

That is, FIG. 26 shows the injection timing of the main fuel and the injection timing of the auxiliary fuel. The abscissa shows the crank angle. Further, FIG. 26 also shows the opening time of the intake valve 7 and the opening time of the exhaust valve 9.

In FIG. 26, (I) shows the injection timing at the time of ordinary second combustion. As will be understood from FIG. 26, at this time, only the main fuel $Q_m$ is injected without the injection of the auxiliary fuel. The injection timing of the main fuel at this time is set to before top dead center of the compression stroke or close to the top dead center of the compression stroke.

On the other hand, (II) shows the first injection pattern. As explained above, in the first injection pattern, only the main fuel $Q_m$ is injected without injection of the auxiliary fuel. Further, at this time, the injection timing of the main fuel $Q_m$ is made later than at the time of ordinary second combustion. If the injection timing of the main fuel $Q_m$ is delayed in this way, the combustion time becomes longer, so the temperature of the exhaust gas rises. If the temperature of the exhaust gas rises, the temperature of the $NO_x$ absorbent 71 is raised.

(III) of FIG. 26 shows the second injection pattern. In this second injection pattern, the auxiliary fuel $Q_v$ is injected near top dead center of the suction stroke. The injection timing of the main fuel $Q_m$ is further delayed compared with the case of the first injection pattern shown in (II) of FIG. 26. If the auxiliary fuel $Q_v$ is injected near top dead center of the suction stroke, intermediate products such as aldehydes, ketones, peroxides, and carbon monooxide are produced from the auxiliary fuel $Q_v$ due to the heat of combustion in the compression stroke. The reaction of the main fuel $Q_m$ is accelerated by these intermediate products. Therefore, in this case, even if the injection timing of the main fuel $Q_m$ is delayed to a large extent, good combustion is obtained without causing misfires. On the other hand, since the injection timing of the main fuel $Q_m$ can be delayed by a large extent in this way, the temperature of the exhaust gas rises considerably and therefore the temperature of the $NO_x$ absorbent 71 can be raised to a further higher temperature.

(IV) of FIG. 26 shows the third injection pattern. In the third injection pattern, the main fuel $Q_m$ is injected at the same timing as the first injection pattern shown in (II) of FIG. 26 and the auxiliary fuel $Q_p$ is injected during the expansion stroke or exhaust stroke after injection of the main fuel $Q_p$. In the example shown in FIG. 26, the auxiliary fuel $Q_p$ is injected in the expansion stroke directly before the exhaust valve 9 opens.

The auxiliary fuel $Q_p$ is not burned in the combustion chamber 5, so when the auxiliary fuel $Q_p$ is injected, the auxiliary fuel $Q_p$ is exhausted in the exhaust port 10 in the form of unburned hydrocarbons. Therefore, when the auxiliary fuel $Q_p$ is injected, the amount of unburned hydrocarbons in the exhaust gas is increased and therefore the temperature of the $NO_x$ absorbent 71 is made to rapidly rise by the heat of the oxidation reaction of the unburned hydrocarbons. Rather than making the temperature of the exhaust gas rise to raise the temperature of the $NO_x$ absorbent 71, increasing the amount of the unburned hydrocarbons in the exhaust gas to make the temperature of the $NO_x$ absorbent 71 rise by the heat of the oxidation reaction can raise the temperature of the $NO_x$ absorbent 71 to a high temperature far faster, so rather than use of the second injection pattern shown in (III) of FIG. 26, use of the third injection pattern shown in (IV) of FIG. 26 can raise the temperature of the $NO_x$ absorbent 71 to a high temperature far faster.

Next, an explanation will be given of the processing routine of the $NO_x$ release flag set when $NO_x$ is to be released from the $NO_x$ absorbent 71 and the $SO_x$ release flag set when $SO_x$ is to be released from the $NO_x$ absorbent 71 while referring to FIG. 27. Note that this routine is executed by interruption every predetermined period.

Figure 27:
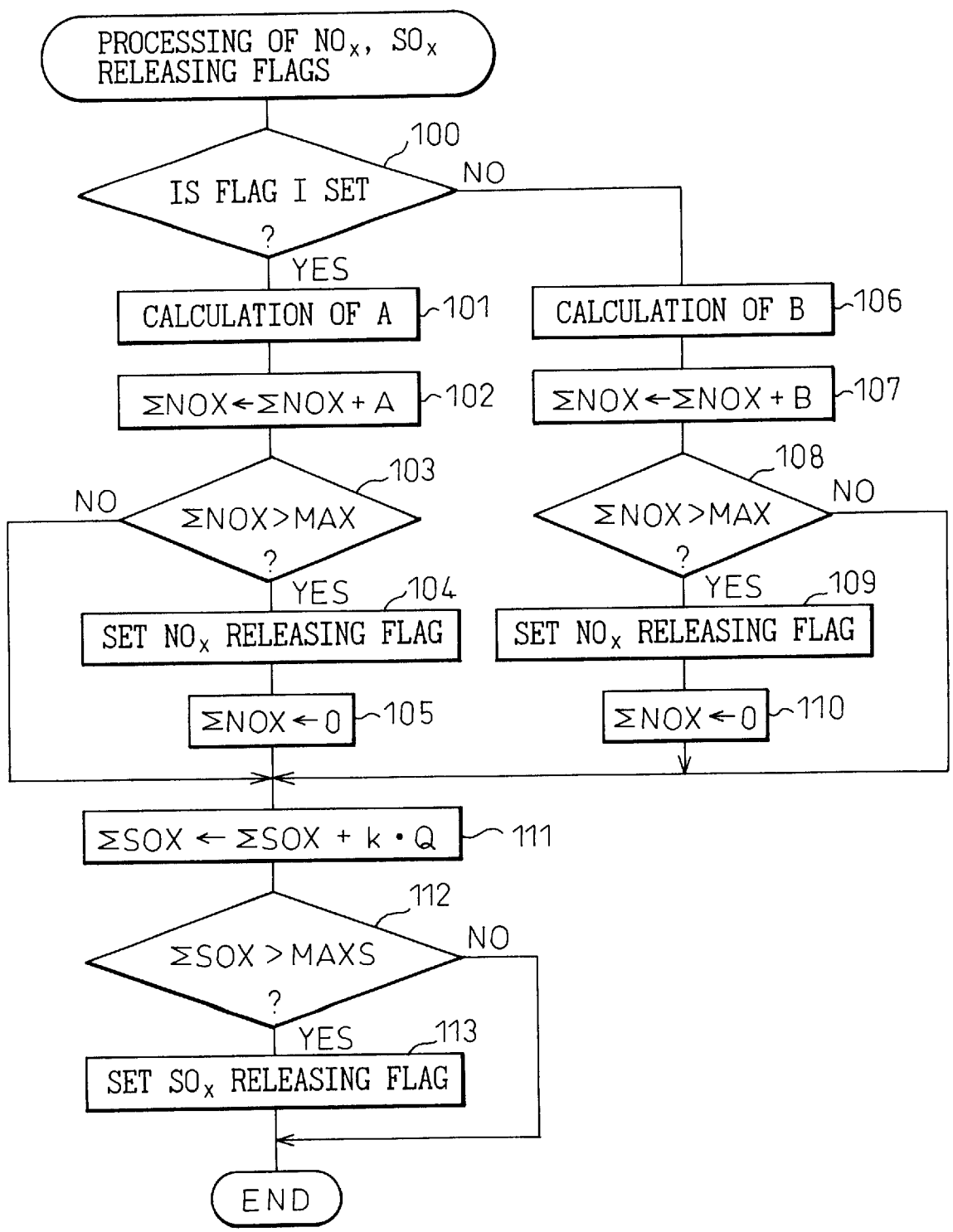
FIG. 27 is a flow chart of the processing of an $NO_x$ release flag and $SO_x$ release flag.

Referring to FIG. 27, first, at step 100, it is decided if the flag I showing that the operating region of the engine is the first operating region I is set. When the flag I is set, that is, when the operating region of the engine is the first operating region I, the routine proceeds to step 101 where the amount A of absorption of $NO_x$ per unit time is calculated from the map shown in FIG. 23A. Next, at step 102, A is added to the $NO_x$ absorption $KNO_x$. Next, at step 103, it is decided if the $NO_x$ absorption $\Sigma NOX$ exceeds the allowable maximum MAX. When $\Sigma NOX>MAX$, the routine proceeds to step 104, where the processing for setting the $NO_x$ release flag for exactly a predetermined time is performed. Next, at step 105, $\Sigma NOX$ is made zero. Next, the routine proceeds to step 111.

On the other hand, when it is decided at step 100 that the flag I is reset, that is, when the operating region of the engine is the second operating region II, the routine proceeds to step 106 where the amount B of absorption of $NO_x$ per unit time is calculated from the map shown in FIG. 23B. Next, at step 107, B is added to the $NO_x$ absorption $\Sigma NOX$. Next, at step 108, it is decided if the $NO_x$ absorption $\Sigma NOX$ exceeds the allowable maximum MAX. When $\Sigma NOX>MAX$, the routine proceeds to step 109, where processing is performed to set the $NO_x$ release flag for exactly the predetermined time. Next, at step 110, $\Sigma NOX$ is made zero. Next, the routine proceeds to step 111.

At step 111, the product K·Q of the amount Q of injection and the constant k is added to the $\Sigma SOX$. The fuel contains a substantially constant amount of sulfur S. Therefore, the amount of $SO_x$ absorbed in the $NO_x$ absorbent 71 can be expressed by K·Q. Therefore, the $\Sigma SOX$ obtained by successively adding this K·Q expresses the amount of $SO_x$ estimated to be absorbed in the $NO_x$ absorbent 71. At step 112, it is decided if the amount of $SO_x$ $\Sigma SOX$ exceeds the allowable maximum MAXS. When $\Sigma SOX>MAXS$, the routine proceeds to step 113, where the $SO_x$ release flag is set.

Next, an explanation will be given of the control of the operation while referring to FIG. 28 and FIG. 29.

Figure 28:
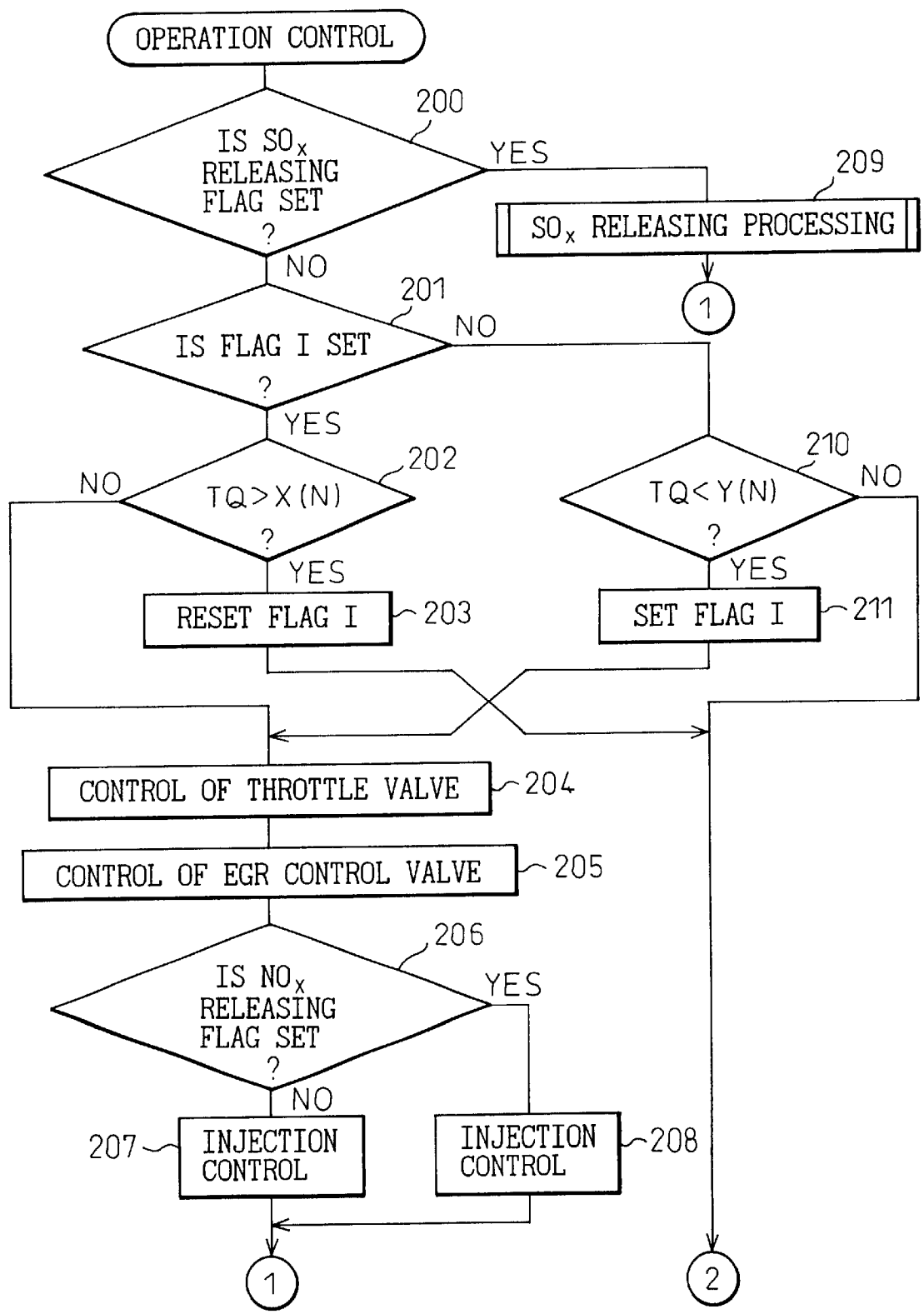
FIGS. 28 and 29 are flow charts of the control of engine operation.
Figure 29:
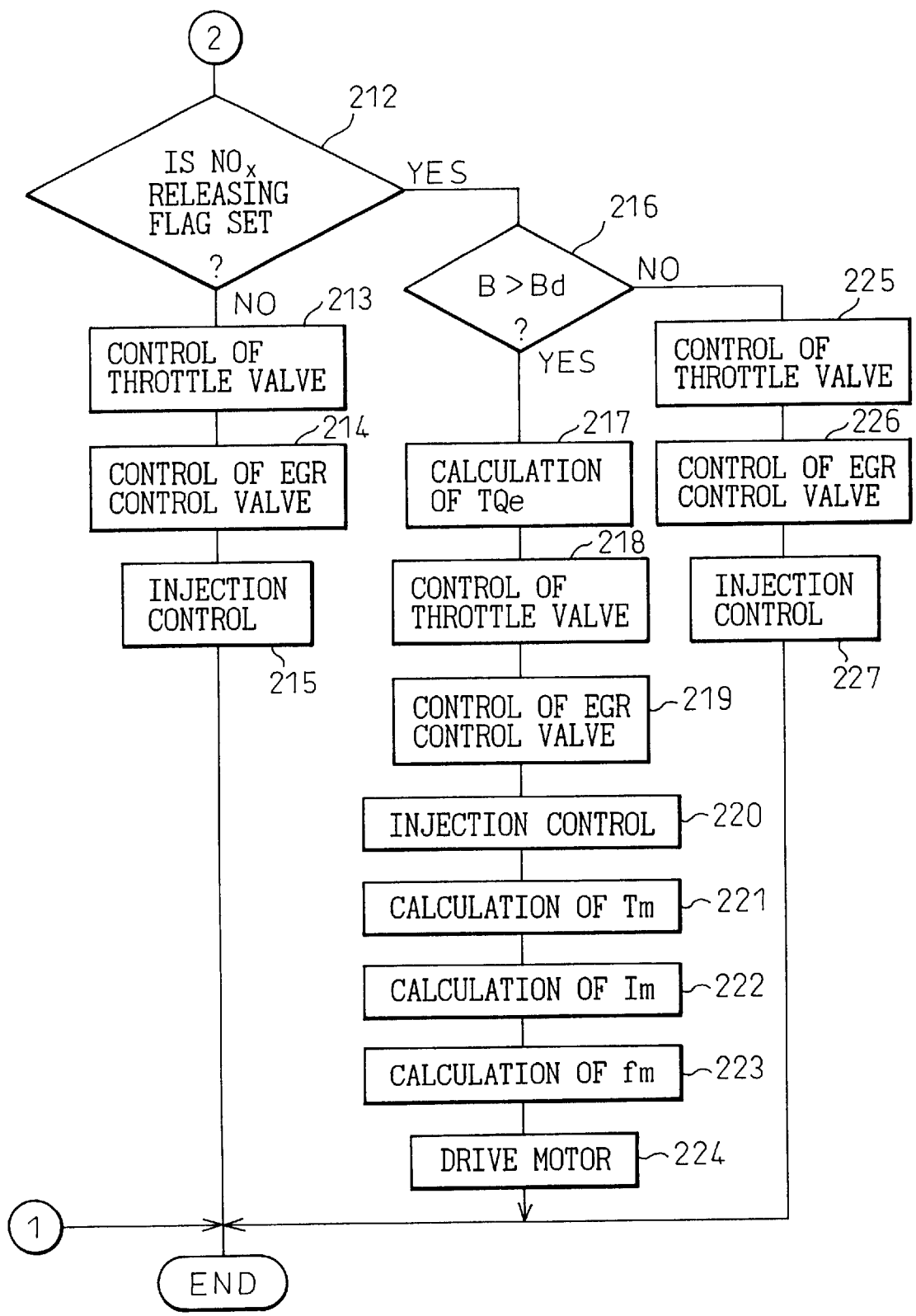

Referring to FIG. 28 and FIG. 29, first, at step 200, it is decided if the $SO_x$ release flag is set. When the $SO_x$ release flag is not set, the routine proceeds to step 201, where it is decided if the flag I showing that the operating state of the engine is the first operating region I shown in FIG. 10 has been set. When the flag I is set, that is, when the operating state of the engine is the first operating region I show in FIG. 10, the routine proceeds to step 202, where it is decided if the required torque TQ has become larger than the first boundary X(N) shown in FIG. 10. When $TQ \leq X(N)$, the routine proceeds to step 204, where low temperature combustion is performed.

That is, at step 204, the target opening degree ST of the throttle valve 21 is calculated from the map shown in FIG. 14A and the opening degree of the throttle valve 21 is made this target opening degree ST. Next, at step 205, the target opening degree SE of the EGR control valve 29 is calculated from the map shown in FIG. 14B and the opening degree of the EGR control valve 29 is made this target opening degree SE. Next, at step 206, it is decided if the $NO_x$ release flag has been set or not. When the $NO_x$ release flag is not set, the routine proceeds to step 207, where the amount Q of injection is calculated from the map shown in FIG. 13A, the injection start timing $\theta S$ is calculated from the map shown in FIG. 13B, and the fuel is injected based on these calculated values.

On the other hand, when it is decided at step 206 that the $NO_x$ release flag is set, the routine proceeds to step 208 where the amount of fuel injected is increased to make the air-fuel ratio rich for a predetermined time, make the $\Sigma NOX$ zero, and reset the $NO_x$ release flag. The $NO_x$ is released from the $NO_x$ absorbent 71 during this time.

On the other hand, when it is decided at step 202 that $TQ>X(N)$, the routine proceeds to step 203, where the flag I is reset, then the routine proceeds to step 212, where it is decided if the $NO_x$ release flag is set. When the $NO_x$ release flag is not set, the routine proceeds to step 213, where the second combustion is performed.

That is, at step 213, the target opening degree ST of the throttle valve 21 is calculated from the map shown in FIG. 17A and the opening degree of the throttle valve 21 is made the target opening degree ST. Next, at step 214, the target opening degree SE of the EGR control valve 29 is calculated from the map shown in FIG. 17B and the opening degree of the EGR control valve 29 is made this target opening degree SE. Next, at step 215, the amount of injection Q is calculated from the map shown in FIG. 16A, the injection start timing $\theta S$ is calculated from the map shown in FIG. 16B, and the fuel is injected based on these calculated values.

On the other hand, when it is decided at step 212 that the $NO_x$ release flag has been set, the routine proceeds to step 216, where it is decided if the amount B of electrical energy stored in the battery 41 is larger than the setting Bd. When $B>Bd$, the routine proceeds to step 217, where the output torque of the engine for low temperature combustion is reduced and the electric motor 37 is operated.

That is, at step 217, the required torque of the engine is reduced from TQ to the required torque TQe at the time of the lowest load shown in FIG. 25A. Next, at step 218, the target opening degree ST of the throttle valve 21 is calculated from the map shown in FIG. 14A based on the required torque TQ (=TQe) and the opening degree of the throttle valve 21 is made this target opening degree ST. Next, at step 219, the target opening degree SE of the EGR control valve 29 is calculated from the map shown in FIG. 14B based on this required torque TQ (=TQe) and the opening degree of the EGR control valve 29 is made this target opening degree SE. Next, at step 220, the amount of injection Q calculated from the map shown in FIG. 13A is increased based on the required torque TQ (=TQe) and the air-fuel ratio is made temporarily rich. At this time, the $NO_x$ is released from the $NO_x$ absorbent 71.

Next, at step 221, the difference between the required torque TQt and the required torque TQe shown in FIG. 25A, that is, the drop $\Delta TQ$ of the engine output torque, is made the output torque Tm to be generated by the electric motor 37. Next, at step 222, the current value Im of the three-phase alternating current to be supplied to the electric motor 37 for the electric motor 37 to generate the output torque Tm is calculated. Next, at step 223, the frequency fin of the three-phase alternating current to be supplied to the electric motor 37 is calculated based on the engine rotational speed N. Next, at step 224, the three-phase alternating current having the current value Im and the frequency fin is supplied to the electric motor 37. Due to this, the electric motor 37 is driven.

On the other hand, when it is decided at step 216 that $B \leq Bd$, the routine proceeds to step 225, where the second combustion is performed, the operation of the electric motor 37 is stopped, and additional fuel is injected at the end of the expansion stroke or during the exhaust stroke. That is, at step 225, the target opening degree ST of the throttle valve 21 is calculated from the map shown in FIG. 17A and the opening degree of the throttle valve 21 is made the target opening degree ST. Next, at step 226, the target opening degree SE of the EGR control valve 29 is calculated from the map shown in FIG. 17B and the opening degree of the EGR control valve 29 is made this target opening degree SE. Next, at step 227, the amount of injection Q is calculated from the map shown in FIG. 16A, the injection start timing $\theta S$ is calculated from the map shown in FIG. 16B, and the fuel is injected based on these calculated values. Further, the auxiliary fuel required for making the air-fuel ratio of the exhaust gas flowing into the $NO_x$ absorbent 71 at this time is injected for a predetermined time at the end of the expansion stroke or the exhaust stroke, then the $\Sigma NOX$ is made zero and the $NO_x$ release flag is reset. During this time, the $NO_x$ is released from the $NO_x$ absorbent 71.

When the flag I is reset, at the next processing cycle, the routine proceeds from step 201 to step 210, where it is decided if the required torque TQ has become lower than the second boundary Y(N) shown in FIG. 10. When $TQ \geq Y(N)$, the routine proceeds to step 212. On the other hand, when it is decided at step 210 that $TQ<Y(N)$, the routine proceeds to step 211, where the flag I is set, then the routine proceeds to step 204, where low temperature combustion is performed.

Figure 30:
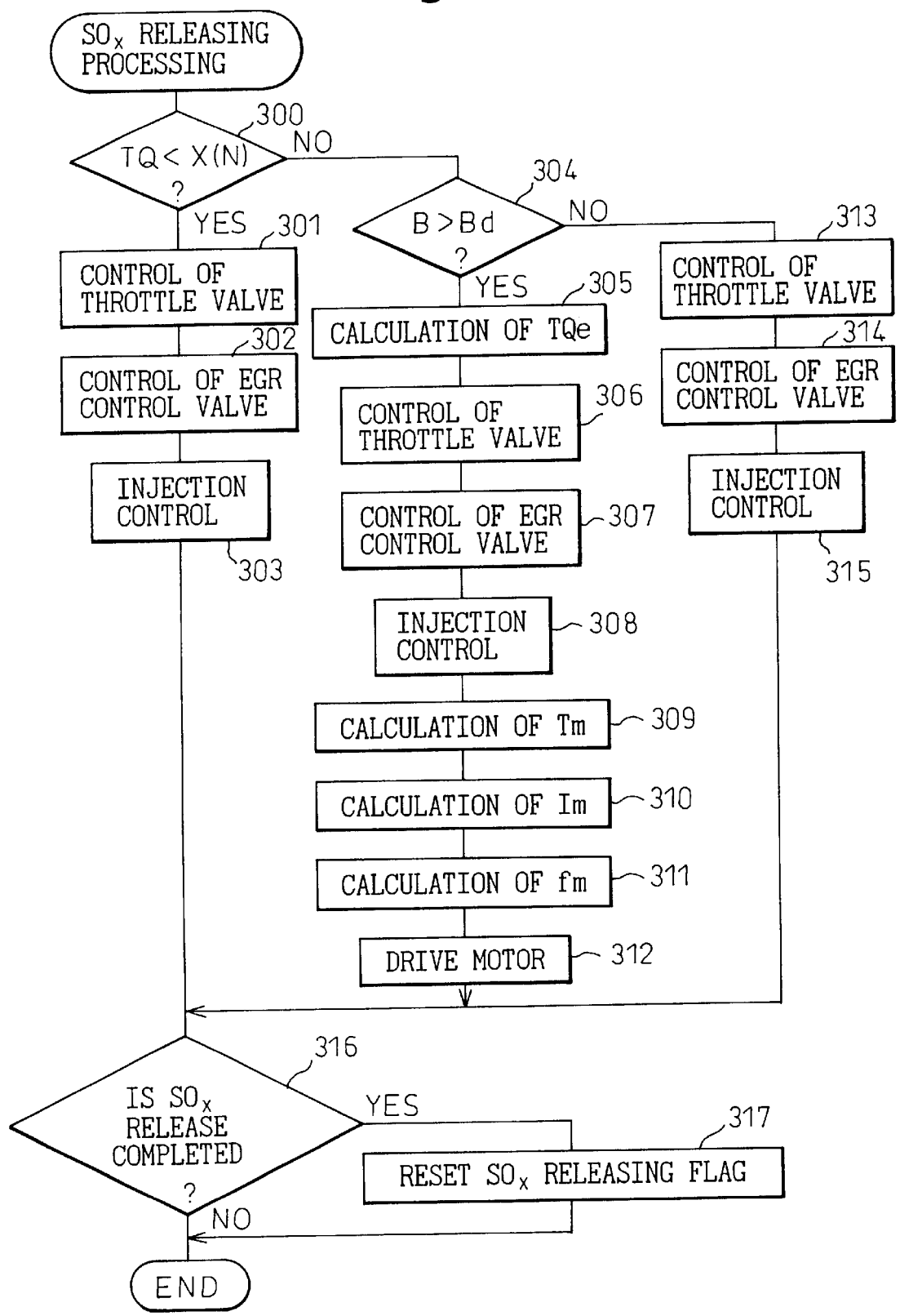
FIG. 30 is a flow chart of a first embodiment for $SO_x$ release processing.

On the other hand, when it is decided at step 200 that the $SO_x$ release flag is set, the routine proceeds to step 209, where the processing for release of $SO_x$ from the $NO_x$ absorbent 71 is performed. FIG. 30 shows a first embodiment of this $SO_x$ release processing.

Referring to FIG. 30, first, at step 300, it is decided if the required torque TQ is smaller than the first boundary X(N) shown in FIG. 10. When $TQ<X(N)$, the routine proceeds to step 301, where the air-fuel ratio is made rich under low temperature combustion.

That is, at step 301, the target opening degree ST of the throttle valve 21 is calculated from the map shown in FIG.

14A and the opening degree of the throttle valve 21 is made this target opening degree ST. Next, at step 302, the target opening degree SE of the EGR control valve 29 is calculated from the map shown in FIG. 14B and the opening degree of the EGR control valve 29 is made this target opening degree SE. Next, at step 303, the amount Q of injection is calculated from the map shown in FIG. 13A, the injection start timing θS is calculated from the map shown in FIG. 13B, and the calculated amount of injection Q is increased and the air-fuel ratio is made rich. Next, the routine proceeds to step 316. At this time, the temperature of the $NO_x$ absorbent 71 is maintained at over 600° C. and the air-fuel ratio is made rich, so $SO_x$ is released from the $NO_x$ absorbent 71. Further, at this time, the $NO_x$ is also released from the $NO_x$ absorbent 71 and any particulate deposited on the particulate filter 24 is removed by oxidation.

On the other hand, when it is decided at step 300 that TQ≧X(N), the routine proceeds to step 304, where it is decided if the amount B of electrical energy stored in the battery 41 is larger than the setting Bd. When B>Bd, the routine proceeds to step 305, where the output torque of the engine for low temperature combustion is reduced and the electric motor 37 is operated.

That is, at step 305, the required torque of the engine is reduced from TQt to the substantially maximum required torque TQe (N) where low temperature combustion is possible shown in FIG. 25B. Next, at step 306, the target opening degree ST of the throttle valve 21 is calculated from the map shown in FIG. 14A based on the required torque TQ (=TQe(N)) and the opening degree of the throttle valve 21 is made this target opening degree ST. Next, at step 307, the target opening degree SE of the EGR control valve 29 is calculated from the map shown in FIG. 14B based on this required torque TQ (=TQe(N)) and the opening degree of the EGR control valve 29 is made this target opening degree SE. Next, at step 308, the amount of injection Q calculated from the map shown in FIG. 13A is increased based on the required torque TQ (=TQe) and the air-fuel ratio is made rich. At this time, the $SO_x$ is released from the $NO_x$ absorbent 71. Further, at this time, the $NO_x$ is released from the $NO_x$ absorbent 71 and any particulate deposited on the particulate filter 24 is removed by oxidation.

Next, at step 309, the difference between the required torque TQt and the required torque TQe shown in FIG. 25B, that is, the drop ΔTQ of the engine output torque, is made the output torque Tm to be generated by the electric motor 37. Next, at step 310, the current value Im of the three-phase alternating current to be supplied to the electric motor 37 for the electric motor 37 to generate the output torque Tm is calculated. Next, at step 311, the frequency fin of the three-phase alternating current to be supplied to the electric motor 37 is calculated based on the engine rotational speed N. Next, at step 312, the three-phase alternating current having the current value Im and the frequency fin is supplied to the electric motor 37. Due to this, the electric motor 37 is driven.

On the other hand, when it is decided at step 304 that B≦Bd, the routine proceeds to step 313, where the second combustion is performed under a lean air-fuel ratio, the operation of the electric motor 37 is stopped, and the temperature is controlled to rise to maintain the temperature TF of the $NO_x$ absorbent 71, that is, the particulate filter 24, at over 600° C. That is, at step 313, the target opening degree ST of the throttle valve 21 is calculated from the map shown in FIG. 17A and the opening degree of the throttle valve 21 is made the target opening degree ST. Next, at step 314, the target opening degree SE of the EGR control valve 29 is calculated from the map shown in FIG. 17B and the opening degree of the EGR control valve 29 is made this target opening degree SE. Next, at step 315, fuel is injected by one of the injection patterns of the first injection pattern (II), second injection pattern (III), and third injection pattern (IV) shown in FIG. 26. At this time as well, any particulate deposited on the particulate filter 24 is removed by oxidation. Next, the routine proceeds to step 316.

At step 316, it is decided if the action of release of $SO_x$ from the $NO_x$ absorbent 71 has been completed. Whether the action of release of $SO_x$ has been completed is for example estimated from the time where the air-fuel ratio is made rich etc. When it is decided that the action of release of $SO_x$ has been completed, the routine proceeds to step 317, where the $SO_x$ release flag is reset and ΣSOX and ΣNOX are made zero.

Figure 31:
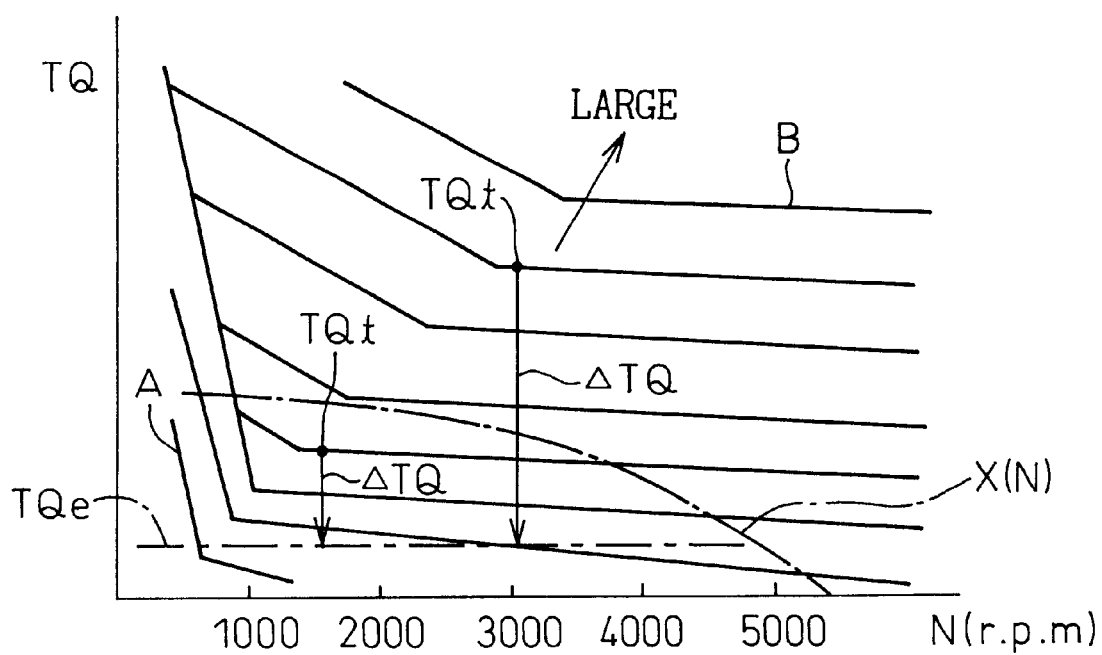
FIG. 31 is a view of the required torque.
Figure 32:
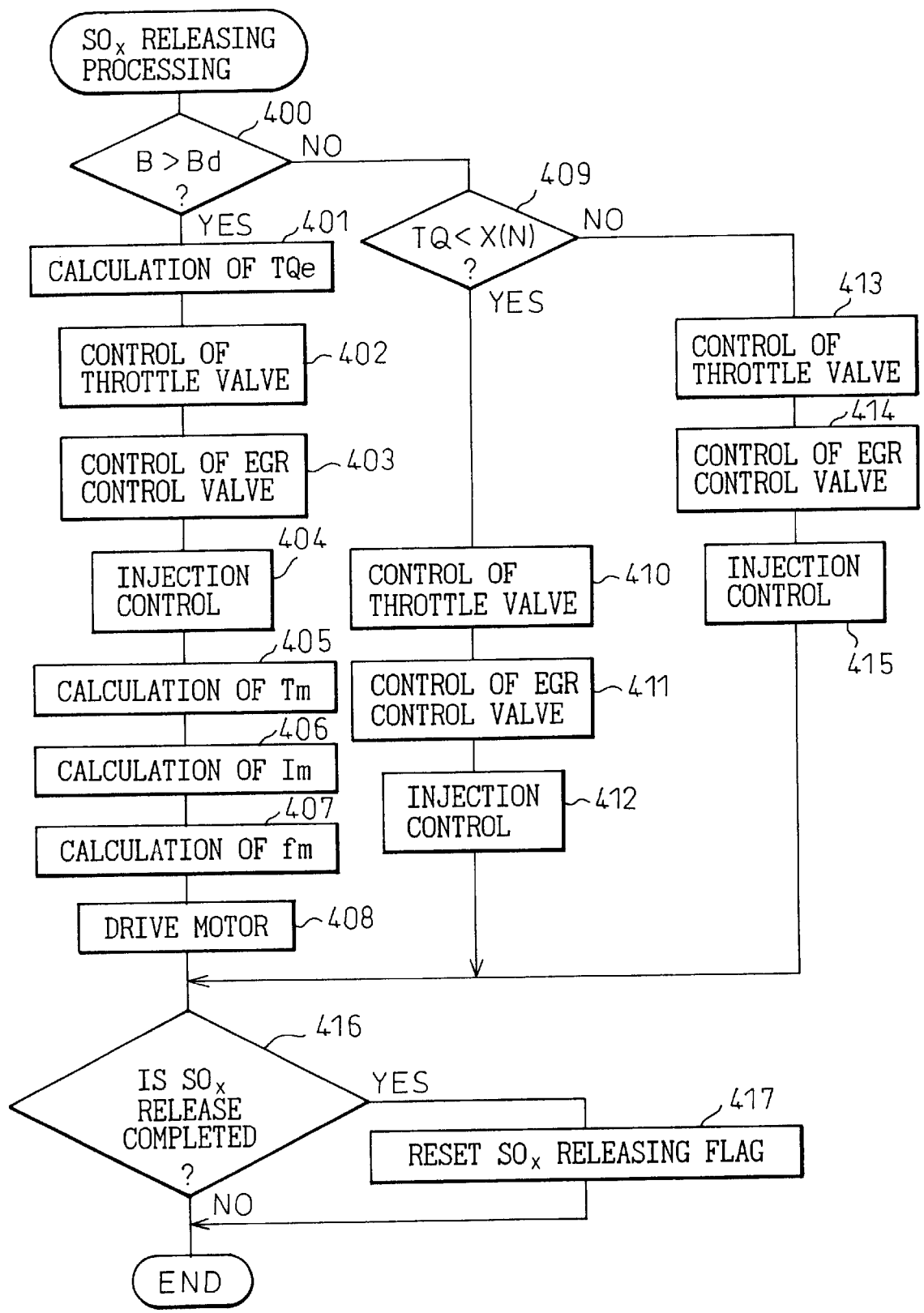
FIG. 32 is a flow chart of a second embodiment for $SO_x$ release processing.

FIG. 31 and FIG. 32 show a second embodiment of the $SO_x$ release processing.

In this second embodiment, when B>Bd when $SO_x$ is to be released from the $NO_x$ absorbent 71, that is, when there is leeway in the amount B of the electrical energy stored in the battery 41, as shown in FIG. 31, whether TQ<X(N) or TQ≧X(N), the required torque of the engine is reduced from TQt to the required torque TQ of the lowest load, the drop in the engine output torque is made up for by the output torque of the electric motor 37, and the air-fuel ratio is made rich.

On the other hand, when B≦Bd, that is, when there is no leeway in the amount B of the electrical energy stored in the battery 41, if TQ<X(N), the air-fuel ratio is made rich under low temperature combustion, while if TQ≧X(N), the temperature of the $NO_x$ absorbent 71, that is, the particulate filter 24, is controlled to rise under the second combustion.

Referring to FIG. 32, first, at step 400, it is decided if the amount B of the electrical energy stored in the battery 41 is larger than the setting Bd. When B>Bd, whether low temperature combustion is being performed or the second combustion is being performed, the routine proceeds to step 401, where the output torque of the engine is reduced and the electric motor 37 is operated.

That is, at step 401, the required torque of the engine is reduced from TQt to the required torque TQe at the time of the lowest load shown in FIG. 31. Next, at step 402, the target opening degree ST of the throttle valve 21 is calculated from the map shown in FIG. 14A based on the required torque TQ (=TQe) and the opening degree of the throttle valve 21 is made this target opening degree ST. Next, at step 403, the target opening degree SE of the EGR control valve 29 is calculated from the map shown in FIG. 14B based on this required torque TQ (=TQe) and the opening degree of the EGR control valve 29 is made this target opening degree SE. Next, at step 404, the amount of injection Q calculated from the map shown in FIG. 13A is increased based on the required torque TQ (=TQe) and the air-fuel ratio is made rich. At this time, the $SO_x$ is released from the $NO_x$ absorbent 71. Further, at this time, the $NO_x$ is released from the $NO_x$ absorbent 71 and any particulate deposited on the particulate filter 24 is removed by oxidation.

Next, at step 405, the difference between the required torque TQt and the required torque TQe shown in FIG. 31, that is, the drop ΔTQ of the engine output torque, is made the output torque Tm to be generated by the electric motor 37. Next, at step 406, the current value Im of the three-phase alternating current to be supplied to the electric motor 37 for the electric motor 37 to generate the output torque Tm is calculated. Next, at step 407, the frequency fin of the three-phase alternating current to be supplied to the electric motor 37 is calculated based on the engine rotational speed N. Next, at step 408, the three-phase alternating current having the current value Im and the frequency fin is supplied to the electric motor 37. Due to this, the electric motor 37 is driven.

On the other hand, when it is decided at step 400 that B≦Bd, the routine proceeds to step 409, where it is decided if the required torque TQ is smaller than the first boundary X(N) shown in FIG. 10. When TQ<X(N), the routine proceeds to step 410, where the operation of the electric motor 37 is stopped and the air-fuel ratio is made rich under low temperature combustion.

That is, at step 410, the target opening degree ST of the throttle valve 21 is calculated from the map shown in FIG. 14A and the opening degree of the throttle valve 21 is made the target opening degree ST. Next, at step 411, the target opening degree SE of the EGR control valve 29 is calculated from the map shown in FIG. 14B and the opening degree of the EGR control valve 29 is made this target opening degree SE. Next, at step 412, the amount Q of injection is calculated from the map shown in FIG. 13A, the injection start timing θS is calculated from the map shown in FIG. 13B, and the calculated amount of fuel Q is increased and the air-fuel ratio is made rich. Next, the routine proceeds to step 416. At this time, the temperature of the $NO_x$ absorbent 71 is maintained at over 600° C. and the air-fuel ratio is made rich, so $SO_x$ is released from the $NO_x$ absorbent 71. Further, at this time, $NO_x$ is also released from the $NO_x$ absorbent 71 and particulate deposited on the particulate filter 24 is removed by oxidation.

On the other hand, when it is decided at step 409 that TQ≧X(N), the second combustion is performed under a lean air-fuel ratio, the operation of the electric motor 37 is stopped, and the temperature is controlled to rise to maintain the temperature TF of the $NO_x$ absorbent 71, that is, the particulate filter 24, at over 600° C. That is, at step 413, the target opening degree ST of the throttle valve 21 is calculated from the map shown in FIG. 17A and the opening degree of the throttle valve 21 is made the target opening degree ST. Next, at step 414, the target opening degree SE of the EGR control valve 29 is calculated from the map shown in FIG. 17B and the opening degree of the EGR control valve 29 is made this target opening degree SE. Next, at step 415, fuel is injected by one of the injection patterns of the first injection pattern (II), second injection pattern (III), and third injection pattern (IV) shown in FIG. 26. At this time as well, any particulate deposited on the particulate filter 24 is removed by oxidation. Next, the routine proceeds to step 416.

At step 416, it is decided if the action of release of $SO_x$ from the $NO_x$ absorbent 71 has been completed. When it is decided that the action of release of $SO_x$ has been completed, the routine proceeds to step 417, where the $SO_x$ release flag is reset and ΣSOX and ΣNOX are made zero.

Figure 33:
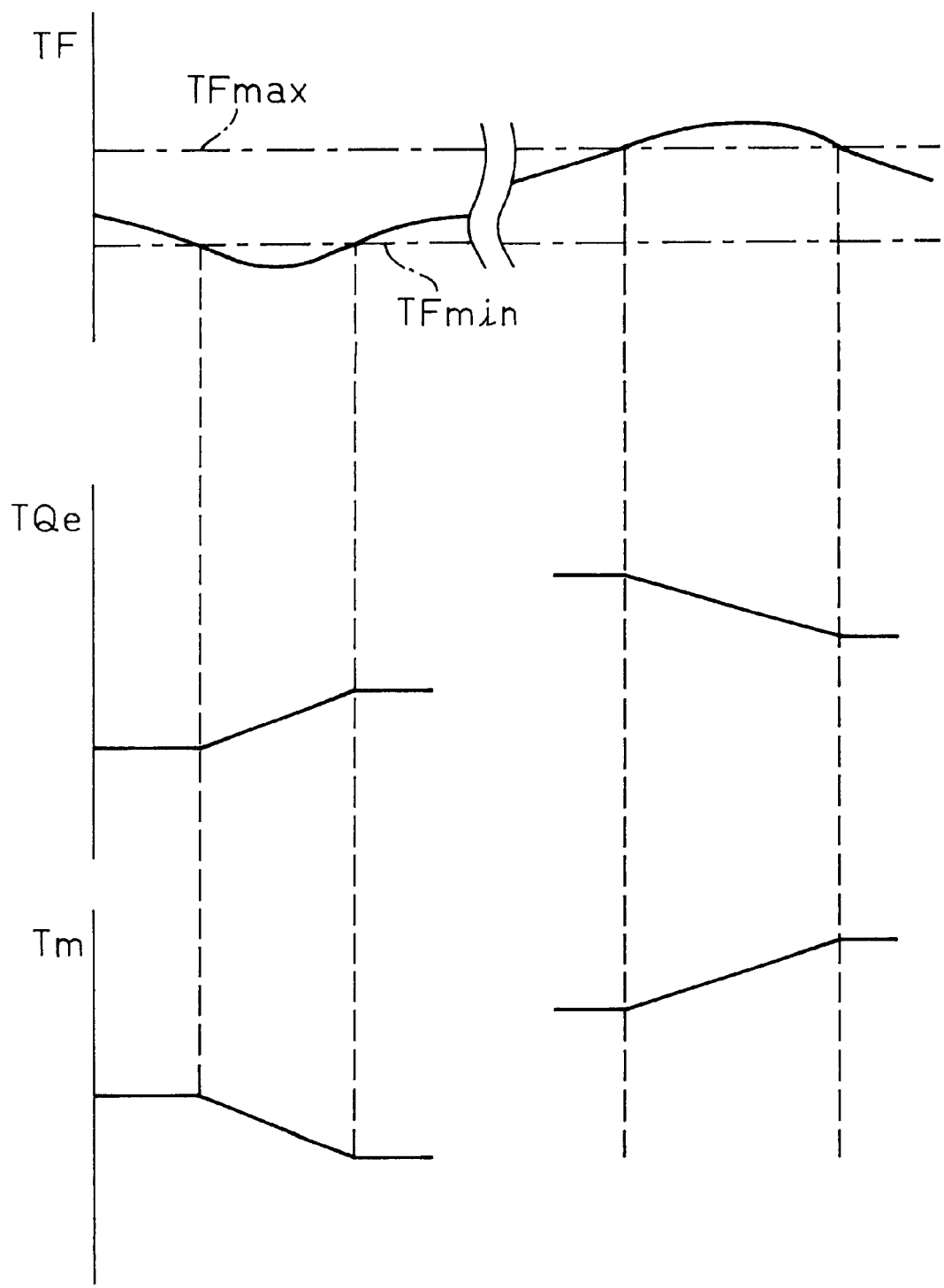
FIG. 33 is a view of the required torque.
Figure 34:
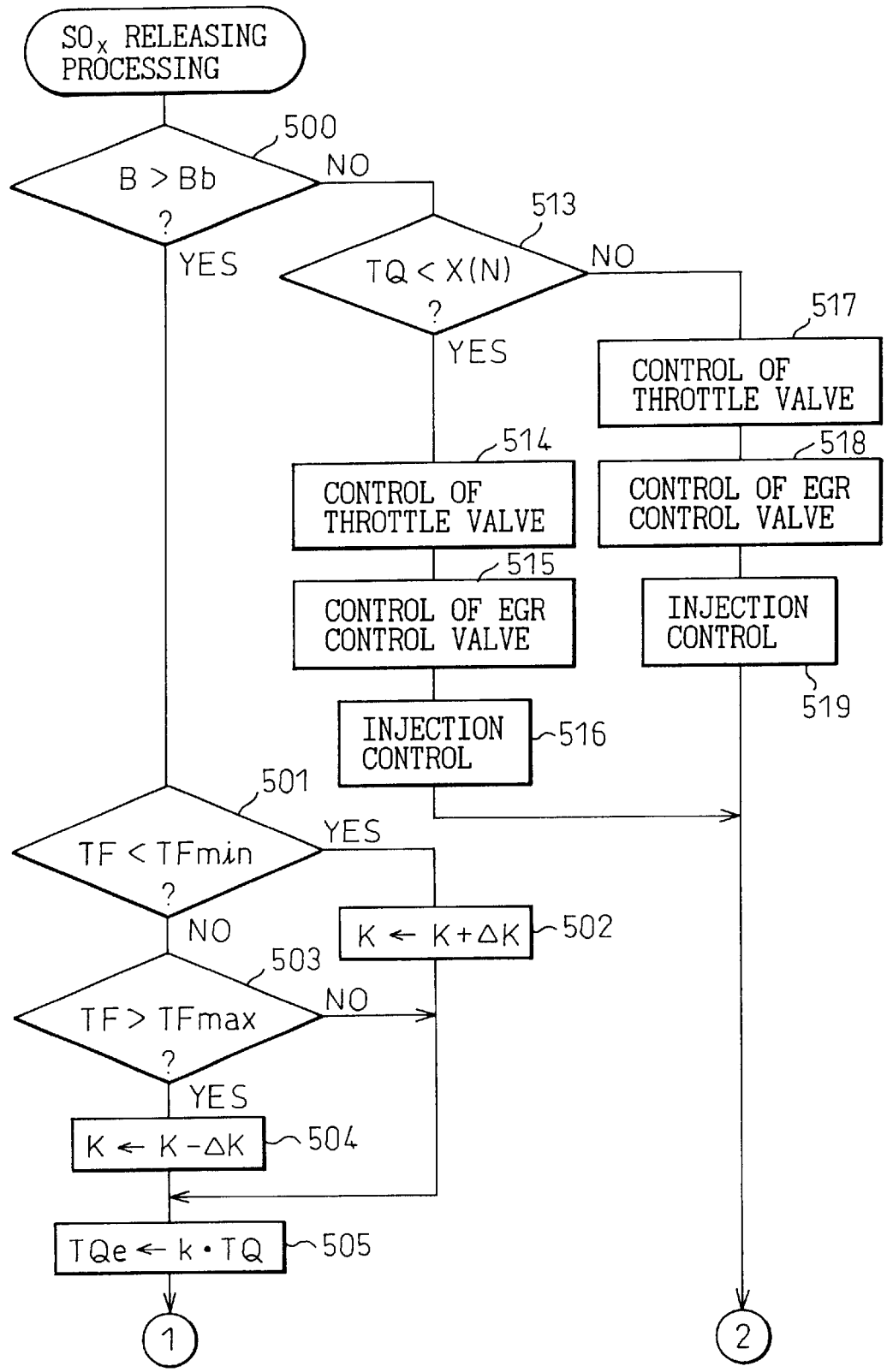
FIGS. 34 and 35 are flow charts of a third embodiment for $SO_x$ release processing.
Figure 35:
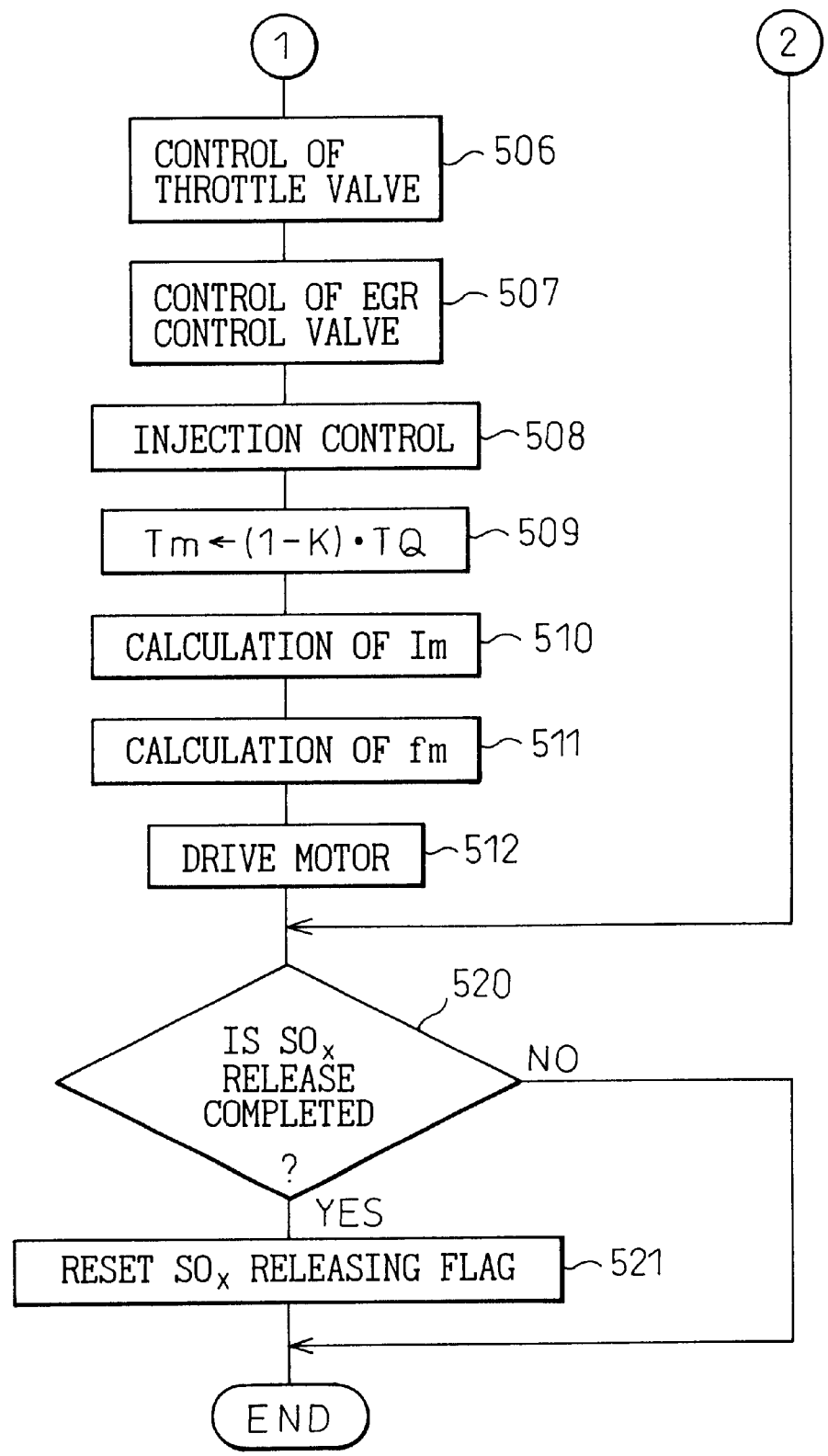

FIG. 33 to FIG. 35 show a third embodiment of the $SO_x$ release processing.

In this third embodiment as well, when B>Bd when $SO_x$ is to be released from the $NO_x$ absorbent 71, that is, when there is leeway in the amount B of the electrical energy stored in the battery 41, whether TQ<X(N) or TQ≦X(N), the required torque of the engine is reduced to TQe, the air-fuel ratio is made rich under low temperature combustion, and the drop in the engine output torque is made up for by the output torque of the electric motor 37.

In the third embodiment, however, the required torque TQ determined from the amount of depression of the accelerator pedal 44 is divided into the required torque TQe when the output torque of the engine is reduced and the output torque Tm of the electric motor 37 based on the following formulas so that the temperature of the $NO_x$ absorbent 71, that is, the particulate filter 24, is maintained between a predetermined lower limit temperature TFmin, for example, 600° C., and a predetermined upper limit temperature TFmax, for example 650° C.

$TQe = K \cdot TQ$ $Tm = (1-K) \cdot TQ$

That is, even when the required torque TQ is the same, if the output torque of the engine is made larger and the output torque of the electric motor 37 is made smaller, that is, the ratio of distribution of torque K is increased, the temperature of the exhaust gas rises, so the temperature of the particulate filter 24 rises. Even when the required torque TQ is the same, if the output torque of the engine is made smaller and the output torque of the electric motor 37 is made larger, that is, the ratio of distribution of the torque K is decreased, the temperature of the exhaust gas falls, so the temperature of the particulate filter 24 falls.

Therefore, in the third embodiment, the temperature TF of the particulate filter 24 is detected or estimated by a temperature sensor 43 attached to the exhaust pipe 26. When the temperature TF of the particulate filter 24 becomes lower than the lower limit temperature TFmin as shown in FIG. 33, by making the required torque TQe larger and making the output torque Tm of the electric motor 37 smaller, that is, by increasing the ratio of distribution of torque K, the temperature TF of the particulate filter 24 is made to rise over the lower limit temperature TFmin. When the temperature TF of the particulate filter 24 becomes higher than the upper limit temperature TFmax, by making the required torque TQ smaller and making the output torque Tm of the electric motor 37 larger, that is, by decreasing the ratio of distribution of torque K, the temperature TF of the particulate filter 24 is made lower than the upper limit temperature TFmax.

On the other hand, when B≦Bd, that is, when there is no leeway in the amount B of the electrical energ stored in the battery 41, if TQ<X(N), the air-fuel ratio is made rich under low temperature combustion, while if TQ≧X(N), the temperature of the $NO_x$ absorbent 71, that is, the particulate filter 24, is controlled to rise under the second combustion.

Referring to FIG. 34 and FIG. 35, first, at step 500, it is decided if the amount B of the electrical energy stored in the battery 41 is larger than the setting Bd. When B>Bd, the routine proceeds to step 501, where the output torque of the engine for low temperature combustion is reduced, the electric motor 37 is operated, and the temperature TF of the particulate filter 24 is controlled.

That is, at step 501, it is decided if the temperature TF of the particulate filter 24 is lower than the lower limit temperature TFmin. When TF<TFmin, the routine proceeds to step 502, where the constant ΔK is added to the ratio of distribution of torque K, that is, the ratio of distribution of torque K is increased, then the routine proceeds to step 505. As opposed to this, when TF≧TFmin, the routine proceeds to step 503, where it is decided if the temperature TF of the particulate filter 24 is higher than the upper limit temperature TFmax. When TF>TFmax, the routine proceeds to step 504, where the constant ΔK is subtracted from the ratio of distribution of torque K, that is, the ratio of distribution of torque K is decreased, then the routine proceeds to step 505. At step 505, the required torque TQe of the engine is calculated from the following equation:

$TQe = K \cdot TQ$

Next, at step 506, the target opening degree ST of the throttle valve 21 is calculated from the map shown in FIG. 14A based on the required torque TQ (=TQe) and the opening degree of the throttle valve 21 is made this target opening degree ST. Next, at step 507, the target opening degree SE of the EGR control valve 29 is calculated from the map shown in FIG. 14B based on this required torque TQ (=TQe) and the opening degree of the EGR control valve 29 is made this target opening degree SE. Next, at step 508, the amount of injection Q calculated from the map shown in FIG. 13A is increased based on the required torque TQ (=TQe) and the air-fuel ratio is made rich. At this time, the $SO_x$ is released from the $NO_x$ absorbent 71. Further, at this time, the $NO_x$ is released from the $NO_x$ absorbent 71 and any particulate deposited on the particulate filter 24 is removed by oxidation.

Next, at step 509, the output torque Tm of the electric motor 37 is calculated based on the following equation:

$$Tm=(1-K)\cdot TQ$$

Next, at step 510, the current value Im of the three-phase alternating current to be supplied to the electric motor 37 for the electric motor 37 to generate the output torque Tm is calculated. Next, at step 511, the frequency fin of the three-phase alternating current to be supplied to the electric motor 37 is calculated based on the engine rotational speed N. Next, at step 512, the three-phase alternating current having the current value Im and the frequency fin is supplied to the electric motor 37. Due to this, the electric motor 37 is driven. Next, the routine proceeds to step 520.

On the other hand, when it is decided at step 500 that B≦Bd, the routine proceeds to step 513, where it is decided if the required torque TQ is smaller than the first boundary X(N) shown in FIG. 10. When TQ<X(N), the routine proceeds to step 514, where the air-fuel ratio is made rich under low temperature combustion.

That is, at step 514, the target opening degree ST of the throttle valve 21 is calculated from the map shown in FIG. 14A and the opening degree of the throttle valve 21 is made the target opening degree ST. Next, at step 515, the target opening degree SE of the EGR control valve 29 is calculated from the map shown in FIG. 14B and the opening degree of the EGR control valve 29 is made this target opening degree SE. Next, at step 516, the amount Q of injection is calculated from the map shown in FIG. 13A, the injection start timing θS is calculated from the map shown in FIG. 13B, and the calculated amount of fuel Q is increased and the air-fuel ratio is made rich. Next, the routine proceeds to step 520. At this time, the temperature of the $NO_x$ absorbent 71 is maintained at over 600° C. and the air-fuel ratio is made rich, so $SO_x$ is released from the $NO_x$ absorbent 71. Further, at this time, $NO_x$ is also released from the $NO_x$ absorbent 71 and particulate deposited on the particulate filter 24 is removed by oxidation.

On the other hand, when it is decided at step 513 that TQ≧X(N), the second combustion is performed under a lean air-fuel ratio, the operation of the electric motor 37 is stopped, and the temperature is controlled to rise so that the temperature TF of the $NO_x$ absorbent 71, that is, the particulate filter 24, is maintained at over 600° C. That is, at step 517, the target opening degree ST of the throttle valve 21 is calculated from the map shown in FIG. 17A and the opening degree of the throttle valve 21 is made the target opening degree ST. Next, at step 518, the target opening degree SE of the EGR control valve 29 is calculated from the map shown in FIG. 17B and the opening degree of the EGR control valve 29 is made this target opening degree SE.

Next, at step 519, fuel is injected by one of the injection patterns of the first injection pattern (II), second injection pattern (III), and third injection pattern (IV) shown in FIG. 26. At this time as well, any particulate deposited on the particulate filter 24 is removed by oxidation. Next, the routine proceeds to step 520.

At step 520, it is decided if the action of release of $SO_x$ from the $NO_x$ absorbent 71 has been completed. When it is decided that the action of release of $SO_x$ has been completed, the routine proceeds to step 521, where the $SO_x$ release flag is reset and ΣSOX and ΣNOX are made zero.

Note that the temperature TF of the particulate filter 24 can also be controlled by changing the amount of delay of the main injection Qm or the amounts of the auxiliary fuel Qv and Qp. That is, when TF<TFmin, it is possible to make TF>TFmin by increasing the amount of delay of the main injection Qm or the amounts of the auxiliary fuel Qv and Qp. When TF>TFmax, it is possible to make TF<TFmax by reducing the amount of delay of the main injection Qm or the amounts of auxiliary fuel Qv and Qp.

Further, by changing the EGR rate at the time of low temperature combustion, it is possible to control the temperature TF of the particulate filter 24. That is, when TF<TFmin, by reducing the EGR rate, it is possible to make TF>TFmin. When TF>TFmax, it is possible to make TF<TFmax by raising the EGR rate.

Next, an explanation will be made of the control of the operation at the time of engine acceleration and deceleration. In this embodiment of the present invention, the electric motor 37 is driven at the time of acceleration so as to obtain a good acceleration operation even at the time of acceleration in an operating region where the exhaust turbocharger 15 does not operate. On the other hand, at the time of deceleration, the electric motor 37 is operated as a generator and the generated electric power is stored.

Figure 36:
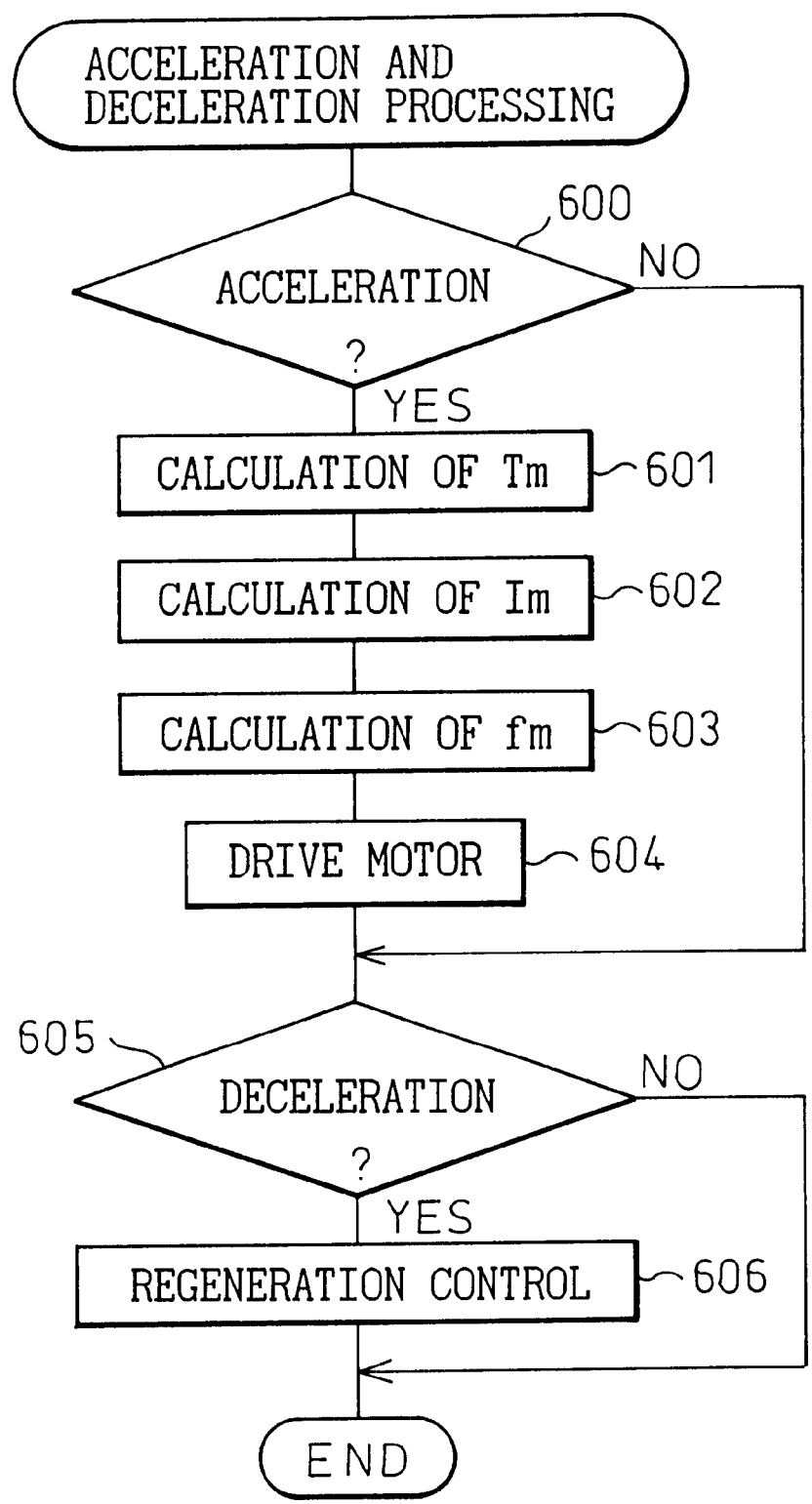
FIG. 36 is a flow chart of acceleration and deceleration processing.

FIG. 36 shows the processing routine at the time of acceleration and deceleration. This routine is executed by interruption every predetermined time.

Figure 37:
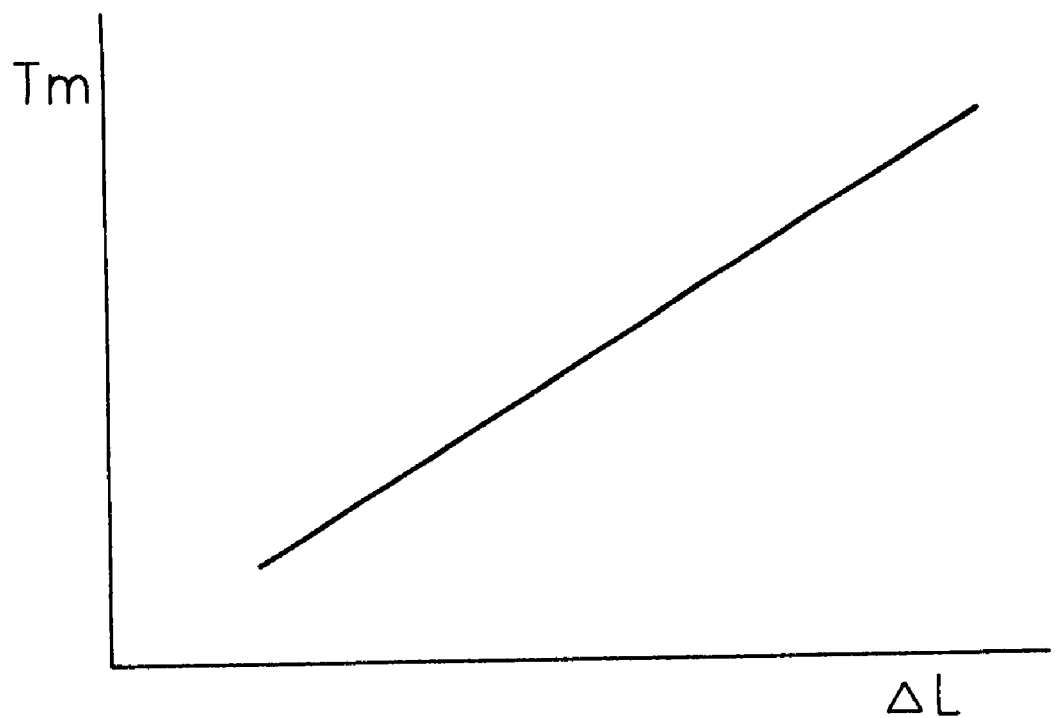
FIG. 37 is a view of an output torque to be generated by an electric motor.

Referring to FIG. 36, first, at step 600, it is decided if the engine is accelerating from the amount of change ΔL (>0) of the amount of depression L of the accelerator pedal 44. When the engine is accelerating, the routine proceeds to step 601, where the output torque Tm to be generated by the electric motor 37 is calculated. The output torque Tm becomes larger the larger the amount of change ΔL of the amount of depression L of the accelerator pedal 44 as shown in FIG. 37. Next, at step 602, the current value Im of the three-phase alternating current to be supplied to the electric motor 37 for the electric motor 37 to generate the output torque Tm is calculated. Next, at step 603, the frequency fin of the three-phase alternating current to be supplied to the electric motor 37 is calculated based on the engine rotational speed N. Next, at step 604, the three-phase alternating current having the current value Im and the frequency fin is supplied to the electric motor 37, whereby the electric motor 37 is driven. In this way, at the time of engine acceleration, the output torque of the electric motor 37 is superposed on the output torque of the engine.

Next, at step 605, it is decided if the engine is decelerating from the amount of depression L of the accelerator pedal 44 and the engine rotational speed N. When the engine is decelerating, the routine proceeds to step 606, where the electric motor 37 is operated as a generator and the generated electric power is stored in the battery 41.

While the invention has been described with reference to specific embodiments chosen for purpose of illustration, it should be apparent that numerous modifications could be made thereto by those skilled in the art without departing from the basic concept and scope of the invention.

What is claimed is:

1. A compression ignition type engine in which an amount of production of soot gradually increases and then peaks when an amount of inert gas in a combustion chamber increases and in which a further increase of the amount of inert gas in the combustion chamber results in a temperature of fuel and surrounding gas in the combustion chamber becoming lower than a temperature of production of soot and therefore almost no production of soot any longer, said engine comprising:

an exhaust passage;

an $NO_x$ absorbent arranged in said exhaust passage, said $NO_x$ absorbent absorbing $NO_x$ when an air-fuel ratio of inflowing exhaust gas is lean and releasing the absorbed $NO_x$ when the air-fuel ratio of the inflowing exhaust gas is rich or the stoichiometric air-fuel ratio;

switching means for selectively switching between a first combustion where the amount of the inert gas in the combustion chamber is larger than the amount of inert gas where the amount of production of soot peaks and a second combustion where the amount of inert gas in the combustion chamber is smaller than the amount of inert gas where the amount of production of soot peaks;

an electric motor for generating a vehicle drive power separate from a drive power of the engine;

a battery for driving the electric motor;

decision means for deciding if an amount of electrical energy stored in said battery is more than a predetermined amount; and control means for performing the first combustion, making the air-fuel ratio in the combustion chamber rich or the stoichiometric air-fuel ratio, and generating drive power at the electric motor even when the second combustion should be performed when $NO_x$ or $SO_x$ should be released from the $NO_x$ absorbent and the amount of electrical energy stored in the battery is more than the predetermined amount.

2. An internal combustion engine as set forth in claim 1, wherein said control means performs second combustion when the second combustion should be performed and said control means also controls fuel injection so that a temperature of the $NO_x$ absorbent rises if the amount of electrical energy stored in the battery is less than the predetermined amount, when $NO_x$ or $SO_x$ should be released from the $NO_x$ absorbent.

3. An internal combustion engine as set forth in claim 1, wherein said control means maintains an output torque of the engine at substantially a maximum output torque where the first combustion can be performed and a drop of the engine output torque is made up for by the output torque of the electric motor when performing the first combustion when the second combustion should be performed.

4. An internal combustion engine as set forth in claim 1, wherein said control means makes the air-fuel ratio in the combustion chamber rich or the stoichiometric air-fuel ratio when the first combustion is performed when $NO_x$ or $SO_x$ should be released from the $NO_x$ absorbent.

5. An internal combustion engine as set forth in claim 1, wherein said control means reduces the output torque of the engine, makes the air-fuel ratio in the combustion chamber rich or the stoichiometric air-fuel ratio, and makes the electric motor generate drive power so as to make up for the drop in the engine output torque by the output torque of the electric motor when $NO_x$ or $SO_x$ should be released from the $NO_x$ absorbent, the first combustion is being performed, and the amount of electrical energy stored in the battery is more than the predetermined amount.

6. An internal combustion engine as set forth in claim 1, wherein detecting means is provided for detecting the temperature of the $NO_x$ absorbent and said control means reduces the output torque of the engine, makes the air-fuel ratio in the combustion chamber rich or the stoichiometric air-fuel ratio, makes the electric motor generate drive power so as to make up for the drop in the engine output torque by the output torque of the electric motor, and controls the ratio of the engine output torque and the output torque of the electric motor so that the temperature of the $NO_x$ absorbent falls within a predetermined temperature range when $NO_x$ or $SO_x$ should be released from the $NO_x$ absorbent and the amount of electrical energy stored in the battery is more than the predetermined amount.

7. An internal combustion engine as set forth in claim 1, wherein an operating region of the engine is divided into a first operating region on a low load side and a second operating region on a high load side, the first combustion is performed in the first operating region, and the second combustion is performed in the second operating region.

8. An internal combustion engine as set forth in claim 1, wherein an exhaust gas recirculation device is provided for recirculating exhaust gas exhausted from the combustion chamber into an intake passage of the engine, the inert gas comprises recirculated exhaust gas, the exhaust gas recirculation rate is made more than about 55 percent when the first combustion is being performed, and the exhaust gas recirculation rate is made less than about 50 percent when the second combustion is being performed.

9. An internal combustion engine as set forth in claim 1, wherein a particulate filter arranged in said exhaust passage is provided, and as said particulate filter, use is made of a particulate filter able to remove by oxidation any particulate in an exhaust gas flowing into the particulate filter without emitting a luminous flame when an amount of discharged particulate discharged from the combustion chamber per unit time is smaller than an amount of particulate which can be removed by oxidation without emitting a luminous flame per unit time on the particulate filter; and said particulate filter simultaneously has the function of an $NO_x$ absorbent.

10. An internal combustion engine as set forth in claim 9, wherein a precious metal catalyst is carried on the particulate filter.

11. An internal combustion engine as set forth in claim 10, wherein an active oxygen release agent, which takes in the oxygen and holds the oxygen when excess oxygen exists in surroundings, and releases the held oxygen in the form of active oxygen when the concentration of oxygen in the surroundings falls, is carried on the particulate, and active oxygen is released from the active oxygen release agent when particulate deposits on the particulate filter, and particulate deposited on the particulate filter is oxidized by the released active oxygen.

* * * * *